United States Patent
Kaji

(10) Patent No.: US 7,398,257 B2
(45) Date of Patent: Jul. 8, 2008

(54) MULTIOBJECTIVE OPTIMIZATION APPARATUS, MULTIOBJECTIVE OPTIMIZATION METHOD AND MULTIOBJECTIVE OPTIMIZATION PROGRAM

(75) Inventor: Hirotaka Kaji, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 227 days.

(21) Appl. No.: 11/017,180

(22) Filed: Dec. 20, 2004

(65) Prior Publication Data
US 2005/0143845 A1    Jun. 30, 2005

(30) Foreign Application Priority Data
Dec. 24, 2003 (JP) .............................. 2003-428021
Mar. 5, 2004 (JP) .............................. 2004-062402

(51) Int. Cl.
*G06F 15/18* (2006.01)
*G05B 13/00* (2006.01)

(52) U.S. Cl. .............................. 706/19; 706/23; 706/17; 700/173; 700/49

(58) Field of Classification Search .................. 706/12, 706/13, 15, 23, 19, 17; 700/173, 49
See application file for complete search history.

(56) References Cited

U.S. PATENT DOCUMENTS

| | | | |
|---|---|---|---|
| 5,781,430 A * | 7/1998 | Tsai | 700/28 |
| 6,549,815 B1 * | 4/2003 | Kaji | 700/32 |
| 6,721,606 B1 * | 4/2004 | Kaji et al. | 700/17 |
| 6,735,576 B1 * | 5/2004 | Kaji et al. | 706/1 |
| 6,757,667 B1 * | 6/2004 | Patel | 706/19 |
| 6,768,973 B1 * | 7/2004 | Patel | 703/2 |
| 6,895,286 B2 * | 5/2005 | Kaji et al. | 700/28 |
| 7,078,899 B2 * | 7/2006 | Dale et al. | 324/314 |
| 2002/0099929 A1 * | 7/2002 | Jin et al. | 712/220 |
| 2003/0050902 A1 * | 3/2003 | Buczak et al. | 706/13 |
| 2004/0184654 A1 * | 9/2004 | Villain | 382/151 |
| 2004/0186668 A1 * | 9/2004 | Gillet et al. | 702/19 |

OTHER PUBLICATIONS

Alexandre H.F. Dies and Joao A. de Vasconcelos. Multiobjective Genetic Algorithm Applied to Solve Optimization Problems. IEEE Transaction on Magnetics, vol. 38, No. 2. Mar. 2002.*

(Continued)

*Primary Examiner*—Joseph P. Hirl
*Assistant Examiner*—Adrian L Kennedy
(74) *Attorney, Agent, or Firm*—Keating and Bennett, LLP

(57) ABSTRACT

A multiobjective evolutionary algorithm unit feeds a set of parameters of an individual to a search history storage device in a fitness estimating unit and to an optimization target. The optimization target outputs a set of sampled values of fitnesses on the basis of the set of parameters of the individual. The search history storage device stores the set of parameters of the individual and a set of sampled values as a search history. The fitness estimating module computes a set of estimated values of true fitnesses on the basis of the search history stored in the search history storage device for output to the multiobjective evolutionary algorithm unit. The multiobjective evolutionary algorithm unit determines a Pareto-optimal population in accordance with a genetic algorithm on the basis of a plurality of sets of estimated values.

22 Claims, 34 Drawing Sheets

OTHER PUBLICATIONS

Dias et al., Alexandre, "Multiobjective Genetic Algorithms Applied to Solve Optimization Problems" IEEE, 2002.*

C.M. Fonseca, P.J. Fleming; "Genetic Algorithms for Multiobjective Optimization: Formulation, Discussion and Generalization in Genetic Algorithms;" Proceedings of the 5th International Conference, pp. 416-423 (Jul. 1993).

K. Deb, S. Agrawal, A. Pratab, and T. Meyarivan; "A Fast Elitist Non-Dominated Sorting Genetic Algorithm for Multi-Objective Optimization: NSGA-II;" KanGAL Report 200001, Indian Institute of Technology, Kanpur, India, pp. 1-10 (2000).

E. Zitzler, M. Laumanns, L. Thiele; "SPEA2: Improving the Performance of the Strength Pareto Evolutionary Algorithm;" TIK-Report 103, Computer Engineering and Communication Networks Lab (TIK), Swiss Federal Institute of Technology (ETH) Zurich, pp. 1-21 (May 2001).

Y. Sano, H. Kita; "Optimization of Noisy Fitness Functions by Means of Genetic Algorithms Using History of Search With Test of Estimation;" The Transactions of the Institute of Electrical Engineers of Japan, vol. 122-C, No. 6, pp. 360-365 (2002).

Y. Sano, H. Kita; "Optimization of Noisy Fitness Functions by Means of Genetic Algorithms Using History of Search With Test of Estimation;" The Transactions of the Institute of Electrical Engineers of Japan, vol. 121-X, No. 7, pp. 1-7 (2001).

K. Ikeda, H. Kita, S. Kobayashi; "Failure of Pareto-Based MOEAs, Does Non-Dominated Really Mean Near to Optimal?;" Congress on Evolutionary Computation, pp. 957-962 (2001).

M.D. Berg, M. V. Kreveld, M. Overmars, O. Schwarzkopf; "Computational Geometry: Algorithms and Applications;" Springer-Verlag, pp. 183-191 (1997).

H. Imai, K. Imai; "Computer Science;" Jouhou Sugaku Kouza 12 (Lecture on Information Mathematics No. 12), Kyoritsu Publishing, pp. 68-85 (1994).

E. Zitzler, K. Deb, L. Thiele; "Comparison of Multiobjective Evolutionary Algorithms: Empirical Results;" Evolutionary Computation 8(2), pp. 173-195 (2000).

* cited by examiner

α-DOMINATION STRATEGY

DOMINANCE COMPARISON

F I G. 1 2
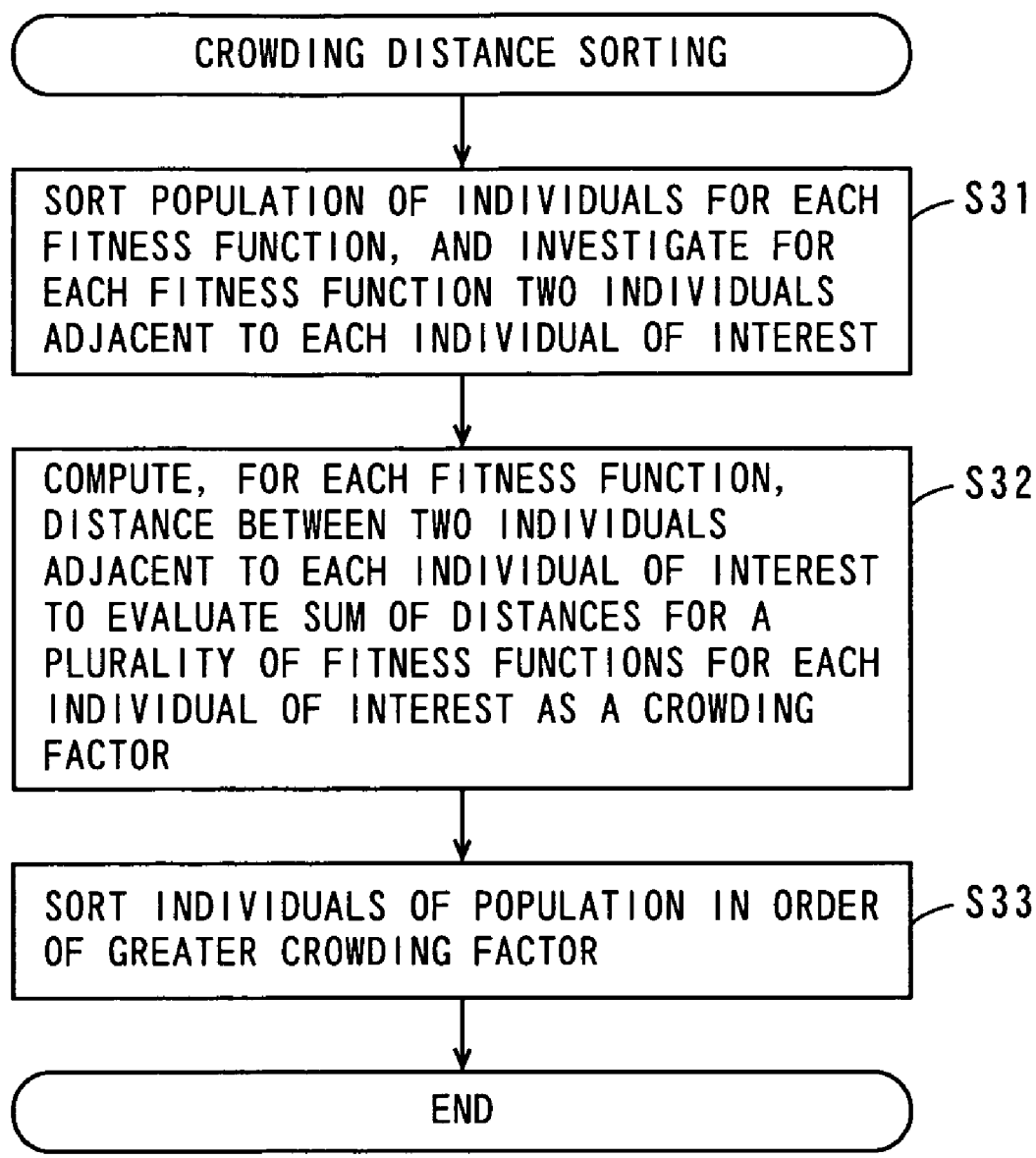

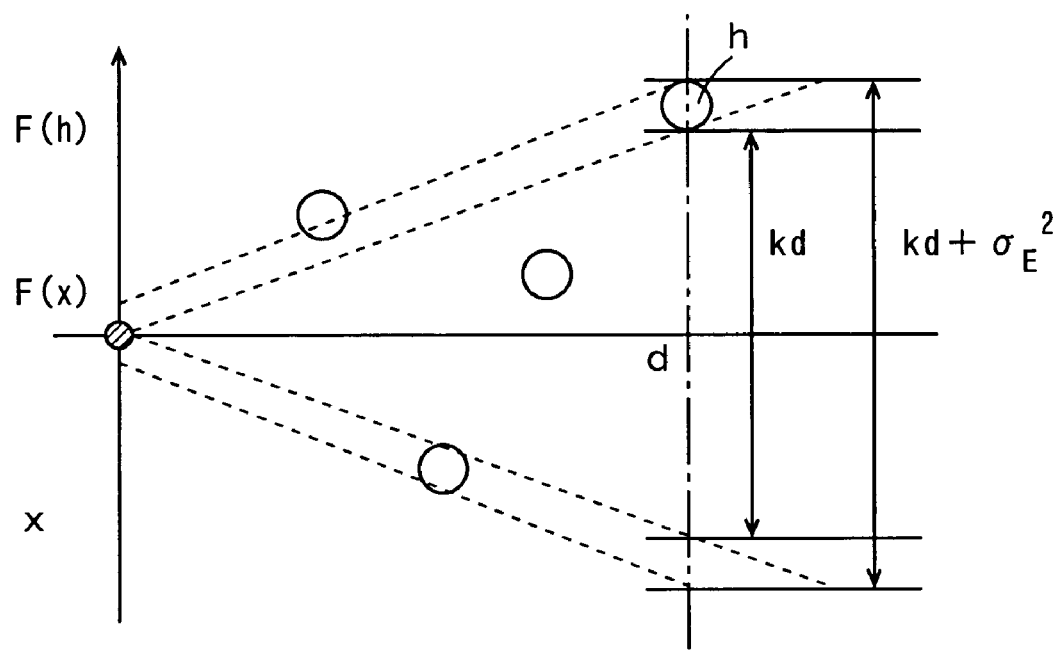
F I G. 1 5

F I G. 2 4

| OBJECTIVE | SPACE | SIMPLEX | COMPUTATION EQUATION |
|---|---|---|---|
| 2 | 1-DIMENSIONAL SPACE | STRAIGHT-LINE | LENGTH OF STRAIGHT-LINE |
| 3 | 2-DIMENSIONAL SPACE | TRIANGLE | BASE × HEIGHT ÷ 2 |
| 4 | 3-DIMENSIONAL SPACE | CONE | BASE AREA × HEIGHT ÷ 3 |
| 5 | 4-DIMENSIONAL SPACE | 4-DIMENSIONAL SIMPLEX | BASE VOLUME × HEIGHT ÷ 4 |
| 6 | 5-DIMENSIONAL SPACE | 5-DIMENSIONAL SIMPLEX | BASE OF 4-DIMENSIONAL AREA × HEIGHT ÷ 5 |
| m+1 | m-DIMENSIONAL SPACE | m-DIMENSIONAL SIMPLEX | BASE OF (m-1) DIMENSIONAL AREA × HEIGHT ÷ 5 |

F I G. 2 7
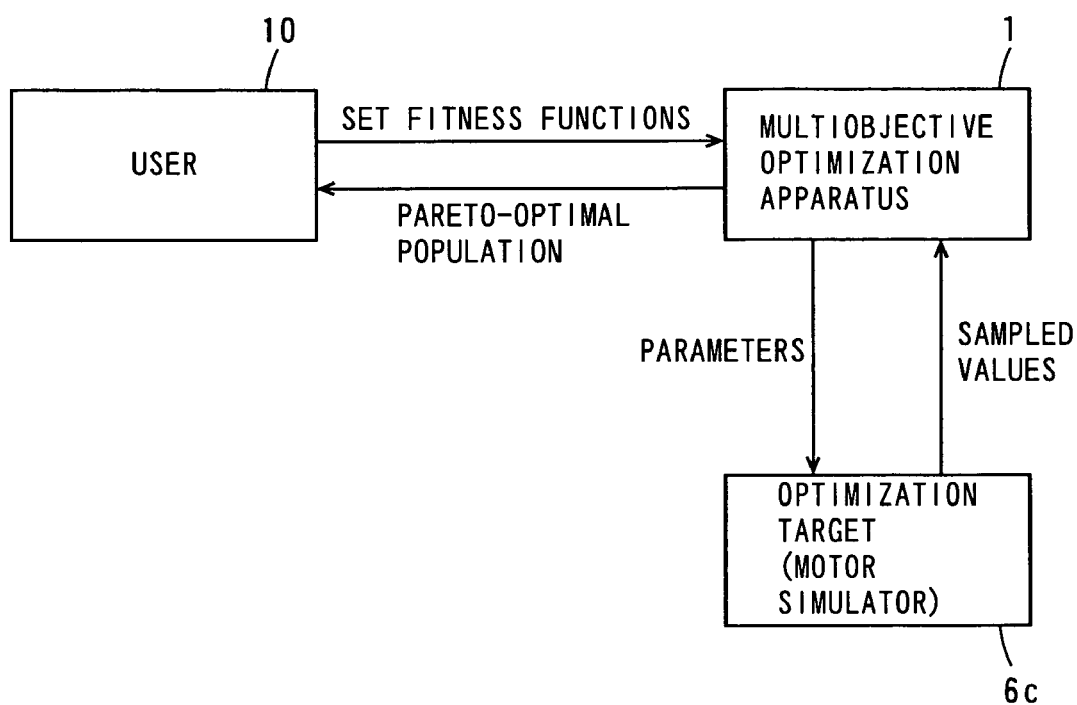

| POPULATION SIZE | 100 |
|---|---|
| NUMBER OF GENERATIONS | 30 (NUMBER OF EVALUATIONS 3000, INCLUDING PARENT RE-EVALUATIONS) |
| SELECTION OPERATOR | BINARY TOURNAMENT SELECTION |
| CROSSOVER OPERATOR | UNDX |

(b)

| POPULATION SIZE | 100 |
|---|---|
| NUMBER OF GENERATIONS | 300 (NUMBER OF EVALUATIONS 3000) |
| SELECTION OPERATOR | SELECTION METHOD OF FIRST PREFERRED EMBODIMENT |
| CROSSOVER OPERATOR | UNDX |

(c)

| ZDT1 | $f_1 = x_1$ <br> $g = 1.0 + 9 \cdot x_2$ <br> $f_2 = g \left(1.0 - \sqrt{\dfrac{f_1}{g}}\right)$ <br> $F_i = f_i + \delta \quad \delta \sim N(0, \sigma_E^2) \quad \sigma_E = 0.3$ <br> $0 \leq x_i \leq 1 \quad (i = 1, 2)$ |
|---|---|
| ZDT2 | $f_1 = x_1$ <br> $g = 1.0 + 9 \cdot x_2$ <br> $f_2 = g \left(1.0 - \left(\dfrac{f_1}{g}\right)^2\right)$ <br> $F_i = f_i + \delta \quad \delta \sim N(0, \sigma_E^2) \quad \sigma_E = 0.3$ <br> $0 \leq x_i \leq 1 \quad (i = 1, 2)$ |

| POPULATION SIZE | 100 |
|---|---|
| NUMBER OF GENERATIONS | 30 (NUMBER OF EVALUATIONS 3000, INCLUDING PARENT RE-EVALUATIONS) |
| SELECTION OPERATOR | BINARY TOURNAMENT SELECTION |
| CROSSOVER OPERATOR | UNDX |

(b)

| POPULATION SIZE | 100 |
|---|---|
| NUMBER OF GENERATIONS | 300 (NUMBER OF EVALUATIONS 3000) |
| SELECTION OPERATOR | SELECTION METHOD OF SECOND PREFERRED EMBODIMENT |
| CROSSOVER OPERATOR | UNDX |

(c)

| DTLZ2 | $f_1 = (1.0+g) \cos(\frac{x_1 \pi}{2}) \cos(\frac{x_2 \pi}{2})$ <br> $f_2 = (1.0+g) \cos(\frac{x_1 \pi}{2}) \sin(\frac{x_2 \pi}{2})$ <br> $f_3 = (1.0+g) \sin(\frac{x_1 \pi}{2})$ <br> $g = (x_3 - 0.5)^2$ <br> $F_i = f_i + \delta \quad \delta \sim N(0, \sigma_E^2) \quad \sigma_E = 0.1$ <br> $0 \leq x_i \leq 1 \quad (i=1,2,3)$ |
|---|---|

F I G. 3 2

| POPULATION SIZE | 5 0 |
|---|---|
| CHILD POPULATION SIZE | 1 0 |
| NUMBER OF GENERATIONS | 2 3 (NUMBER OF EVALUATIONS 2 8 0) |
| SELECTION OPERATOR | SELECTION METHOD OF FIRST PREFERRED EMBODIMENT |
| CROSSOVER OPERATOR | U N D X |
| CONSTANT k' | 1 0 0 0 0 0 |
| METHOD OF GENERATION ALTERATION | METHOD OF FIRST PREFERRED EMBODIMENT |

MULTIOBJECTIVE OPTIMIZATION APPARATUS, MULTIOBJECTIVE OPTIMIZATION METHOD AND MULTIOBJECTIVE OPTIMIZATION PROGRAM

BACKGROUND OF THE INVENTION

1. Field of the Invention

The present invention relates to a multiobjective optimization apparatus, a multiobjective optimization method, and a multiobjective optimization program which optimizes the parameters of a target to be optimized.

2. Description of the Background Art

Conventionally, problem classes referred to as multiobjective optimization problems exist. As an example, a multiobjective optimization problem with two objective functions arises when one wishes to minimize the cost of a product while maximizing its performance. In this case, the cost and the performance are the two objective functions. In general, a trade-off relationship exists whereby reducing the cost degrades the performance while improving the performance increases the cost. Accordingly, the solution to such a multiobjective optimization problem cannot be a single solution.

FIG. 36 is a diagram showing the application of the multiobjective optimization problem to the optimization of an engine. In the application of the multiobjective optimization problem to the optimization of fuel consumption and torque of an engine, the fuel consumption and torque are the two objective functions $f_1$, $f_2$. In this case, the values of the objective functions $f_1$, $f_2$ are optimized by adjusting parameters such as the amount of injected fuel, ignition timing, etc.

A solution A is superior to a solution B in fuel consumption, while being inferior to the solution B in torque. Since in this manner, the fuel consumption and engine torque have a trade-off relationship, a plurality of optimal solutions can be found. A user can select a solution from the plurality of optimal solutions that is suited to a particular purpose. For example, for an engine used in an automatic motorcycle suited for sport operation, the solution A is selected, and for an engine used in an automatic motorcycle suited for long touring, the solution B is selected.

The multiobjective optimization problem, in general, is defined as a problem of minimizing the values of M objective functions with respect to N parameters within the range of constraints for each parameter. Maximization of objective function values is converted to a problem of minimizing the objective function values by applying a minus sign to the objective functions.

Such a multiobjective optimization problem typically does not have a single optimal solution but has a population of optimal solutions which are defined as the concept referred to as Pareto-optimal solutions. Note that a Pareto-optimal solution is one in which an improvement in one objective function value requires a degradation of another, which is defined as follows (refer to Document 1, for example):

Definition 1

Given two solutions $x1$, $x2 \in F$ for p objective functions $f_k$ ($k=1, \ldots, p$), $x1$ is said to dominate $x2$ if $f_k(x1) \leq f_k(x^2)$ ($\forall k=1, \ldots, p$) $\wedge$ $f_k(x1) < f_k(x2)$ ($\exists k=1, \ldots, p$), where F is a population of solutions.

Definition 2

A solution $x0$ is an optimal solution if $x0$ dominates all the other solutions $x \in F$.

Definition 3

A solution $x0$ is a Pareto-optimal solution (or non-inferior solution) if there does not exist any solutions $x \in F$ that dominate $x0$.

Determining a population of Pareto-optimal solutions means to determine a population of optimal solutions for a tradeoff relationship between objective functions.

FIG. 37 is a diagram for use in illustrating Pareto-optimal solutions, showing an example of two objective functions $f_1$, $f_2$. The value of the objective function $f_1$ for the solution a, $f_1(a)$, is smaller than the value of the objective function $f_2$ for the solution b, $f_1(b)$, while the value of the objective function $f_2$ for the solution a, $f_2(a)$, is smaller than the value of the objective function $f_2$ for the solution b, $f_2(b)$. The solution a therefore dominates the solution b.

Similarly, the solution a dominates the solutions c, d. There does not exist any solutions that dominate the solution a. Also, solutions that dominate the solutions e, f do not exist. This makes the solutions a, e, f the Pareto-optimal solutions.

Note that the solution g is a weak Pareto-optimal solution. A weak Pareto-optimal solution is one that is not dominated by Pareto-optimal solutions with respect to only one objective function. Such a weak Pareto-optimal solution is not a reasonable one, and does not essentially have to be determined.

A number of solutions have been proposed for multiobjective optimization problems, among which are Multiobjective Evolutionary Algorithms (MOEAs) that have recently attracted attention. The most important feature of this method is using a multiple point search in an evolutionary algorithm to determine a population of Pareto-optimal solutions at a time. The population of Pareto-optimal solutions obtained is used, e.g., for decision making in determining a solution among them that is suited to a particular purpose, or for making determinations from the shape of the population of Pareto-optimal solutions (i.e., Pareto-boundary).

Numerous studies are being conducted on the application of genetic algorithms (GAs) as evolutionary algorithms to multiobjective optimization problems. A genetic algorithm is a computing technique that imitates the adaptive evolution in biology. In genetic algorithms, candidate solutions are referred to as individuals, objective functions are referred to as fitness functions, and fitness function values are referred to as fitnesses.

The genetic algorithm is an algorithm suggested by J. Holland, and involves obtaining hints from the processes observed in natural evolution such as selection, crossover, or mutation of chromosomes. Taking design variables as genes, a population of individuals at the initial design is randomly generated, and the fitnesses of each individual are evaluated. A parent is selected such that an individual of better fitnesses is more likely to be selected as the parent. Then, offspring is produced by means of crossover (shuffling of genes) and mutation (random alteration of genes). Generation is iterated by further evaluations, selections, crossovers, and mutations to search for optimal solutions.

More specifically, Fonseca et al. proposed MOGA (Multiple Objective Genetic Algorithm: e.g., refer to Document 1), Deb et al. proposed NSGA-II (Non-Dominated Sorting Genetic Algorithm-II: e.g., refer to Document 2), and Zitzler et al. proposed SPEA2 (Strength Pareto Evolutionary Algorithm 2: e.g., refer to Document 3), to cite examples. NSGA-II and SPEA2, in particular, are known as very useful multiobjective evolutionary algorithms.

Actual applications of multiobjective evolutionary algorithms include problems of determining the wing shape for a supersonic transport, optimization of parameters of a vehicle or engine, etc.

In order to optimize fitness functions having uncertainty, MFEGA (Memory-based Fitness Estimation Genetic Algorithm) was also proposed by Sano, Kita, et al., which allows estimation of true fitnesses using search history (e.g., refer to Document 4). The MEFGA includes storing the sampled data of fitnesses for the previously obtained individuals as a search history, and estimating true fitnesses by reference to the search history. Regarding problems with uncertainty, the MFEGA is reported to have a better search performance than the usual genetic algorithms and methods which require sampling the fitnesses of an identical individual a number of times.

However, the genetic algorithms suggested in Document 1, Document 2 and Document 3 are all applied to a simulation which always results in the same solution, as in the case of a benchmark problem or an ideal model which does not contain probability factors. None of the cases has reported the application of the above-mentioned genetic algorithms to a problem with individuals having noisy fitnesses, as in a real system or a simulation containing probability factors, i.e., a problem having uncertainty. This may be explained by the following two reasons.

For one thing, because a target to be optimized contains noise, the fitnesses of individuals obtained from the optimization target vary for each evaluation, which prevents a satisfactory evolution. That is, individuals that should originally provide good fitnesses are eliminated because the fitnesses are degraded by noise. Meanwhile, individuals that should provide poor fitnesses survive because the fitnesses are improved by noise. Such phenomena prevent normal evolution of the individuals.

For another, the shape of a resulting population of Pareto-optimal solutions is unclear. That is, because of the noisy fitnesses obtained, a Pareto-boundary is not formed when the fitnesses are plotted on the plane of fitness function space, for example, in a two-objective optimization problem. This makes the conventional genetic algorithms difficult for use in decision making or making determinations.

Examples of real systems and simulations containing probability factors that require multiobjective optimization include the optimization of signal switching rules using a traffic volume simulator and the optimization of control parameters of a motor. The purpose of the optimization of signal switching rules is to prevent a traffic jam on two highways by successfully switching the signals at an intersection of and near these highways. The purpose of the optimization of control parameters of a motor is to achieve both the increased responsiveness in the motor and decreased overshoot.

However, for the traffic volume simulator, the velocity and number of passing vehicles are randomly given, and for the motor, measurement errors may be made by sensors, and therefore, computation of fitnesses using the identical individuals (i.e., the rules and the control parameters) results in fitnesses that vary each time. This causes the above-described two problems.

Such problems with uncertainty present serious difficulties not only in multiobjective optimization, but also in single objective optimization. In evolutionary algorithms, several methods for statistically coping with noise are proposed. The most common one involves sampling individuals a number of times, by which with the number of sampling times being n, the noise variance can be decreased to $n^{-0.5}$. The method, however, increases the evaluation time to a factor of n, which makes it undesirable for use in a time-consuming real system or large-scale simulation.

The MFEGA suggested in Document 4 exhibits good search performance for single objective optimization problems, but fails to provide sufficient studies on applications for multiobjective optimization problems.

(Document 1) C. M. Fonseca, P. J. Fleming: Genetic Algorithms for Multiobjective Optimization: Formulation, Discussion and Generalization; Proceedings of the 5th International Conference on Genetic Algorithms, pp. 416-423 (1993).

(Document 2) K. Deb, S. Agrawal, A. Pratab, and T. Meyarivan: A Fast Elitist Non-Dominated Sorting Genetic Algorithm for Multi-Objective Optimization: NSGA-II, KanGAL Report 20001, Indian Institute of Technology, Kanpur, India (2000).

(Document 3) E. Zitzler, M. Laumanns, L. Thiele: SPEA2: Improving the Performance of the Strength Pareto Evolutionary Algorithm, Technical Report 103, Computer Engineering and Communication Networks Lab (TIK), Swiss Federal Institute of Technology (ETH) Zurich (2001).

(Document 4) Sano, Kita: Optimization of Noisy Fitness Functions by Means of Genetic Algorithms Using History of Search With Test of Estimation; The Transactions of the Institute of Electrical Engineers of Japan, Vol. 122-C, No. 6, pp. 1001-1008 (2002).

(Document 5) K. Ikeda, H. Kita, and S. Kobayashi: Failure of Pareto-Based MOEAs, Does Non-Dominated Really Mean Near to Optimal?; Congress on Evolutionary Computation, pp. 957-962 (2001).

(Document 6) M. D. Berg, et al.: Computational. Geometry: Algorithms and Applications, Springer-Verlag (1997).

(Document 7) Hiroshi Imai, Keiko Imai: Computer Science, Jouhou Sugaku Kouza 12 (Lecture on Information Mathematics No. 12), Kyoritsu Publishing (1994).

(Document 8) E. Zitzler, K. Deb, L. Thiele: Comparison of Multiobjective Evolutionary Algorithms: Empirical Results, Evolutionary Computation 8(2), pp. 173-195 (2000).

SUMMARY OF THE INVENTION

In order to overcome the problems described above, preferred embodiments of the present invention provide a multiobjective optimization apparatus, a multiobjective optimization method, and a multiobjective optimization program which allow appropriate Pareto-optimal individuals having diversity to be obtained in a short time, even for an optimization target having uncertainty.

A multiobjective optimization apparatus according to a preferred embodiment of the present invention that that feeds parameters of an individual to an optimization target, and receives sampled values of fitnesses for a plurality of fitness functions that correspond to a plurality of objectives from the optimization target, the multiobjective optimization apparatus including a storage that stores parameters of individuals and sampled values of fitnesses which are outputted from the optimization target, an estimating module that determines estimated values of true fitnesses that correspond to an individual of interest on the basis of sampled values which are stored in the storage, and an arithmetic unit that generates a new individual on the basis of the estimated values obtained by the estimating module, and feeds parameters of the generated new individual to the optimization target and the storage, while evaluating, in accordance with a multiobjective evolutionary algorithm, a population to be evaluated on the basis of a plurality of estimated values obtained by the estimating module, thereby determining a Pareto-optimal population, wherein the estimating module assigns a weight to the sampled values that correspond to each individual which is stored in the storage, and determines a linear sum of the weighted plurality of sampled values, thereby determining estimated values of fitnesses that correspond to the individual of interest, the weight for each individual being a function that contains a distance between the individual of interest and each of the others of the individuals on a parameter space, and the arithmetic unit applies, for each of the plurality of fitness functions, dominance comparison on estimated values that correspond to a plurality of individuals of the population to be evaluated, and assigns weights to a plurality of results obtained for each of the plurality of fitness functions, so as to rank the plurality of individuals of the population to be evaluated on the basis of a linear sum of the plurality of obtained results which are weighted for each of the plurality of fitness functions, the multiobjective optimization apparatus generates a new individual on the basis of an index of distribution that indicates a degree of sparseness on a distribution of individuals at the highest rank of the population to be evaluated on a fitness function space.

In the multiobjective optimization apparatus, the parameters of the individual and the sampled values of fitnesses which are outputted from the optimization target are stored in the storage. On the basis of a plurality of sampled values that correspond to a plurality of individuals stored in the storage, the estimating module determines estimated values of true fitnesses that correspond to an individual of interest. On the basis of the estimated values, the arithmetic unit generates a new individual, of which, the parameters are fed to the optimization target and the storage. On the basis of the plurality of estimated values obtained, the arithmetic unit further evaluates the population to be evaluated in accordance with the multi-objective evolutionary algorithm. This results in the generation of the Pareto-optimal population.

In this case, the sampled values that correspond to each of the individuals stored in the storage are weighted, and the linear sum of the weighted plurality of the sampled values is determined. Thus, the estimated values of fitnesses that correspond to the individual of interest can be obtained.

Since the weight for each individual is the function that contains the distance between the individual of interest and the other individuals on the parameter space, the estimated values in which deviations from the true fitnesses are sufficiently small can be obtained. Therefore, an appropriate Pareto-optimal population may be achieved even when the sampled values outputted from the optimization target have uncertainty.

In addition, the estimated values that correspond to the plurality of individuals of the population to be evaluated are subjected to the dominance comparison for each of the plurality of fitness functions, followed by weighting the results obtained for each of the plurality of fitness functions. Then, on the basis of the linear sum of the plurality of obtained results which are weighted for the plurality of fitness functions, the plurality of individuals of the population to be evaluated are ranked.

This allows weak Pareto-optimal individuals to be eliminated. Also, the weak Pareto-optimal individuals are prevented from being determined as Pareto-optimal individuals when the sampled values of fitnesses are noisy because of the uncertainty of the optimization target. Accordingly, reasonable Pareto-optimal individuals in consideration of the relationship between the plurality of fitnesses may be achieved, even for the optimization target having uncertainty.

Furthermore, the new individual is generated on the basis of the index of distribution which indicates the degree of sparseness on the distribution of the individuals at the highest rank on the fitness function space. This allows individuals to be generated evenly over a broad range of the fitness function space. Thus, Pareto-optimal individuals having diversity can be obtained in a short time.

Let $h_l$ be the plurality of individuals which are stored in the storage, let $F(x)$ be the sampled values that correspond to an individual of interest x, let $F(h_l)$ be the sampled values that correspond to the individuals spaced away from the individual of interest by a distance $d_l$ on the parameter space, and let k' be a coefficient, where $1=1, \ldots, H$ and n is a natural number, then the estimating module may compute a plurality f'(x) of estimated values of true fitnesses that correspond to the individual of interest x based on an estimating equation expressed by:

$$f'(x) = \frac{F(x) + \sum_{l=2}^{H} \frac{1}{k'd_1^n + 1} F(h_1)}{1 + \sum_{l=2}^{H} \frac{1}{k'd_1^n + 1}} \quad (10)$$

In this case, considering the distances between the individual of interest and the other individuals on the parameter space, the estimated values in which deviations from the true fitnesses are sufficiently small can be obtained.

In the equation (10) shown above, n may be one. In this case, the influence of the other individuals spaced far away from the individual of interest on the computation of the estimated values can be decreased. This allows the estimated values in which deviations from the true fitnesses are sufficiently small to be obtained.

In the equation (10) shown above, n may be three. In this case, the influence of the other individuals spaced far away from the individual of interest on the computation of the estimated values can be substantially decreased. This allows the estimated values in which deviations from the true fitnesses are more sufficiently small to be obtained.

Given p fitness functions that correspond to p-objectives, let $f_k(x1)$ and $f_k(x2)$ be estimated values of fitnesses that correspond to an individual x1 and an individual x2 with respect to one fitness function of the p fitness functions, and let $f_j(x1)$ and $f_j(x2)$ be estimated values of fitnesses that correspond to the individual x1 and individual x2 with respect to another fitness functions of the p fitness functions, where K and j are $1, \ldots, p$, k being different from j, and let $\alpha_{kj}$ represent a weight, then the arithmetic unit may determine that the individual x1 dominates the individual x2 when $g_k(x1, x2)$ expressed by an equation shown below satisfies $g_k(x1, x2) \leq 0$ with respect to all of $k=1, \ldots, p$, while satisfying a relationship of $g_k(x1, x2) < 0$ with respect to at least one of $k=1, \ldots, p$:

$$g_k(x_1, x_2) = f_k(x_1) - f_k(x_2) + \sum_{j \neq k}^{1 \ldots P} \alpha_{kj}(f_j(x_1) - f_j(x_2)) \quad (8)$$

When the plurality of objectives is m objectives having a value of not less than two, the index of distribution may be a size of a simplex formed by m individuals adjacent to an individual of interest on a fitness function space that corresponds to the m objectives, and the arithmetic unit may select an individual having a highest degree of sparseness on the basis of the size of the simplex to form a new individual using the individual selected.

In this case, on the basis of the index of distribution, the new individual can be generated easily on a region with sparse individuals on the distribution of the individuals at the highest rank on the fitness function space. This allows Pareto-optimal individuals having high diversity to be achieved.

With the plurality of objectives being two objectives, the size of the simplex may be represented by a length of a straight-line that connects two individuals adjacent to an individual of interest on the fitness function space; with the plurality of objectives being three objectives, the size of the simplex may be represented by an area of a triangle having the vertices of three individuals adjacent to an individual of interest on the fitness function space, and with the plurality of objectives being four objectives, the size of the simplex may be represented by a volume of a cone having the vertices of four individuals adjacent to an individual of interest on the fitness function space.

This allows for an easy determination of the region with sparse individuals on the distribution of the individuals at the highest rank, according to the number of objectives.

When the plurality of objectives is m objectives having a value of not less than four, the size of the simplex may be represented by a base (m−1) dimensional area×height/m of a simplex formed by m individuals adjacent to an individual of interest on the fitness function space.

This allows for an easy determination of the region with sparse individuals on the distribution of the individuals at the highest rank, according to the number of objectives.

With the plurality of objectives being three or more objectives, the simplex may be formed by Delaunay Triangulation. This allows the size of the simplex as the index of distribution to be easily computed.

The arithmetic unit may replace a newly generated individual with an individual at the lowest rank of the population to be evaluated when the newly generated individual is different from the individuals of the population to be evaluated.

This allows for a gradual decrease in poor individuals during the initial search for Pareto-optimal individuals, while maintaining the diversity of the Pareto-optimal individuals during the late search.

The arithmetic unit may rank as the lowest a newly generated individual which is a duplicate of an individual of the population to be evaluated.

This allows for a gradual decrease in poor individuals during the initial search for Pareto-optimal individuals, while maintaining the diversity of the Pareto-optimal individuals during the late search.

The arithmetic unit may evaluate each individual of the population to be evaluated only once. This prevents re-evaluations of the individuals, so that the optimization time can be reduced even in the case of a real system or large-scale simulation that requires time for evaluating one individual.

The estimating module may finish storing the sampled values which are outputted from the optimization target when the amount of the sampled values stored in the storage has reached a given storage capacity.

In this case, the estimated values of fitnesses can be obtained using the given amount of sampled values stored in the storage. This results in reduced optimization time.

The arithmetic unit may display the Pareto-optimal individuals on the basis of the estimated values obtained by the estimating module.

In this case, the user is allowed to visually recognize the Pareto-optimal individuals, thereby easily making a variety of decisions.

The arithmetic unit may evaluate the individuals of the population to be evaluated using a genetic algorithm as the multiobjective evolutionary algorithm.

In this case, alteration of generations is performed on the basis of the genetic algorithm, so that the most suitable Pareto-optimal individuals can be easily obtained.

The optimization target may include an evaluation system for evaluating a plurality of items of performance of equipment, the parameters including control parameters for the evaluation system, the plurality of fitness functions being the plurality of items of performance obtained from evaluations performed by the evaluation system, and the fitnesses being values of the plurality of items of performance.

In this case, the evaluation system receives the control parameters. The evaluation system evaluates the plurality of items of performance of the equipment on the basis of the control parameters, and outputs sampled values that correspond to the plurality of items of performance. With the multiobjective optimization apparatus, a population of appropriate control parameters having diversity can be obtained as Pareto-optimal individuals in a short time, even for the evaluation system having uncertainty.

The equipment may be an engine. In this case, the evaluation system receives engine control parameters. The evaluation system evaluates the plurality of items of engine performance on the basis of the engine control parameters, and outputs sampled values that correspond to the plurality of items of the engine performance. With the multiobjective optimization apparatus, a population of appropriate engine control parameters having diversity can be obtained as Pareto-optimal individuals in a short time, even for the evaluation system having uncertainty.

The equipment may be a motor. In this case, the evaluation system receives motor control parameters. The evaluation system evaluates the plurality of items of motor performance on the basis of the motor control parameters, and outputs sampled values that correspond to the plurality of items of the motor performance. With the multiobjective optimization apparatus, a population of appropriate motor control parameters having diversity can be obtained as Pareto-optimal individuals in a short time, even for the evaluation system having uncertainty.

The evaluation system may be an equipment evaluating apparatus that controls the equipment on the basis of the parameters while outputting the values of a plurality of items of performance generated by the operation of the equipment as sampled values.

In this case, the equipment evaluating apparatus receives control parameters. The equipment evaluating apparatus evaluates the plurality of items of the equipment on the basis of the control parameters, and outputs the sampled values that corresponds to the plurality of items of the performance. With the multiobjective optimization apparatus, a population of appropriate control parameters having diversity can be obtained as Pareto-optimal individuals in a short time, even for the equipment evaluating system having uncertainty.

The evaluation system may be an equipment simulator that evaluates a plurality of items of performance by simulating the operation of the equipment on the basis of the parameters, and outputs the values of a plurality of items of performance evaluated as sampled values.

In this case, the equipment simulator receives control parameters. The equipment simulator runs a simulation of the operation of the equipment on the basis of the control parameters for evaluations of the plurality of items of performance, and outputs the sampled values that correspond to the plurality of items of performance evaluated. With the multiobjective optimization apparatus, a population of appropriate control parameters having diversity can be obtained as Pareto-optimal individuals in a short time, even for the equipment simulator having uncertainty.

A multiobjective optimization method according to another preferred embodiment of the present invention is a multiobjective optimization method in which parameters of an individual are fed to an optimization target, and the parameters of the individual are optimized on the basis of sampled values of fitnesses for a plurality of fitness functions that correspond to a plurality of objectives which are outputted from the optimization target, the method including the steps of storing in a storage parameters of individuals and sampled values of fitnesses which are outputted from the optimization target, determining estimated values of true fitnesses that correspond to an individual of interest on the basis of the sampled values which are stored in the storage, and generating a new individual on the basis of the estimated values obtained, and feeding parameters of the generated new individual to the optimization target and the storage, while evaluating, in accordance with a multiobjective evolutionary algorithm, a population to be evaluated on the basis of a plurality of estimated values obtained, thereby determining a Pareto-optimal population, wherein the step of determining the estimated values includes the step of assigning a weight to the sampled values that correspond to each individual which is stored in the storage, and determining a linear sum of the weighted plurality of sampled values, thereby determining estimated values of fitnesses that correspond to the individual of interest, the weight for each individual being a function that contains a distance between the individual of interest and the others of the individuals on a parameter space, and the step of determining the Pareto-optimal population includes the steps of applying, for each of the plurality of fitness functions, dominance comparison on estimated values that correspond to a plurality of individuals of the population to be evaluated, and assigning weights to a plurality of results obtained for each of the plurality of fitness functions, so as to rank the plurality of individuals of the population to be evaluated on the basis of a linear sum of the plurality of obtained results which are weighted for each of the plurality of fitness functions., and generating a new individual on the basis of an index of distribution that indicates a degree of sparseness on a distribution of individuals at the highest rank of the population to be evaluated on a fitness function space.

In the multiobjective optimization method, the parameters of the individual and the sampled values of fitnesses which are outputted from the optimization target are stored in the storage. On the basis of a plurality of sampled values that correspond to a plurality of individuals stored in the storage, estimated values of true fitnesses that correspond to an individual of interest are determined. On the basis of the estimated values, a new individual is generated, of which the parameters are fed to the optimization target and the storage. On the basis of the estimated values obtained, the population to be evaluated is further evaluated in accordance with the multi-objective evolutionary algorithm. This results in the generation of the Pareto-optimal population.

In this case, the sampled values that correspond to each of the individuals stored in the storage are weighted, and the linear sum of the weighted sampled values is determined. Thus, the estimated values of fitnesses that correspond to the individual of interest can be obtained.

Since the weight for each individual is the function that contains the distance between the individual of interest and the other individuals on the parameter space, the estimated values in which deviations from the true fitnesses are sufficiently small can be obtained. Therefore, an appropriate Pareto-optimal population may be achieved even when the sampled values outputted from the optimization target have uncertainty.

In addition, the estimated values that correspond to the plurality of individuals of the population to be evaluated are subjected to the dominance comparison for each of the plurality of fitness functions, followed by weighting the results obtained for each of the plurality of fitness functions. Then, on the basis of the linear sum of the plurality of obtained results which are weighted for the plurality of fitness functions, the plurality of individuals of the population to be evaluated are ranked.

This allows weak Pareto-optimal individuals to be eliminated. Also, the weak Pareto-optimal individuals are prevented from being determined as Pareto-optimal individuals when the sampled values of fitnesses are noisy because of the uncertainty of the optimization target. Accordingly, reasonable Pareto-optimal individuals in consideration of the relationship between the plurality of fitnesses may be achieved, even for the optimization target having uncertainty.

Furthermore, the new individual is generated on the basis of the index of distribution which indicates the degree of sparseness on the distribution of the individuals at the highest rank on the fitness function space. This allows individuals to be generated evenly over a broad range of the fitness function space. Thus, Pareto-optimal individuals having diversity can be obtained in a short time.

A computer-executable multiobjective optimization program according to still another preferred embodiment of the present invention is a computer-executable multiobjective optimization program in which parameters of an individual is fed to an optimization target, and the parameters of the individual is optimized on the basis of sampled values of fitnesses for a plurality of fitness functions that correspond to a plurality of objectives which are outputted from the optimization target, the multiobjective optimization program allowing a computer to execute the processes of storing in a storage parameters of individuals and sampled values of fitnesses which are outputted from the optimization target, determining estimated values of true fitnesses that correspond to an individual of interest on the basis of the sampled values which are stored in the storage, and generating a new individual on the basis of the estimated values obtained, and feeding parameters of the generated individual to the optimization target and the storage, while evaluating, in accordance with a multiobjective evolutionary algorithm, a population to be evaluated on the basis of a plurality of estimated values obtained, thereby determining a Pareto-optimal population, wherein the process of determining the estimated values includes the process of assigning a weight to the sampled values that correspond to each individual which is stored in the storage, and determines a linear sum of the weighted plurality of sampled values, thereby determining estimated values of fitnesses that correspond to the individual of interest, the weight for each individual being a function that contains a distance between the individual of interest and the others of the individuals on a parameter space, and the process of determining the Pareto-optimal population includes the processes of applying, for each of the plurality of fitness functions, dominance comparison on estimated values that correspond to a plurality of individuals of the population to be evaluated, and assigning weights to a plurality of results obtained for each of the plurality of fitness functions, so as to rank the plurality of individuals of the population to be evaluated on the basis of a linear sum of the plurality of obtained results which are weighted for each of the plurality of fitness functions, and generating a new individual on the basis of an index of distribution that indicates a degree of sparseness on a distribution of individuals at the highest rank of the population to be evaluated on a fitness function space.

In the multiobjective optimization program, the parameters of the individual and the sampled values of fitnesses which are outputted from the optimization target are stored in the storage. On the basis of the sampled values that correspond to a plurality of individuals stored in the storage, estimated values of true fitnesses that correspond to an individual of interest are determined. On the basis of the estimated values, a new individual is generated, of which the parameters are fed to the optimization target and the storage. On the basis of the estimated values obtained, the population to be evaluated is further evaluated in accordance with the multi-objective evolutionary algorithm. This results in the generation of the Pareto-optimal population.

In this case, the sampled values that correspond to each of the individuals stored in the storage are weighted, and the linear sum of the weighted sampled values is determined. Thus, estimated values of fitnesses that correspond to the individual of interest can be obtained.

Since the weight for each individual is the function that contains the distance between the individual of interest and the other individuals on the parameter space, the estimated values in which deviations from the true fitnesses are sufficiently small can be obtained. Therefore, an appropriate Pareto-optimal population may be achieved even when the sampled values outputted from the optimization target have uncertainty.

In addition, the estimated values that correspond to the plurality of individuals of the population to be evaluated are subjected to the dominance comparison for each of the plurality of fitness functions, followed by weighting the results obtained for each of the plurality of fitness functions. Then, on the basis of the linear sum of the plurality of obtained results which are weighted for the plurality of fitness functions, the plurality of individuals of the population to be evaluated are ranked.

This allows weak Pareto-optimal individuals to be eliminated. Also, the weak Pareto-optimal individuals are prevented from being determined as Pareto-optimal individuals when the sampled values of fitnesses are noisy because of the uncertainty of the optimization target. Accordingly, reasonable Pareto-optimal individuals in consideration of the relationship between the plurality of fitnesses may be achieved, even for the optimization target having uncertainty.

Furthermore, the new individual is generated on the basis of the index of distribution which indicates the degree of sparseness on the distribution of the individuals at the highest rank on the fitness function space. This allows individuals to be generated evenly over a broad range of the fitness function space. Thus, Pareto-optimal individuals having diversity can be obtained in a short time.

The foregoing and other elements, steps, characteristics, features, aspects and advantages of the present invention will become more apparent from the following detailed description of preferred embodiments of the present invention when taken in conjunction with the accompanying drawings.

BRIEF DESCRIPTION OF THE DRAWINGS

FIG. 12 is a flowchart showing the processes of crowding distance sorting which are performed by the multiobjective evolutionary algorithm unit;

FIG. 15 is a schematic diagram showing a model of a noisy fitness function;

FIG. 24 is a table showing indices of distribution extended to an m-objective optimization problem;

FIG. 27 is a block diagram showing an example of the application of the multiobjective optimization apparatus to a motor simulator;

FIGS. 28(*a*), 28(*b*), and 28(*c*) show the conditions of the multiobjective optimizations in Comparative Example 1 and Inventive Example 1;

FIGS. 30(*a*), 30(*b*) and 30(*c*) are tables showing the conditions of the multiobjective optimizations in Comparative Example 2 and Inventive Example 2;

FIG. 32 is a table showing the conditions of the multiobjective optimization in Inventive Example 3;

DETAILED DESCRIPTION OF PREFERRED EMBODIMENTS

First Preferred Embodiment

A multiobjective optimization apparatus according to a first preferred embodiment of the present invention will be described first, referring to FIG. 1.

(a) Functional Configuration of Multiobjective Optimization Apparatus

Figure 1:
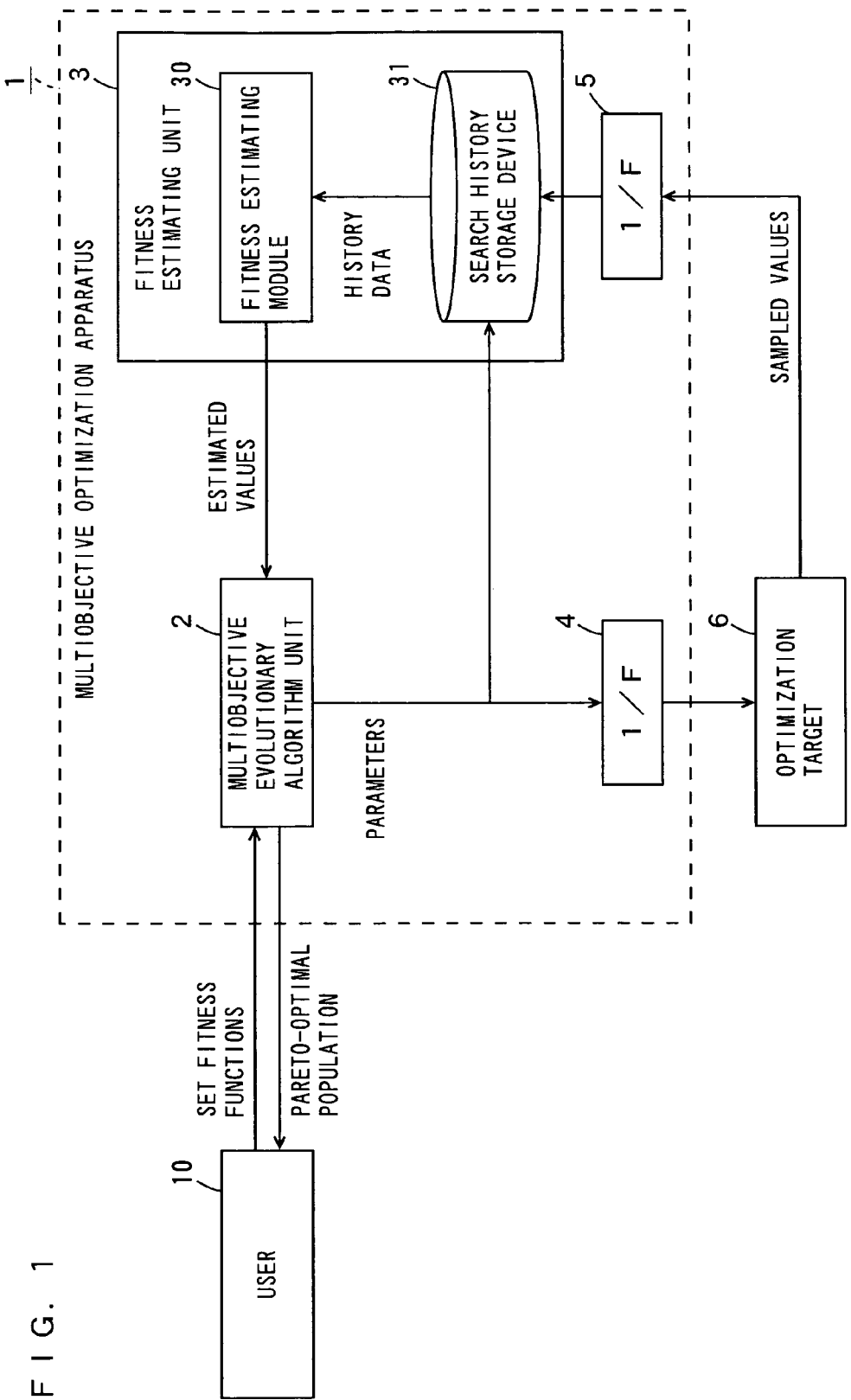
FIG. 1 is a block diagram showing the functional configuration of a multiobjective optimization apparatus according to a first preferred embodiment of the invention.

FIG. 1 is a block diagram showing the functional configuration of the multiobjective optimization apparatus according to the first preferred embodiment of the present invention.

The multiobjective optimization apparatus 1 of FIG. 1 computes a Pareto-optimal population for a multiobjective optimization problem using a multiobjective genetic algorithm (GA) as a multiobjective evolutionary algorithm. The multiobjective optimization apparatus 1 is connected to a target 6 to be optimized.

The optimization target 6 is an evaluation system that evaluates the performance of equipment. The evaluation system is an evaluation apparatus that evaluates a real system or a simulator that contains probability factors. The real system may preferably be an engine or motor, for example, and the evaluation apparatus may preferably be an engine evaluating apparatus or motor evaluating apparatus. The simulator may preferably be an engine simulator or motor simulator, for example. In this preferred embodiment, the optimization target 6 is preferably an engine evaluating apparatus, but the present invention is not limited to this.

The multiobjective optimization apparatus 1 preferably includes a multiobjective evolutionary algorithm unit 2, a fitness estimating unit 3, an output interface 4, and an input interface 5. The fitness estimating unit 3 preferably includes a fitness estimating module 30 and a search history storage device 31.

The multiobjective evolutionary algorithm unit 2 and the fitness estimating module 30 in the fitness estimating unit 3 are preferably implemented by a CPU 101 (FIG. 2) shown below executing a multiobjective optimization program. The search history storage device 31 is preferably embodied by an external storage device 106 (FIG. 2) shown below.

A user 10 sets a plurality of fitness functions (objective functions) for the multiobjective evolutionary algorithm unit 2. In the present preferred embodiment, the plurality of fitness functions preferably include more than one of fuel consumption, torque, and concentrations of components contained in the exhaust gas of an engine, such as CO (carbon monoxide), HC (hydrocarbons), or $NO_x$ (nitrogen oxides).

Examples of the fitness functions having trade-off relationships are torque/air-fuel ratio, torque/CO concentration, torque/HC concentration, air-fuel ratio/$NO_x$ concentration, CO concentration/$NO_x$ concentration, and HC concentration/$NO_x$ concentration.

In multiobjective genetic algorithms, "individuals" refer to solution candidates for a multiobjective optimization problem, each having a set of a plurality of parameters and a plurality of fitnesses. The parameters are adjustable values, which are referred to as "genes" in genetic algorithms. Examples of the parameters include the amount of injected fuel, fuel injection timing, ignition timing, or degree of opening of a throttle. The fitness is a fitness function value. The individuals in multiobjective genetic algorithms will simply be referred to as individuals.

The multiobjective evolutionary algorithm unit 2 receives estimated values of true fitnesses which are computed by the fitness estimating module 30 as will be described below, and feeds a set of parameters of an individual to the search history storage device 31 in the fitness estimating unit 3 and to the optimization target 6 through the output interface 4.

The optimization target 6 outputs a set of sampled values of fitnesses on the basis of the set of parameters of the individual obtained from the multiobejctive optimization apparatus 1. Each of the sampled values outputted from the optimization target 6 includes a true fitness and noise component, as will be described below. The sampled values will be described in more detail below.

The set of sampled values outputted from the optimization target 6 is inputted through the input interface 5 to the search history storage device 31 in the fitness estimating unit 3. The search history storage device 31 stores sets of parameters of individuals and sets of sampled values as a search history. Each set of parameters of individual and sampled values which are contained in the search history will be referred to as history data.

The fitness estimating module 30 computes a set of estimated values of true fitnesses on the basis of the history data of the search history which is stored in the search history storage device 31, and feeds the set of estimated values to the multiobjective evolutionary algorithm unit 2. The estimated values of true fitnesses will simply be referred to as the estimated values of fitnesses or the estimated values.

On the basis of a plurality of sets of estimated values, the multiobjective evolutionary algorithm unit 2 generates a plurality of individuals which are subjected to a multiple point search, and evaluates fitness functions using Pareto-optimality, thereby simultaneously determining a Pareto-optimal population in accordance with the genetic algorithm. The multiobjective evolutionary algorithm unit 2 also presents the Pareto-optimal population obtained by the user 10.

In this manner, the multiobjective evolutionary algorithm unit 2 and the fitness estimating unit 3 co-operate to optimize the parameters of individuals.

The operations of the multiobjective evolutionary algorithm unit 2 and fitness estimating unit 3 will be described in more detail below.

(b) Hardware Configuration of Multiobjective Optimization Apparatus

Figure 2:
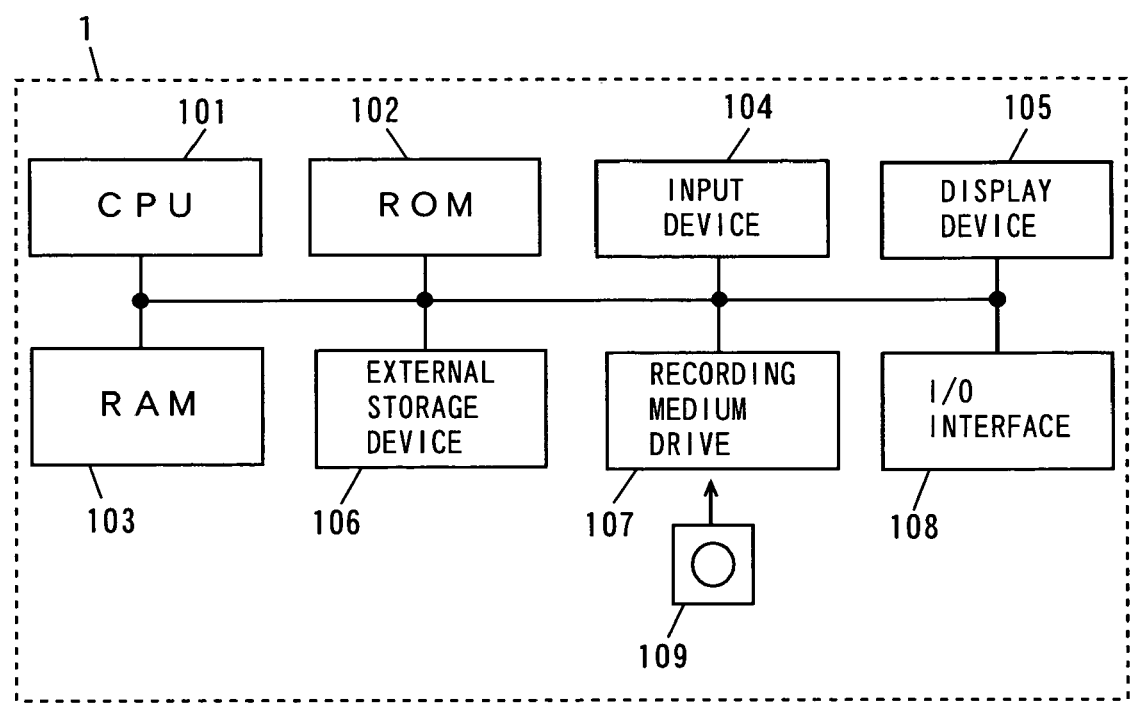
FIG. 2 is a block diagram showing the hardware configuration of the multiobjective optimization apparatus of FIG. 1.

FIG. 2 is a block diagram showing the hardware configuration of the multiobjective optimization apparatus 1 of FIG. 1.

The multiobjective optimization apparatus 1 preferably includes a CPU (Central Processing Unit) 101, a ROM (Read Only Memory) 102, a RAM (Random Access Memory) 103, an input device 104, a display device 105, an external storage device 106, a recording medium drive 107, and an input/output interface 108.

The input device 104, which preferably includes a keyboard or mouse, for example, is used for input of a variety of instructions and data. The ROM 102 stores a system program. The recording medium drive 107, which preferably includes a CD (Compact Disk) drive, DVD (Digital Versatile Disk) drive, or flexible disk drive, for example, reads from or writes to a recording medium 109 that is a CD, DVD, or flexible disk, for example.

The recording medium 109 stores the multiobjective optimization program. The external storage device 106, which preferably includes a hard disk, for example, stores the multiobjective optimization program and variety of data which are read from the recording medium through the recording medium drive 107. The CPU 101 executes the multiobjective optimization program stored in the external storage device 106 on the RAM 103.

The display device 105, which preferably includes a liquid crystal display panel, CRT (Cathode Ray Tube), etc., displays a variety of images such as a Pareto-optimal population. The I/O interface 108 includes the output interface 4 and input interface 5 of FIG. 1. The I/O interface 108 is connected with the optimization target 6 via wireless or wire communication. The I/O interface 108 transfers the set of sampled values which is outputted from the optimization target 6 to the external storage device 106, while feeding the set of parameters of an individual generated by the multiobjective optimization program to the optimization target 6.

Note that the recording medium 109 that stores the multiobjective optimization program may include a variety of recording mediums such as a semiconductor memory including a ROM or a hard disk. The multiobjective optimization program may alternatively be downloaded onto the external storage device 106 via a communication medium such as a communication line, for example, for execution on the RAM 103.

Note that the recording medium 109 may include any computer-readable recording mediums which can be read electronically, magnetically, optically, and in various other ways. In addition to the above-mentioned CD, DVD, and flexible disk, examples of the recording medium 109 may include optically readable recording mediums such as CDV (Compact Disk Video), semiconductor recording mediums such as RAM or ROM, magnetic recording mediums such as a hard disk, and magnetic recording/optically readable mediums such as MO (magneto-optical disk).

(c) Configuration of Optimization Target

Figure 3:
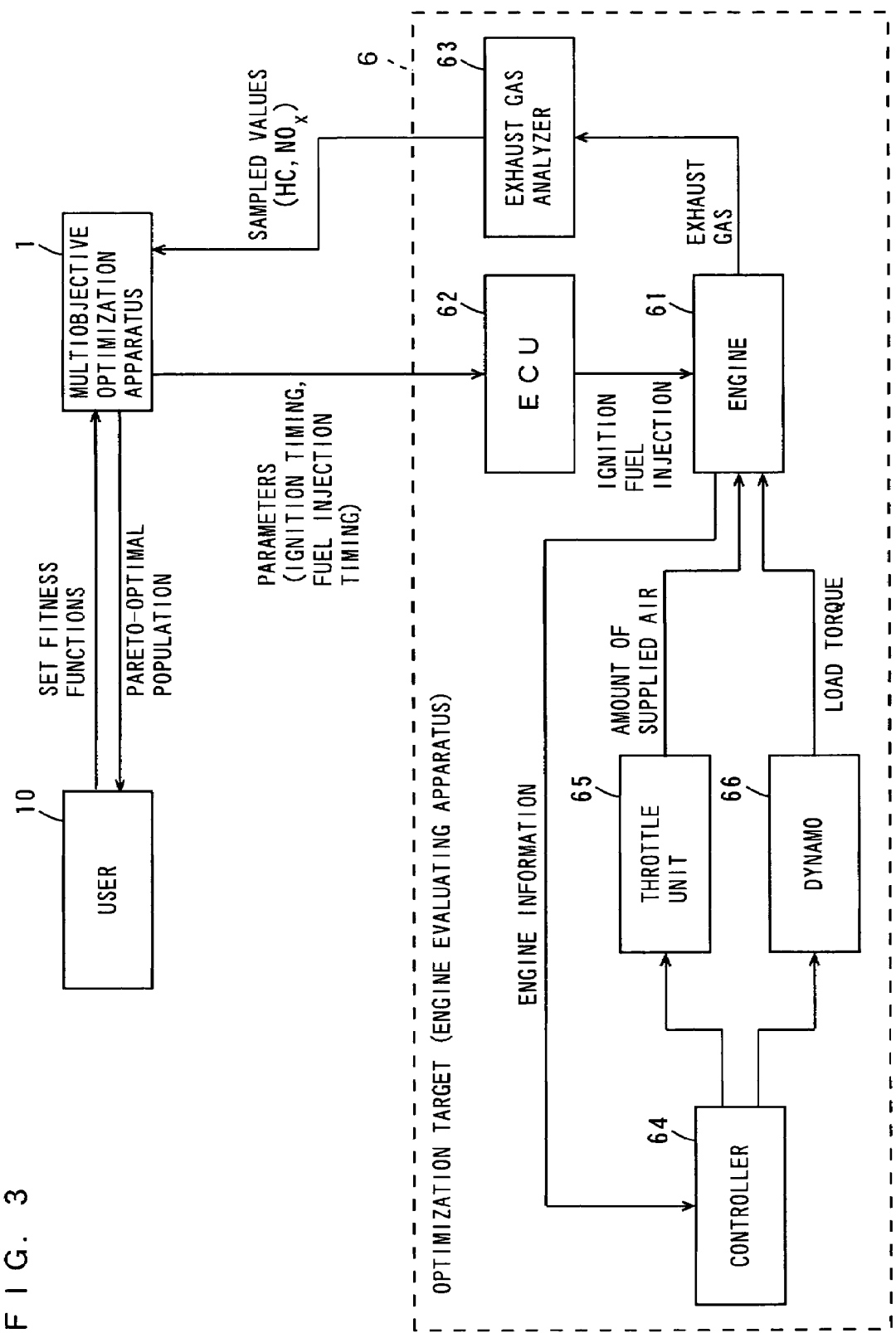
FIG. 3 is a block diagram showing an example of the configuration of the optimization target.

FIG. 3 is a block diagram showing an example of the configuration of the optimization target 6. The optimization target 6 of FIG. 3 is an engine evaluating apparatus.

The optimization target 6 includes an engine 61, an ECU (Engine Control Unit) 62, an exhaust gas analyzer 63, a controller 64, a throttle unit 65, and a dynamo 66.

The ECU 62 receives a set of parameters from the multiobjective optimization apparatus 1 via serial communication. In this preferred embodiment, the set of parameters are preferably ignition timing and fuel injection timing. The ECU 62 controls the ignition timing and fuel injection timing of the engine 61 on the basis of the set of parameters. The engine 61 sends engine information that includes the number of revolutions, air-fuel ratio, etc. to the controller 64.

The controller 64 controls the throttle unit 65 and dynamo 66 on the basis of the engine information. The throttle unit 65 controls the torque produced by the engine 61 by adjusting the amount of air supplied to the engine 61. The dynamo 66 controls load torque.

The exhaust gas analyzer 63 analyzes components included in the exhaust gas from the engine 61, and outputs HC concentration and $NO_x$ concentration as a set of sampled values to the multiobjective optimization apparatus 1 via serial communication.

Figure 4:
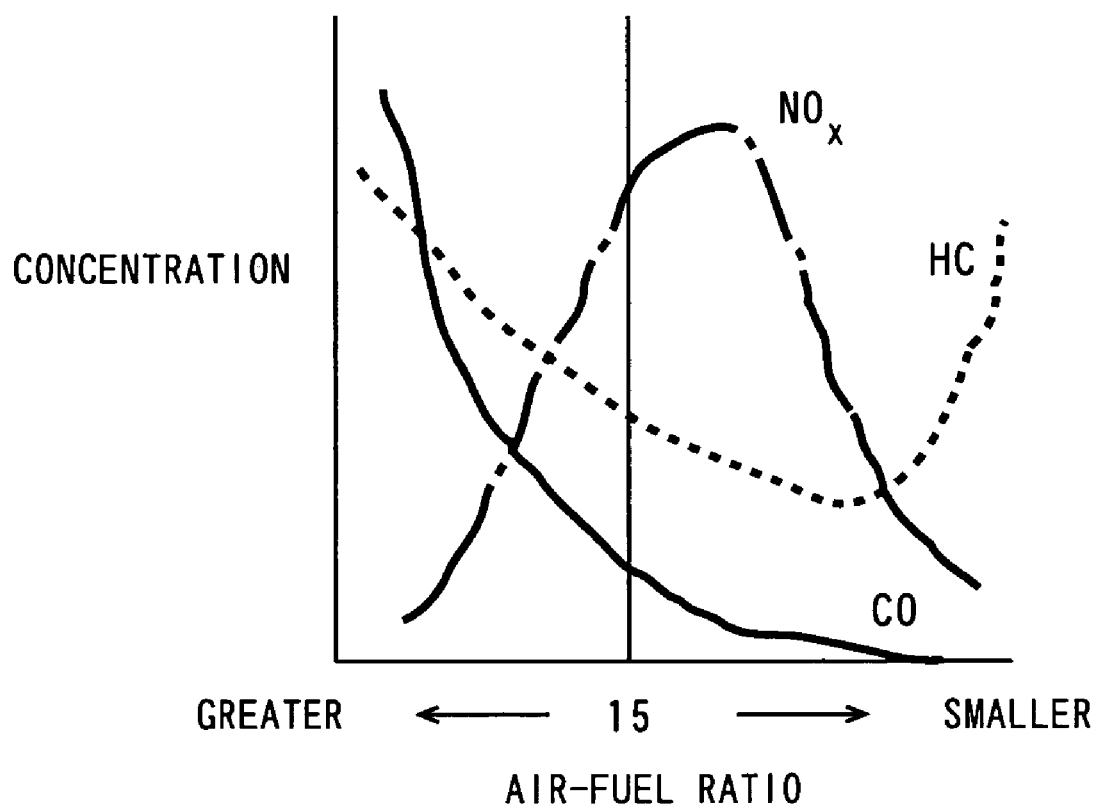
FIG. 4 is a graph showing the relationship between HC concentration, $NO_x$ concentration, and CO concentration and air-fuel ratio.

FIG. 4 is a graph showing the relationship between the HC concentration, $NO_x$ concentration, and CO concentration and the air-fuel ratio.

Complete combustion of fuel results in an exhaust gas containing carbon dioxide and water. Combustion conditions, however, vary with changing driving conditions, which results in an exhaust gas containing CO, HC, and $NO_x$.

As shown in FIG. 4, with small air-fuel ratios, the HC concentration and $NO_x$ concentration are low. The $NO_x$ concentration reaches a maximum when the air-fuel ratio is somewhat smaller than a theoretical air-fuel ratio (14.7), and otherwise decreases. Near the theoretical air-fuel ratio, the HC concentration and $NO_x$ concentration have a tradeoff relationship, and so do the CO concentration and $NO_x$ concentration.

The optimization target 6 of FIG. 3 receives the ignition timing and fuel injection timing as the set of parameters of an individual from the multiobjective optimization apparatus 1, and outputs the HC concentration and $NO_x$ concentration as the set of sampled values.

(d) Overall Processes of Multiobjective Optimization Apparatus

Figure 5:
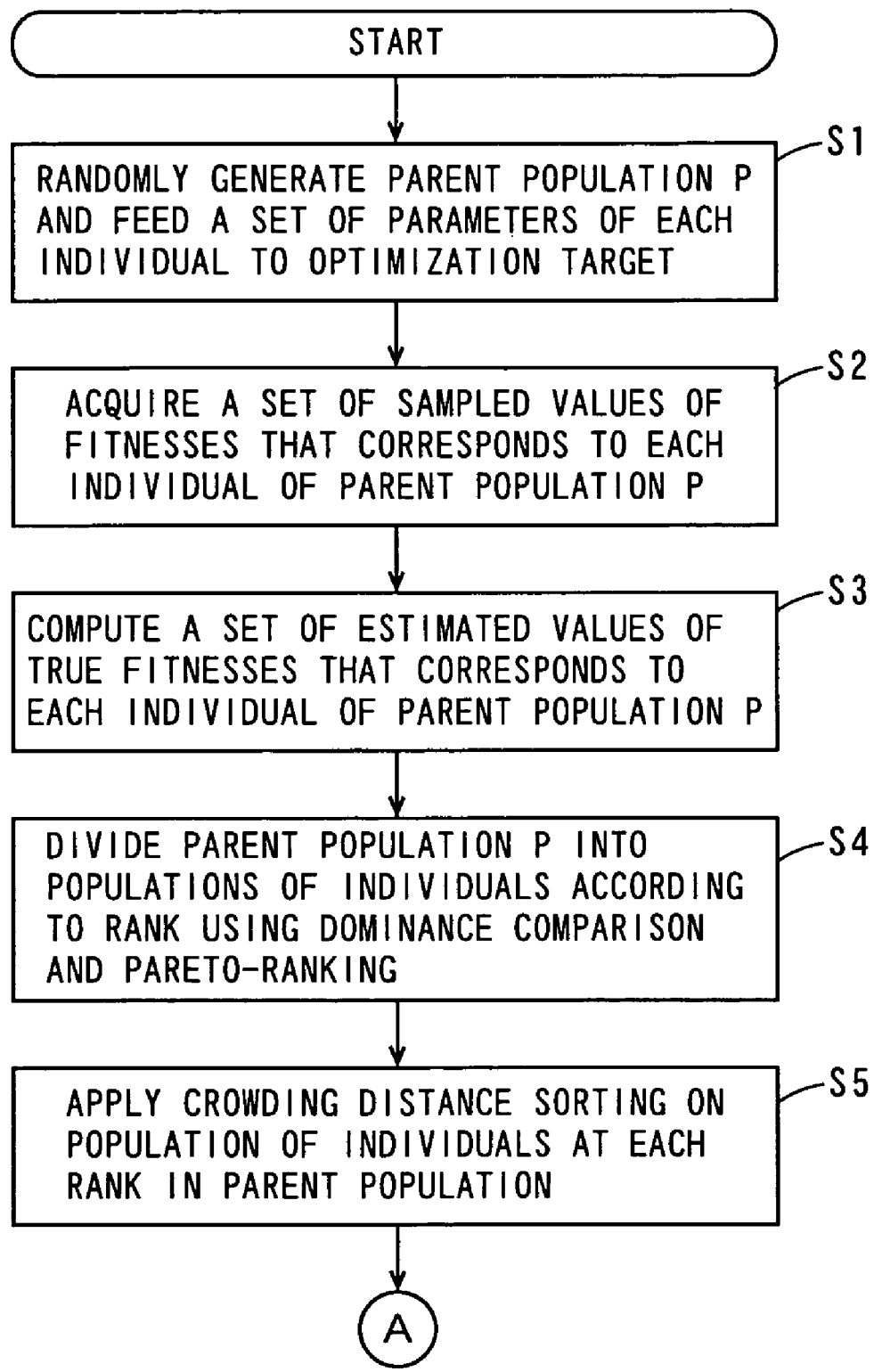
FIG. 5 is a flowchart showing the overall processes which are performed by the multiobjective optimization apparatus of FIG. 1.
Figure 6:
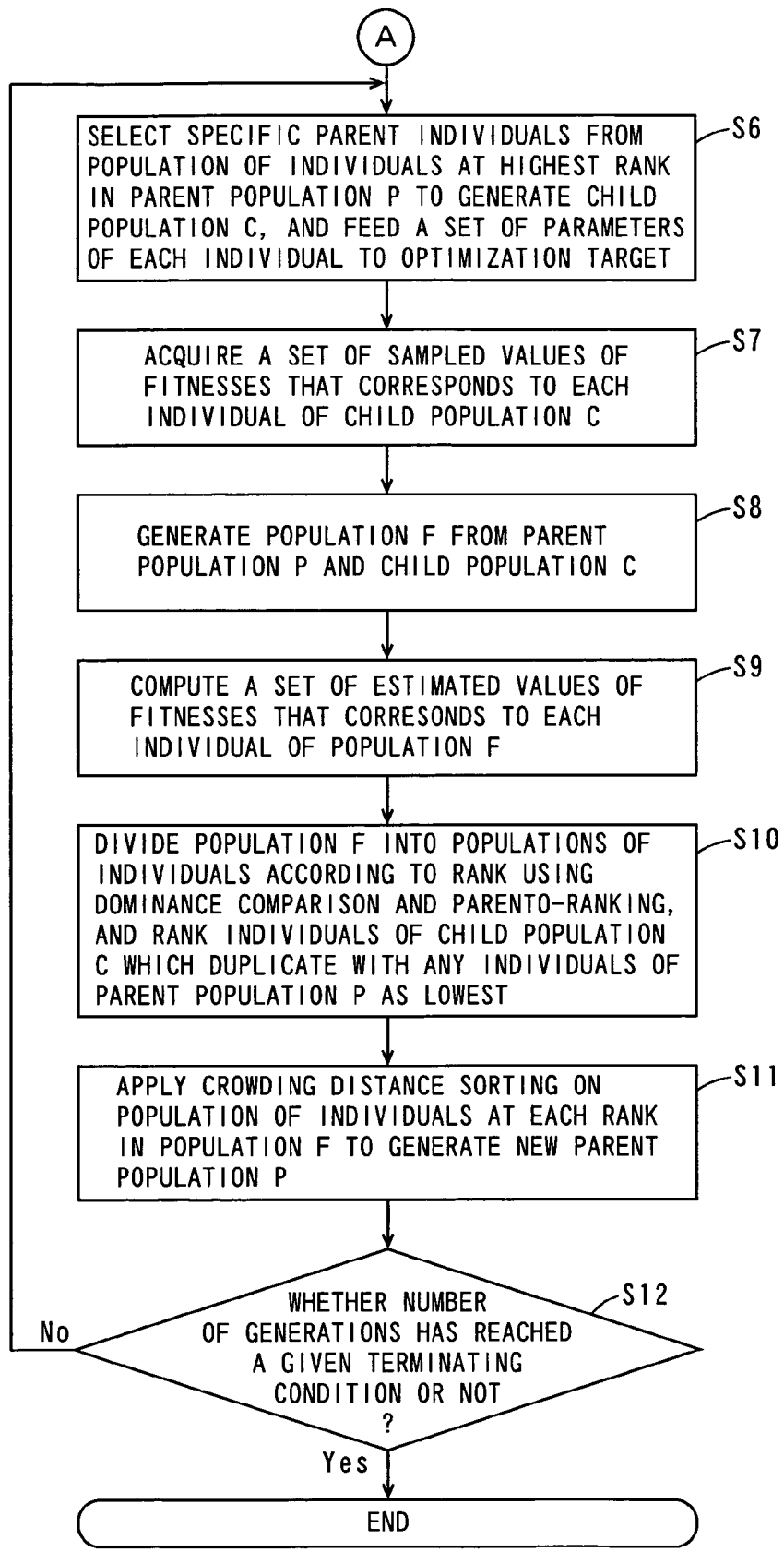
FIG. 6 is a flowchart showing the overall processes which are performed by the multiobjective optimization apparatus of FIG. 1.
Figure 7:
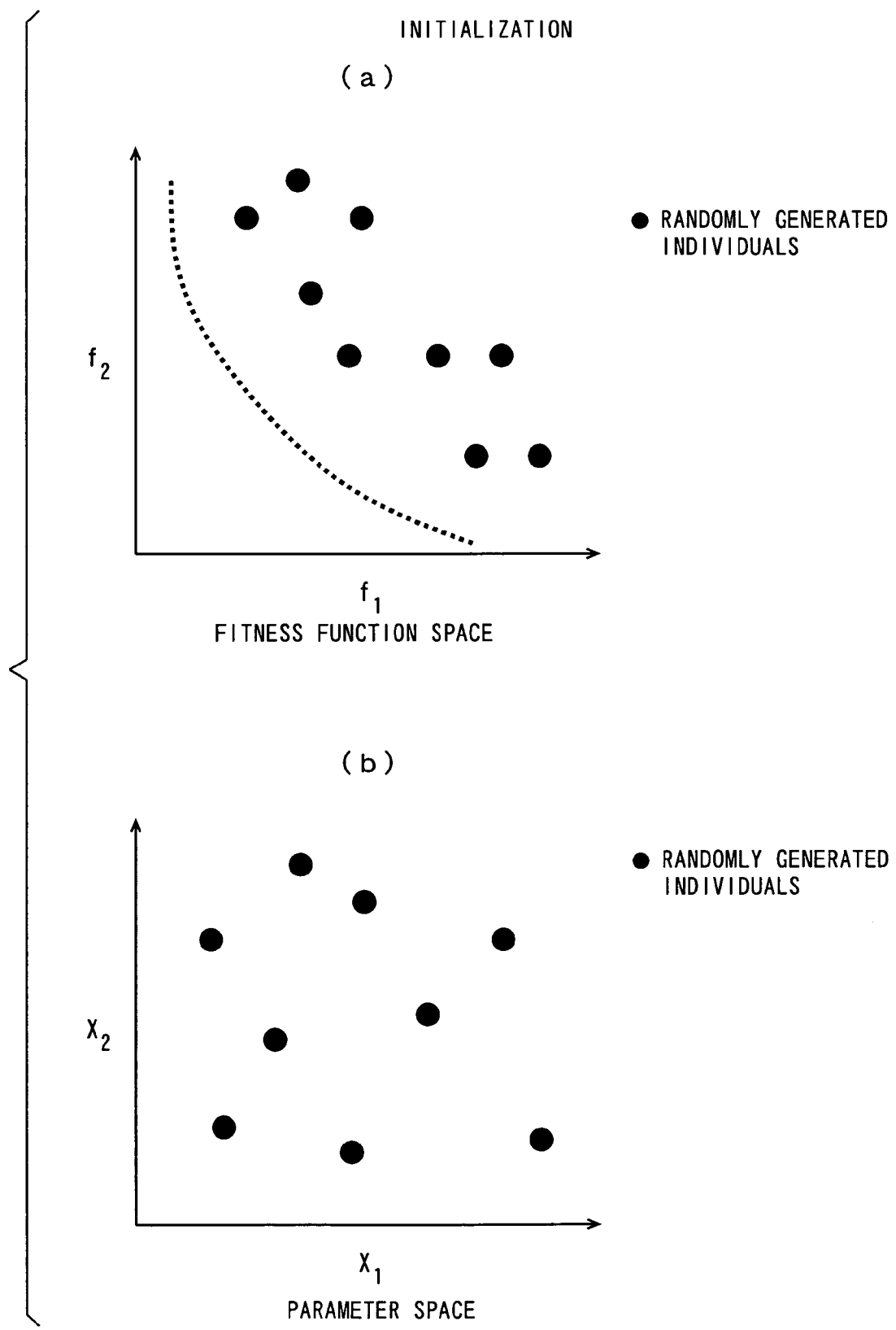
FIGS. 7($a$) and 7($b$) are schematic diagrams showing the parent populations generated by initialization.

FIG. 5 and FIG. 6 are flowcharts showing the overall processes which are performed by the multiobjective optimization apparatus 1 of FIG. 1.

As shown in FIG. 5, upon initiation of optimization processes, the multiobjective evolutionary algorithm unit 2 randomly generates a parent population P as an initial population of individuals within the range defined for each parameter, thereby initializing the parent population P. Then, the multiobjective evolutionary algorithm unit 2 feeds a set of parameters of each individual of the generated parent population P sequentially to the optimization target 6 (Step S1). This causes the optimization target 6 to sequentially output a set of sampled values of fitnesses.

If there is a Pareto-optimal population known as prior knowledge, these Pareto-optimal individuals may be used as part of the initial population of individuals. This may provide improved convergence in searching for Pareto-optimal individuals.

The search history storage device 31 in the fitness estimating unit 3 acquires from the optimization target 6 the set of sampled values that corresponds to each of the individuals in the parent population P, and stores sets of parameters and sets of sampled values for the parent population P as a search history (Step S2).

After this, the fitness estimating module 30 in the fitness estimating unit 3 computes a set of estimated values of fitnesses for each individual of the parent population P on the basis of the sets of sampled values that correspond to the plurality of individuals which are stored in the search history storage device 31 (Step S3). How the estimated values of fitnesses are computed will be described below.

The multiobjective evolutionary algorithm unit 2 then divides the parent population P into populations of individuals according to rank, using dominance comparison and Pareto-ranking on the basis of the sets of estimated values of fitnesses (Step S4). Pareto-ranking will be described below.

The multiobjective evolutionary algorithm unit 2 subsequently applies crowding distance sorting on the population of individuals at each rank in the parent population P (Step S5). This causes the individuals at each rank to be arranged in the order of greater crowding factor (crowding distance). Crowding distance sorting will later be discussed. A given number of individuals that have a greater crowding factor at a higher rank are then selected, while the other individuals are eliminated.

After this, the multiobjective evolutionary algorithm unit 2 selects three specific parent individuals from the population of individuals at the highest rank (the rank 1) of the parent population P, and also applies crossover operation on the three parent individuals thereby generating a child population C. The multiobjective evolutionary algorithm unit 2 then feeds a set of parameters of each individual of the obtained child population C sequentially to the optimization target 6 (Step S6). This causes the optimization target 6 to sequentially output a set of sampled values of fitnesses.

As used herein, the crossover operation means generating newer individuals by combining the genes of individuals. How the specific parent individuals are selected will be described below.

The search history storage device 31 in the fitness estimating unit 3 acquires from the optimization target 6 the set of sampled values of fitnesses that corresponds to each individual of the child population C. The search history storage device 31 then stores the set of parameters and set of sampled values that correspond to each individual as a search history (Step S7).

After this, the multiobjective evolutionary algorithm unit 2 generates a population F from the child population C and the parent population P (Step S8).

The fitness estimating module 30 in the fitness estimating unit 3 computes a set of estimated values of fitnesses for each individual of the population F on the basis of the plurality of sets of sampled values which are stored in the search history storage device 31 (Step S9).

The multiobjective evolutionary algorithm unit 2 divides the population F into populations of individuals according to rank using dominance comparison and Pareto-ranking on the basis of the sets of estimated values of fitnesses, and then ranks the individuals of child population C that is a duplicate of any individuals of the parent population P as the lowest (Step S10).

Then, the multiobjective evolutionary algorithm unit 2 applies crowding distance sorting on the population of individuals at each rank in the population F to generate a new parent population P (Step S11). This causes the individuals at each rank to be arranged in the order of greater crowding factor (crowding distance). Crowding distance sorting will later be discussed. A given number of individuals that have a greater crowding factor at a higher rank are then selected, while the other individuals are eliminated.

After this, the multiobjective evolutionary algorithm unit 2 determines whether or not the number of generations has reached a given terminating condition (Step S12).

Note that the generation includes the selection step of selecting parent individuals from a population of individuals; the crossover step of generating new child individuals by crossover; and the generation altering step of shuffling the parent individuals and child individuals. When determining that the number of generations has not reached a given terminating condition, the multiobjective evolutionary algorithm unit 2 moves back to Step S6. When determining that the number of generations has reached a given terminating condition, the multiobjective evolutionary algorithm unit 2 presents the user with the parent population P obtained at Step S11 as a Pareto-optimal population to finish the processes.

(e) Specific Example of Each of the Processes By Multiobjective Optimization Apparatus FIG. 7 to FIG. 12 are schematic diagrams showing the specific example of each of the processes performed by the multiobjective optimization apparatus 1.

FIGS. 7 to 12 show examples of two parameters $x_1$, $x_2$ and two fitness functions $f_1$, $f_2$. With the optimization target 6 in FIG. 3, the parameters $x_1$, $X_2$ are preferably the ignition timing and fuel injection timing, while the fitness functions $f_1$, $f_2$ are preferably the HC concentration and $NO_x$ concentration.

(e-1) Initialization of Parent Population

FIGS. 7(a) and 7(b) are schematic diagrams showing parent populations which are generated by initialization. FIG. 7(a) shows a parent population in the fitness function space, and FIG. 7(b) shows a parent population in the parameter space. As shown, upon initialization, a plurality of individuals are randomly generated in the fitness function space and the parameter space.

(e-2) How To Evaluate Individuals

Since in multiobjective optimization problems, each individual has fitnesses that correspond to a plurality of fitness functions, it is not possible to determine the dominance of one individual over another simply by comparing the values. In this preferred embodiment, the individuals are evaluated using dominance comparison, Pareto-ranking, and crowding distance sorting, as will be described below.

(e-2-1) Dominance Comparison

Description will now be made of the dominance comparison at Step S4 of FIG. 5 and Step S10 of FIG. 6. The dominance comparison uses α-domination strategy shown below. Refer to Document 5, for example, for detailed explanation of the α-domination strategy.

Figure 8:
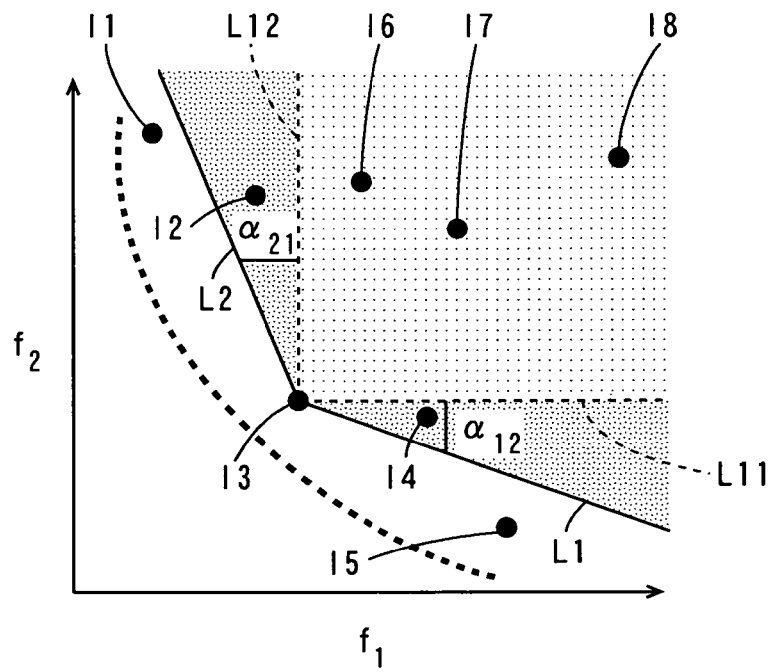
FIG. 8 is a schematic diagram for use in illustrating $\alpha$-domination strategy.

FIG. 8 is a schematic diagram for use in illustrating the α-domination strategy. In general, the α-domination strategy is defined as follows:

If $g_k$ (x1, x2) which is expressed in the equation (8) below satisfies the relationship shown below for the two solutions x1, x2∈F of p objective functions $f_k$ (k=1, ..., p), then the solution x1 α-dominates the solution x2:

$$g_k(x1, x2) \le 0 (\forall k = 1, \ldots, p) \land g_k(x1, x2) < 0 (\exists k = 1, \ldots, p) \quad (8)$$

$$g_k(x_1, x_2) = f_k(x_1) - f_k(x_2) + \sum_{j \ne k}^{1 \ldots P} \alpha_{kj}(f_j(x_1) - f_j(x_2))$$

where $f_k$ (x1) and $f_j$ (x1) are the values of the objective functions $f_k$ and $f_j$ for the solution x1, respectively, and $f_k$ (x2) and $f_j$ (x2) are the values of the objective functions $f_k$ and $f_j$ for the solution x2, respectively. In multiobjective genetic algorithms, the solution x1 and solution x2 correspond to individuals, whereas the objective functions $f_k$ and $f_j$ correspond to fitness functions.

Now refer to FIG. 8, where attention should be paid to an individual I3. With the general dominance comparison, the straight-line L11 that extends from the individual I3 in parallel with the fitness function $f_1$ and the straight-line L12 that extends from the individual I3 in parallel with the fitness function $f_2$ define a region where the individual I3 dominates other individuals. That is, the individual I3 dominates the other individuals I6, I7, I8 which lie above the straight-line 11 and on the right side of the straight-line L12. The individuals I2, I4 are not dominated by the individual I3.

The individual I2 is slightly superior to the individual I3 in the fitness function $f_1$, while being considerably inferior in the fitness function $f_2$. The individual I4 is slightly superior to the individual I3 in the fitness function $f_2$, while being considerably inferior in the fitness function $f_1$. When the fitnesses of the individuals I2, I4 have such uncertainty as noise, it is possible that the individuals I2, I4 may be dominated by the individual I3.

With the α-domination strategy, on the other hand, the straight-line L1 that inclines from the individual I3 toward the axis of fitness function $f_1$ and the straight-line L2 that inclines from the individual I3 toward the axis of fitness function $f_2$ define a region where the individual I3 dominates the other individuals. That is, the individual I3 dominates the individuals I2, I4, I6, I7, I8 which lie above the straight-line L1 and on the right side of the straight-line L2. With the α-domination strategy, the individuals I2, I4 are excluded from the Pareto-optimal individuals.

In the present preferred embodiment, with the α-domination strategy, the individuals are subjected to the dominance comparison on the basis of a weighted linear sum of the estimated values of the plurality of fitnesses. With the α-domination strategy, degradation by one in one fitness of a given individual results in degradation by α in the other fitnesses. That is, the dominance of one fitness affects the dominance of the other fitnesses in the dominance comparison. This allows determining reasonable solutions considering the relationship between the plurality of fitnesses.

A weak Pareto-optimal individual is a solution in which at least one of the plurality of fitnesses is not dominated by other individuals (i.e., it equals a given Pareto-optimal solution in at least one fitness). Although such a weak Pareto-optimal individual has an optimal solution with respect to one fitness function, it is inferior in the other fitness functions to Pareto-optimal solutions. The weak Pareto-optimal individual accordingly cannot be said to be a reasonable solution which needs to be found in the first place. Thus, the introduction of the α-domination strategy allows elimination of the weak Pareto-optimal individual.

Another problem is that for a weak Pareto-optimal individual with fitnesses having uncertainty, it may become a Pareto-optimal individual because of the uncertainty. A weak Pareto-optimal individual that is determined as a Pareto-optimal individual because of the uncertainty will continue to survive in the population without being eliminated, causing a delay in searching for Pareto-optimal individuals. Thus, the introduction of the α-domination strategy allows elimination of such a weak-Pareto optimal individual which may be determined as a Pareto-optimal individual.

Figure 9:
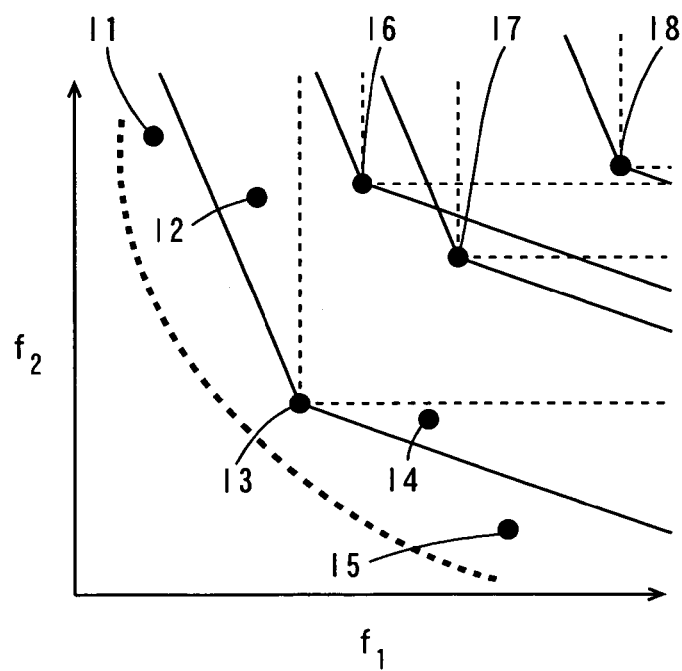
FIG. 9 is a schematic diagram for use in illustrating dominance comparison of individuals using the $\alpha$-domination strategy.

FIG. 9 is a schematic diagram for use in illustrating the dominance comparison of individuals using the α-domination strategy.

In FIG. 9, the individual I3 dominates the individuals I2, I4, I5, I6, I7, the individual I6 dominates the individual I8, and the individual I7 dominates the individual I8. There is no solution that dominates the individuals I1, I3, I5. This makes the individuals I1, I3, I5 the Pareto-optimal individuals.

(e-2-2) Pareto-Ranking

Figure 10:
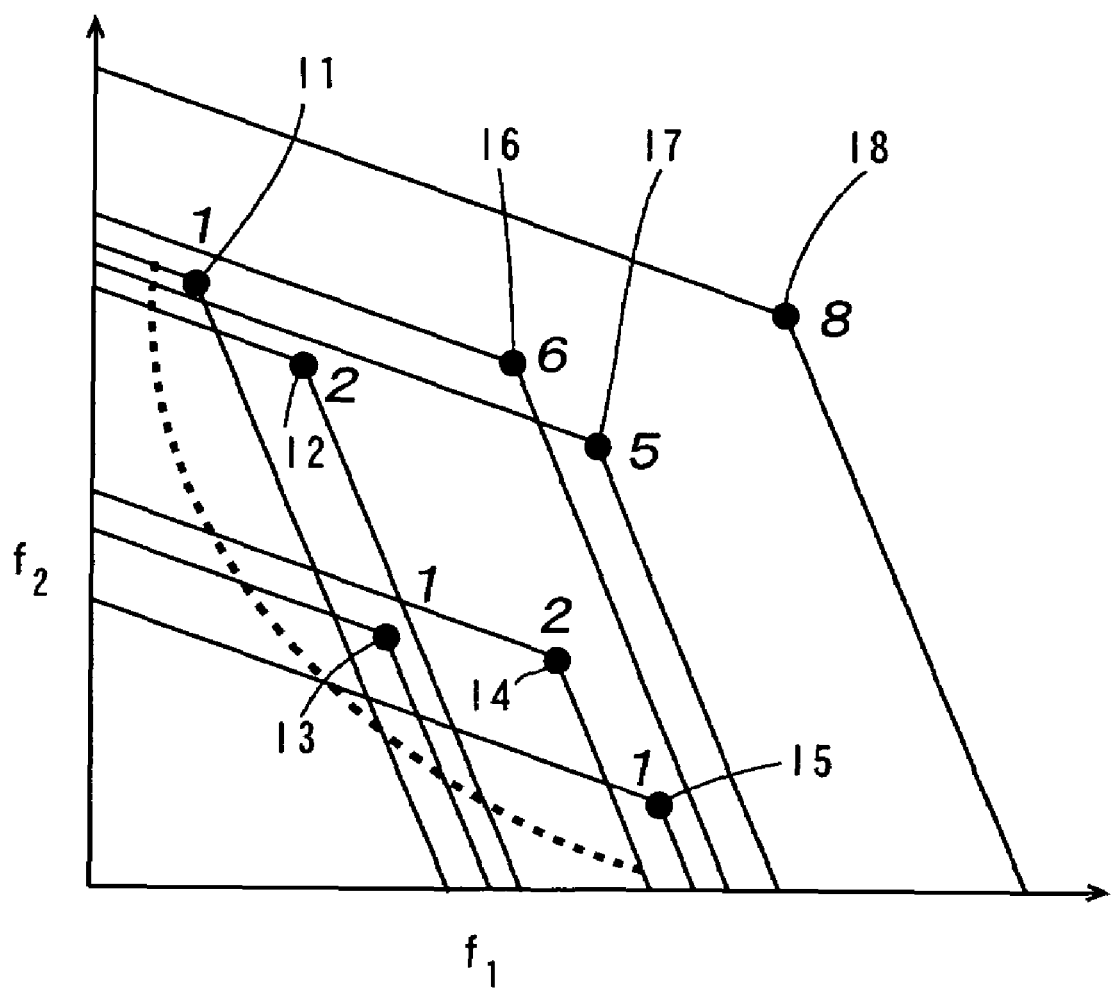
FIG. 10 is a diagram for use in illustrating Pareto-ranking.

Description will now be made of the Pareto-ranking at Step S4 of FIG. 5 and at Step S10 of FIG. 6. FIG. 10 is a diagram for use in illustrating the Pareto-ranking. The Pareto-ranking involves determining a Pareto-optimal population based on the rank of each individual.

A rank $r(x_i)$ of an individual $x_i$ that is dominated by $p_i$ individuals is given by $r(x_i)=1+p_i$ In this example, the highest rank is defined as a rank 1, and ranks above that number will be ranked lower with increasing number.

In FIG. 10, the individuals I1, I3, I5 are not dominated by the other individuals. The individuals I1, I3, I5 are accordingly ranked 1. The individuals I2, I4 are dominated by the one individual I3. The individuals I2, I4 are accordingly ranked 2. Similarly, the individual I6 is ranked 6, the individual I7 is ranked 5, and the individual I8 is ranked 8.

(e-2-3) Crowding Distance Sorting

Figure 11:
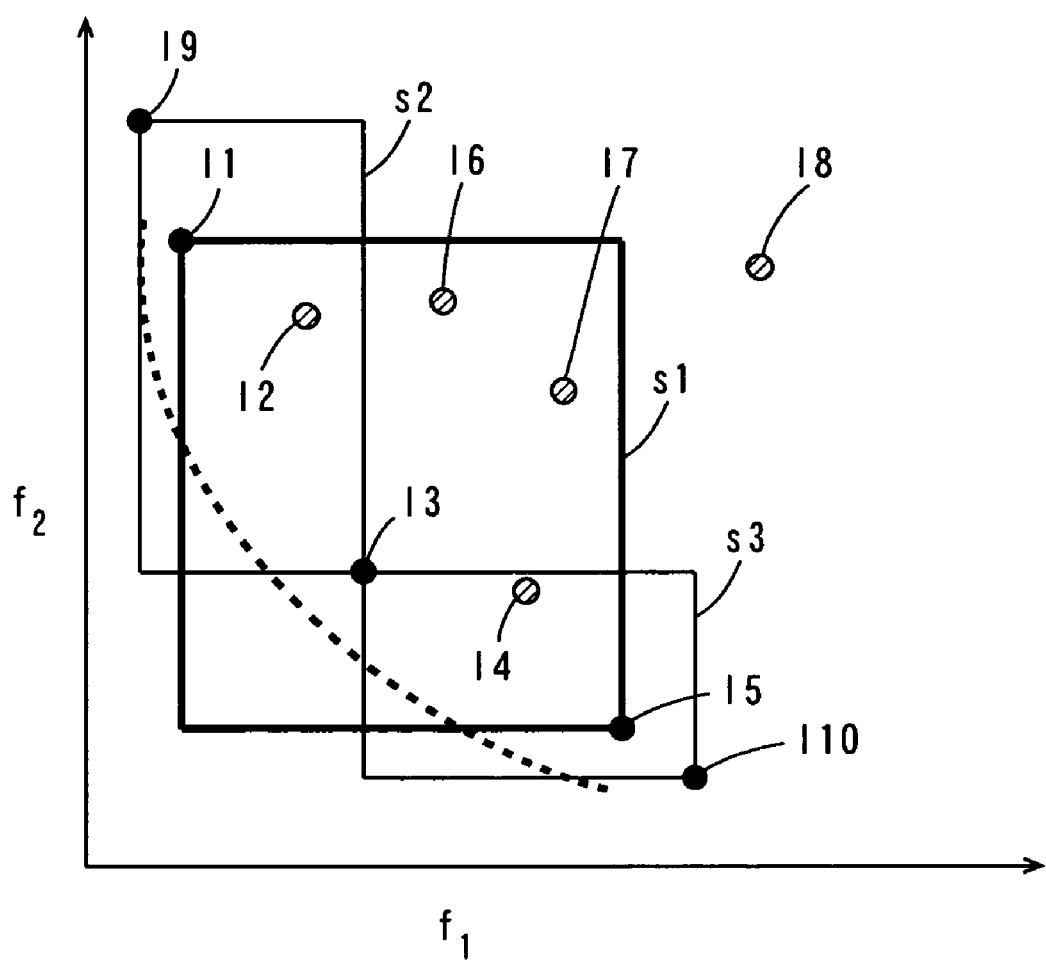
FIG. 11 is a schematic diagram for use in illustrating crowding distance sorting.

Description will be made of the crowding distance sorting at Step S5 of FIG. 5 and at Step S11 of FIG. 6. FIG. 11 is a schematic diagram for use in illustrating the crowding distance sorting.

The crowding distance sorting involves, for each of individuals of interest at the same rank, assuming a rectangle having a diagonal of a line that connects two individuals adjacent to an individual of interest, and representing the sum of the lengths of vertical and horizontal sides of the rectangle as a crowding factor (crowding distance). The smaller the crowding factor, the more crowded the region where the individual of interest exists. Individuals at the ends of the same rank provide a maximum crowding factor.

In FIG. 11, the crowding factor of the individual I3 is represented by a sum of the vertical and horizontal sides of a rectangle s1 which is formed by the adjacent individuals I1, I5. The crowding factor of the individual I1 is represented by a sum of the vertical and horizontal sides of a rectangle s2 which is formed by the adjacent individuals I9, I3. The crowding factor of the individual I5 is represented by a sum of the vertical and horizontal sides of a rectangle s3 which is formed by the adjacent individuals I3, I10.

FIG. 12 is a flowchart showing the processes of crowding distance sorting which are performed by the multiobjective evolutionary algorithm unit 2.

The multiobjective evolutionary algorithm unit 2 first sorts a population of individuals for each fitness function, and investigates, for each fitness function, two individuals that are adjacent to each individual of interest within the same rank (Step S31).

Then, the multiobjective evolutionary algorithm unit 2 computes, for each fitness function, a mathematical distance between the two individuals adjacent to each individual of interest, to evaluate as a crowding factor a sum of mathematical distances for the plurality of fitness functions for each individual of interest (Step S32). The mathematical distance as used herein is preferably the Euclidean distance, for example.

After this, the multiobjective evolutionary algorithm unit 2 sorts the individuals of the population at each rank in the order of greater crowding factor (Step S33).

(e-3) Computation of Estimated Values Using Search History

Description will now be made of the computation of estimated values at Step S3 of FIG. 5 and at Step S9 of FIG. 6.

Figure 13:
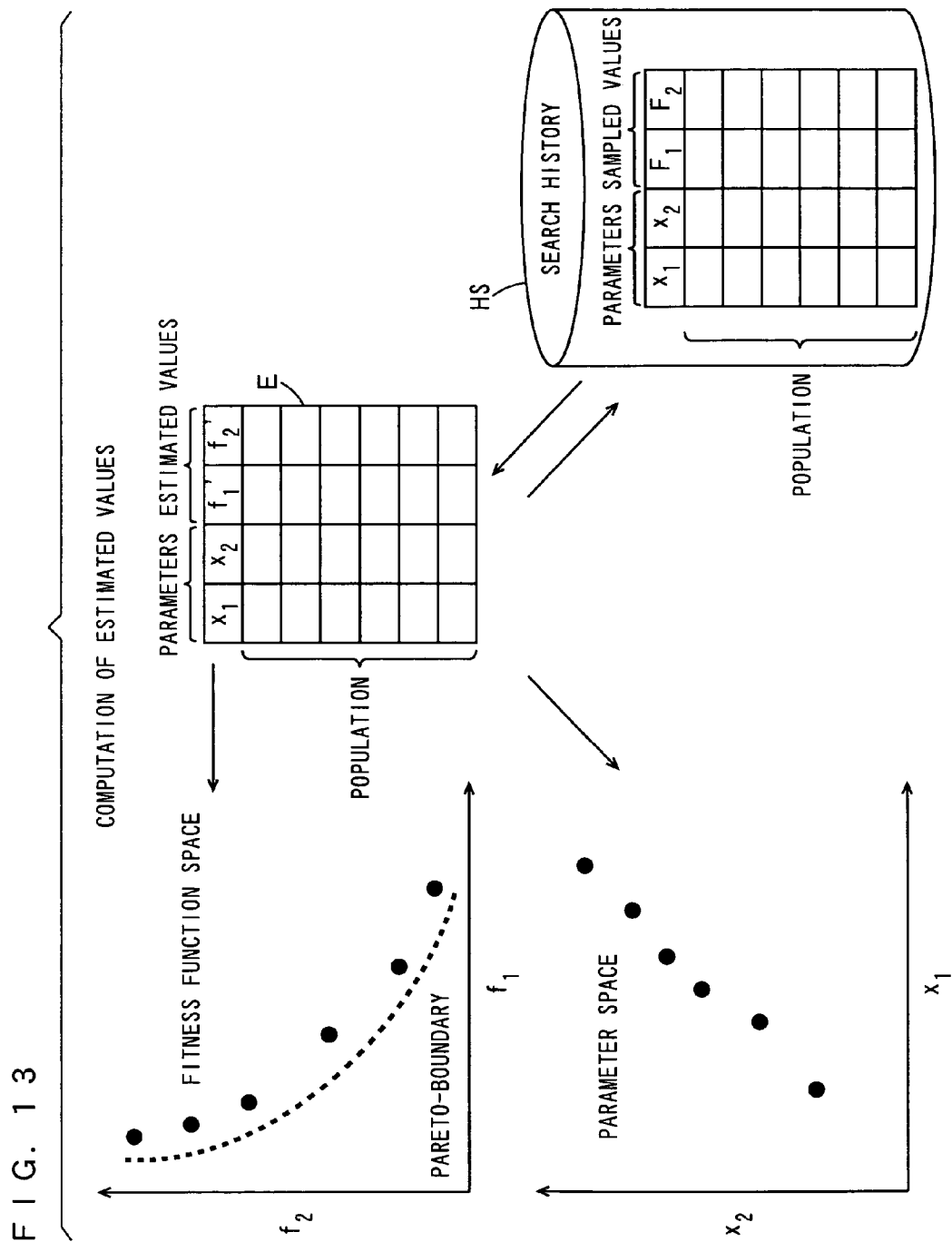
FIG. 13 is a schematic diagram for use in illustrating computation of estimated values by the fitness estimating module in the fitness estimating unit.

FIG. 13 is a schematic diagram for use in illustrating the computation of estimated values by the fitness estimating module 30 in the fitness estimating unit 3.

The search history storage device 31 of FIG. 1 sequentially stores, as a search history SH, sets of parameters of individuals which are fed from the multiobjective evolutionary algorithm unit 2 and sets of sampled values of fitnesses which are outputted from the optimization target 6. In FIG. 13, a set of parameters $x_1$, $x_2$ and a set of sampled values $F_1$, $F_2$ for each individual are stored as the search history SH.

The fitness estimating module 30 computes, on the basis of the search history SH, a set of true fitnesses that corresponds to each individual as a set of estimated values on the basis of the search history SH. The set of parameters and set of estimated values which correspond to each individual are stored in the search history storage device 31 of FIG. 1 as an estimated result E.

As shown in FIG. 13, the search history storage device 31 includes the set of parameters $x_1$, $x_2$ and the set of estimated values $f_1$, $f_2$ for each individual as the estimated value E.

The fitness estimating module 30 is also capable of displaying on the screen of the display device 105 of FIG. 2 Pareto-optimal populations on the fitness function space and the parameter space, on the basis of the set of parameters and set of estimated values for each individual.

In FIG. 13, the Pareto-optimal populations are displayed on the fitness function space consisting of the fitness functions $f_1$, $f_2$ and on the parameter space consisting of the parameters $x_1$, $x_2$. The boundary formed by a Pareto-optimal population is referred to as a Pareto-boundary.

Such method of estimating the fitnesses of individuals using the search history SH stored in the search history storage device 31 is referred to as a Memory-based Fitness Estimated Method (MFEM) (refer to Document 5).

When the set of estimated values for an individual of interest is computed, the individual of interest and the individuals within the search history SH are at different search points. Also, given that the environment is noisy, the optimization target 6 will output a different set of sampled values although provided with the same set of parameters. Therefore, in order to compute a set of estimated values for an individual of interest from the sets of sampled values within the search history SH, it is necessary to provide some assumption to the properties of the fitness functions. The MFEM models a noisy environment, assuming that a fitness function varies randomly in accordance with its mathematical distance from the individual of interest.

Let x be an individual of interest, and $f(x)$ be the true fitness of the individual of interest. Consider a fitness $f(h)$ of an individual h which is away from the individual of interest x by a distant d on the parameter space. A model in which the expected value of the fitness $f(h)$ is $f(x)$ and the variance of the fitness $f(h)$ is in accordance with a normal distribution that increases in proportion to the distance d is expressed in the equation (1) below:

$$f(h) \sim N(f(x), kd) \tag{1}$$

where k represents the positive constant which determines a weight depending on the distance, and $N(f(x), kd)$ represents the probability density function of a normal distribution in which the average is $f(x)$ and the variance is $kd$.

Note that to the true fitness $f(x)$ is added a noise $\delta$ whose average is 0 and variance is $\sigma_E^2$ and also in accordance with a normal distribution which is irrelevant to the position of the individual. In this case, a sampled value $F(x)$ that corresponds to the individual x is defined by the equation below:

$$F(x) = f(x) + \delta \tag{2}$$

Figure 14:
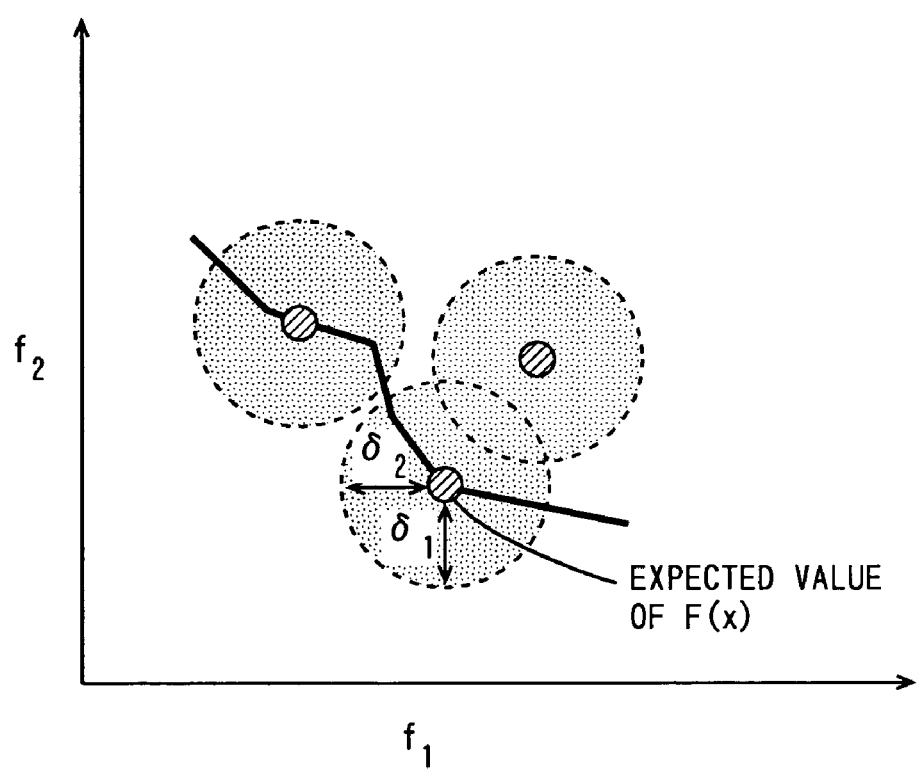
FIG. 14 is a schematic diagram showing a sampled value containing noise in accordance with a normal distribution.

FIG. 14 is a schematic diagram showing a sampled value containing the noise $\delta$ in accordance with a normal distribution. The sampled value $F(x)$ is a set of a sampled value $F_1(x)$ with respect to the fitness function $f_1$ and a sampled value $F_2(x)$ with respect to the fitness function $f_2$. The true fitness $f(x)$ is a set of a true fitness $f_1(x)$ with respect to the fitness function $f_1$ and a true fitness $f_2(x)$ with respect to the fitness function $f_2$. The noise $\delta$ is a set of a noise $\delta_1$ for the fitness function $f_1$ and a noise $\delta_2$ for the fitness function $f_2$. The noise $\delta_i$ (i=1, 2) is expressed in the equation below:

$$\delta_i \sim N(0, \sigma_{Ei}^2) \ (i=1, 2)$$

where $N(0, \sigma_{Ei}^2)$ represents the probability density function of a normal distribution in which the average is 0 and variance is $\sigma_E^2$.

The fitness estimating unit 3 determines a Pareto-optimal population that minimizes the expected value of the sampled value $F(x)$. The sampled value $F(h)$ that corresponds to an individual h is modeled as the equation (3.1) and equation (3.2) shown below:

$$F(h) \sim N(f(x), kd + \sigma_E^2) \tag{3.1}$$

$$d = |h - x| \tag{3.2}$$

where $(f(x), kd + \sigma_E^2)$ represents the probability density function of a normal distribution in which the average is $f(x)$ and the variance is $kd + \sigma_E^2$.

FIG. 15 is a schematic diagram showing a model of a noisy fitness function. The model assumes that the sampled value $F(h)$ greatly varies in an irregular manner as it moves away from the individual of interest x.

With a maximum likelihood method using the search history HS, the estimated value of true fitness $f(x)$ is determined on the basis of this model.

Considering individuals $h_l$ (l=1, ..., H) which are stored in the search history SH; sampled values $(h_l)$ for the individuals $h_l$; and distances $d_l$ (l=1, ..., H) from the individual of interest x to the individuals $h_l$, the probability of obtaining the sampled values $F(h_l), ..., F(h_H)$ can be expressed in the equation below:

$$\prod_{l=1}^{H} p(F(h_l), d_l) \tag{4}$$

where $p(F(h_l), d_l)$ is the probability density function which represents the probability of obtaining the sampled values $F(h_l)$, expressed in the equation below:

$$p(F(h_l), d_l) = \frac{1}{\sqrt{2\pi(k'd_l + 1)\sigma_E^2}} \exp\left(-\frac{1}{2} \frac{(F(h_l) - f(x))^2}{(k'd_l + 1)\sigma_E^2}\right) \tag{5}$$

where $k' = k/\sigma_E^2$. In this preferred embodiment, the constant k' is determined through preliminary experiments. Document 4 suggests a method of estimating the constant k' during a search. The constant k' may be determined by the method suggested.

Taking the aforementioned equations (4) and (5) as the likelihood of the true fitness $f(x)$, the maximum likelihood method is preferably used. This allows the estimated value $f'(x)$ of the true fitness $f(x)$ to be expressed by a weighted average equation which is weighted by functions containing the distance $d_l$, as shown in the equation (6) below:

$$f'(x) = \frac{F(x) + \sum_{l=2}^{H} \frac{1}{k'd_l + 1} F(h_l)}{1 + \sum_{l=2}^{H} \frac{1}{k'd_l + 1}} \quad (6)$$

Figure 16:
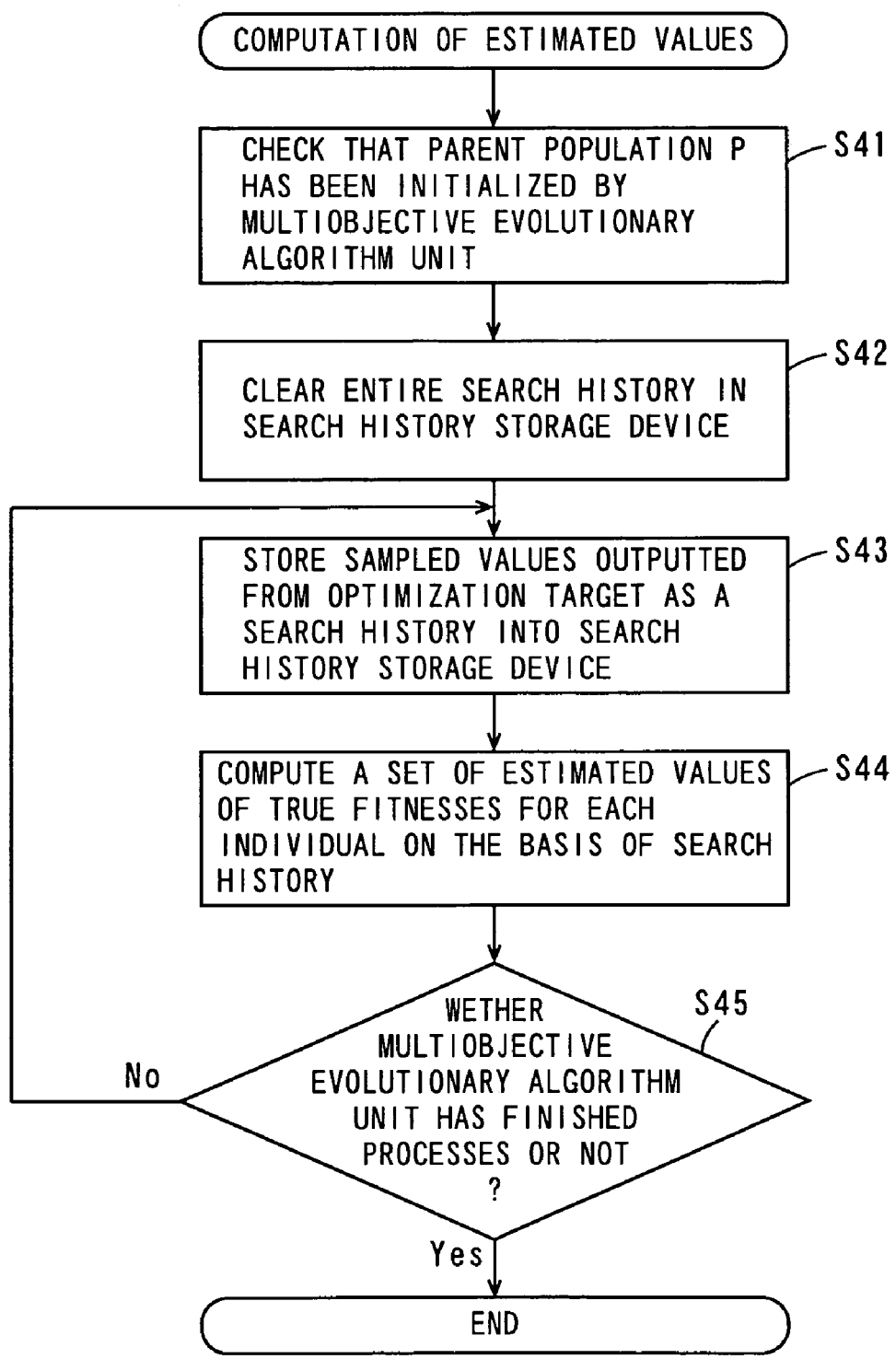
FIG. 16 is a flowchart showing the processes of computing estimated values which are performed by the fitness estimating module in the fitness estimating unit.

FIG. 16 is a flowchart showing the processes of computing estimated values which are performed by the fitness estimating module 30 in the fitness estimating unit 3.

The fitness estimating module 30 first checks that the parent population P has been initialized in the multiobjective evolutionary algorithm unit 2 (Step S41). Then, the fitness estimating module 30 clears the entire search history SH in the search history storage device 31 (Step S42).

After this, the fitness estimating module 30 stores a set of sampled values which are outputted from the optimization target 6 as a search history SH into the search history storage device 31 (Step S43). The fitness estimating module 30 subsequently computes a set of estimated values of true fitnesses that corresponds to each individual on the basis of the search history SH within the search history storage device 31, using the aforementioned equation (6) (Step S44).

The fitness estimating module 30 determines whether the multiobjective evolutionary algorithm unit 2 has finished the processes or not (Step S45).

If the multiobjective evolutionary algorithm unit 2 has yet to finish the processes, the fitness estimating module 30 returns to Step S43 to repeat the processes at Step S43 to Step S45. Upon completion of the processes by the multiobjective evolutionary algorithm unit 2, the computation of estimated values is completed.

(e-4) Processes of Selecting Parent Individuals To Generation Alteration

Description will now be made of the processes through the selection of specific parent individuals at Step S6 of FIG. 6 to the alteration of generations at Step S11. FIGS. 17(a), 17(b), 17(c), 17(d) and 17(e) are schematic diagrams for use in illustrating the processes through the selection of specific parent individuals to the alteration of generations.

As shown in FIG. 17(a), the parent population P is ranked using Pareto-ranking. As shown in FIG. 17(b), for the population of individuals at the rank 1 of the parent population P, the Euclidean distance between each set of two adjacent individuals on the fitness function space is preferably evaluated as an index of distribution. In this preferred embodiment, the fitness function space consists of two fitness functions, $f_1$ and $f_2$.

Of two individuals Ia, Ib having a maximum Euclidean distance, either of them is randomly selected as a first parent individual Ia with a one-half probability. Then, a second parent individual Ic and a third parent individual Id are selected by random selection from the parent population P.

In the present preferred embodiment, let x and y be two adjacent individuals as shown in FIG. 17(f), and the Euclidean distance L as an index of distribution is given by $$L = [\{f_1(x) - f_1(y)\}^2 + \{f_2(x) - f_2(y)\}^2]^{1/2} \quad (7)$$

Following this, a child population C is generated from the first, second, and third parent individuals Ia, Ic, Id, as shown in FIG. 17(c). Then, a population F is generated from the child population C and the parent population P, as shown in FIG. 17(d), followed by the application of Pareto-ranking using the above-described α-domination strategy on the population F. At this time, if there is an individual in the child population C that is a duplicate of any individual within the parent population P, the individual is ranked as the lowest.

Then, as shown in FIG. 17(e), the population F is subjected to the crowding distance sorting, and a given number of individuals are selected on the basis of the rank of each individual and its crowding factor within each rank, while the remaining individuals are eliminated. This results in the generation of a new parent population P. In this manner, the alteration of generations is performed.

Figure 18:
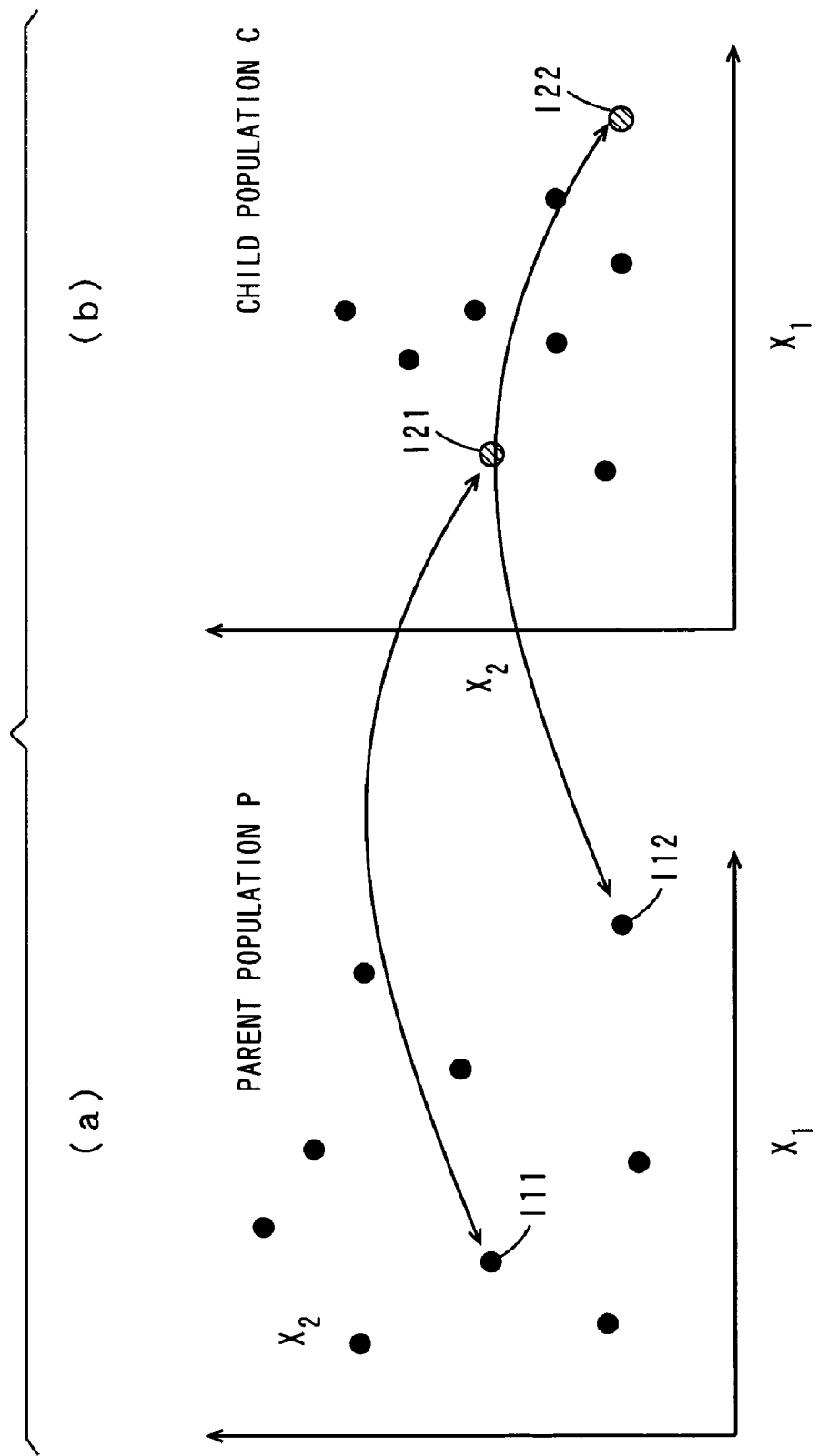
FIGS. 18($a$) and 18($b$) are schematic diagrams for use in illustrating the generation of a child population.

FIGS. 18(a) and 18(b) are schematic diagrams for use in illustrating the generation of the child population C. FIG. 18(a) shows the parent population P on the parameter space, and FIG. 18(b) shows the child population C on the parameter space. When the parameters $x_1$, $x_2$ of an individual I21 in the child population C are the same as the parameters $x_1$, $x_2$ of an individual I11 in the parent population P, the individual I21 is ranked the lowest. Likewise, when the parameters $x_1$, $x_2$ of an individual I22 in the child population C are the same as the parameters $x_1$, $x_2$ of an individual I12 in the parent population P, the individual I22 is ranked the lowest.

Note that the method of selecting specific parent individuals is not limited to the method described herein. For example, two individuals having a maximum Euclidean distance L may be selected from the population of individuals at the rank 1 as a first and a second parent individual, and a third parent individual may be selected from the parent population P by random selection, roulette wheel selection, tournament selection, etc.

Figure 19:
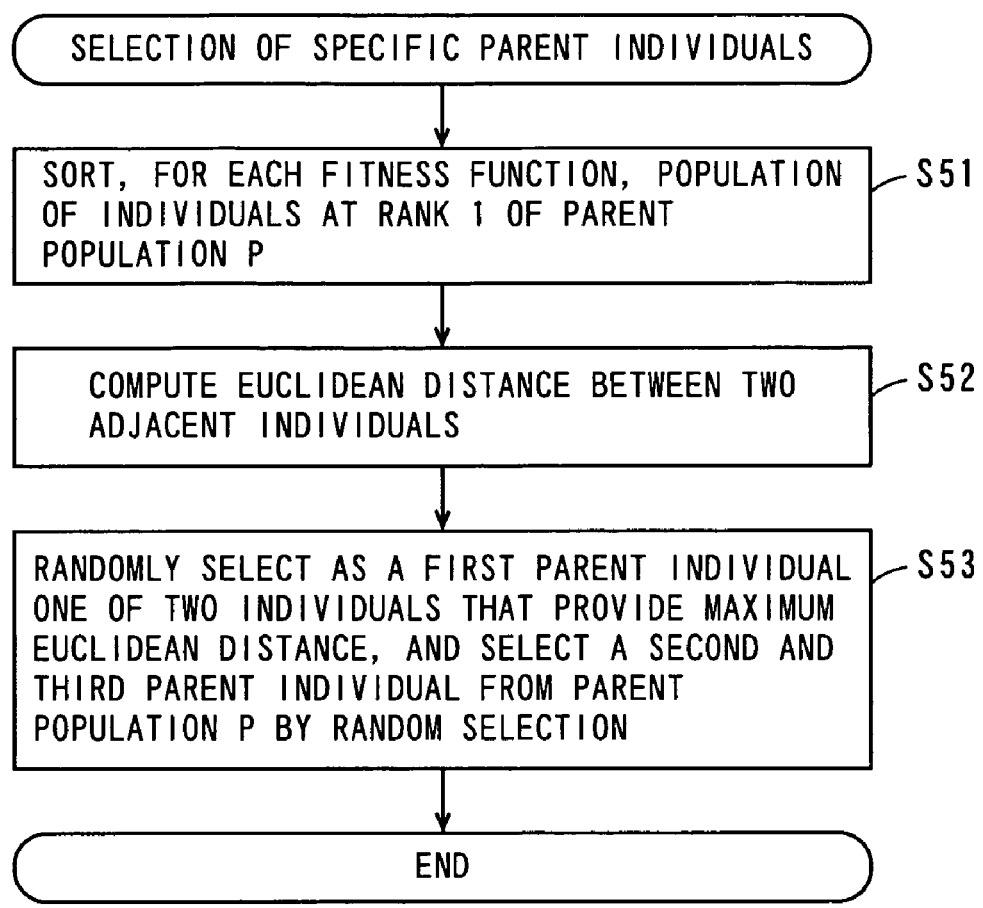
FIG. 19 is a flowchart showing the selection of specific parent individuals by the multiobjective evolutionary algorithm unit.

FIG. 19 is a flowchart showing the selection of specific parent individuals by the multiobjective evolutionary algorithm unit 2.

The multiobjective evolutionary algorithm unit 2 first sorts, for each fitness function, the population of individuals at the rank 1 which is selected from the parent population P (Step S51).

Then, the multiobjective evolutionary algorithm unit 2 computes the Euclidean distance between each set of two adjacent individuals in the population of individuals at the rank 1 (Step S52).

After this, the multiobjective evolutionary algorithm unit 2 randomly selects, as a first parent individual, one of two individuals that provide a maximum Euclidean distance with a one-half probability, and selects a second and a third parent individual from the parent population P by random selection (Step S53).

In this preferred embodiment, a child population is generated from the first, second and third parent individuals by means of the crossover operation. As the crossover operation, UNDX (Unimodal Normal Distribution Crossover), for example, may be used.

Figure 20:
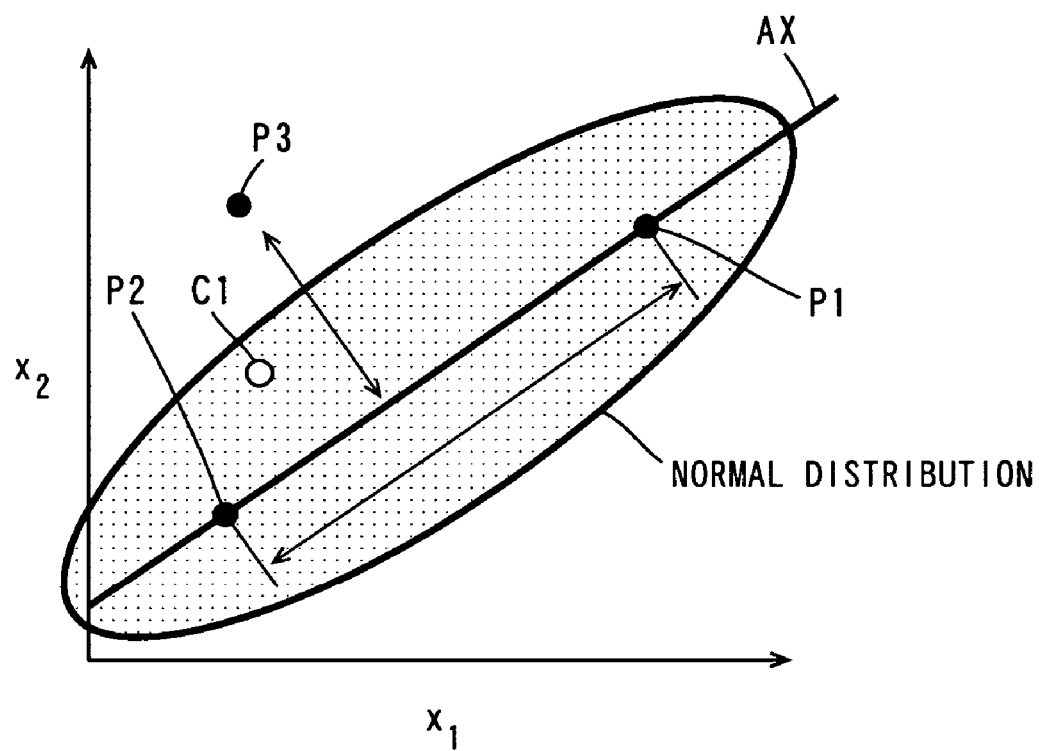
FIG. 20 is a schematic diagram showing the generation of a child population by UNDX.

FIG. 20 is a schematic diagram showing the generation of a child population by the UNDX. With the UNDX, a child individual C1 is generated in accordance with the random numbers of a normal distribution that is defined based on the positions of a first parent individual P1, second parent individual P2, and third parent individual P3. In this case, the child individual C1 is generated in accordance with the normal distribution around an axis AX that connects the first parent individual P1 and second parent individual P2, so that the child individual C1 is not generated distant from the first to third parent individuals P1 to P3.

(f) Effects of First Preferred Embodiment

In the multiobjective optimization apparatus 1 of this preferred embodiment, the set of sampled values that corresponds to each individual which is stored in the search history storage device 31 is weighted based on the aforementioned equation (6), and using the linear sum of the plurality of sets of weighted sampled values, the set of estimated values of fitnesses that corresponds to an individual of interest is determined.

The weight for each individual is a function that includes the distance between the individual of interest and the individual itself on the parameter space, so that estimated values in which deviations from the true fitnesses are sufficiently small may be given. This results in an appropriate Pareto-optimal population even if the sampled values which are outputted from the optimization target have uncertainty.

Moreover, with the α-domination strategy, the estimated values that correspond to the plurality of individuals in a population are subjected to the dominance comparison for each of the plurality of fitness functions, followed by weighting the plurality of results obtained for each of the plurality of fitness functions. Then, the plurality of individuals in the population are ranked on the basis of the linear sum of the plurality of obtained results which are weighted for each of the plurality of fitness functions. This results in determining reasonable Pareto-optimal individuals considering the relationship between the plurality of fitnesses, even if the optimization target have uncertainty.

In addition, on the distribution of the individuals at the highest rank on the fitness function space, using the distance between adjacent individuals as an index of distribution, a new child individual can be easily generated on a sparse region. This allows generation of the individuals at the highest rank such that they are distributed evenly over a broad region of the fitness function space. Thus, Pareto-optimal individuals having diversity can be easily provided.

Furthermore, when a child individual that has been newly generated is a duplicate of any of the individuals in the parent population, the new child individual is ranked the lowest. This allows a gradual decrease in poor individuals during the initial search for Pareto-optimal individuals, while maintaining the diversity of the Pareto-optimal individuals during the late search.

In addition, the display device 105 provides the Pareto-optimal individuals on the screen, on the basis of the sets of estimated values which are computed by the fitness estimating unit 3. The user is thus allowed to visually recognize the Pareto-optimal individuals, thereby easily making a variety of decisions.

Second Preferred Embodiment

A multiobjective optimization apparatus according to a second preferred embodiment of the invention will now be described. The multiobjective optimization apparatus in this preferred embodiment preferably has the configuration as shown in FIG. 1 and FIG. 2.

The overall processes performed by the multiobjective optimization apparatus in this preferred embodiment are also similar to the processes as shown in FIG. 5 and FIG. 6.

The preferred embodiment differs from the first preferred embodiment in the computation of estimated values at Step S3 of FIG. 5 and at Step S9 of FIG. 6, and the selection of specific parent individuals at Step S6 of FIG. 6.

(a) Computation of Estimated Values

In this preferred embodiment, the estimated value f'(x) of the true fitness f(x) is given by a modified estimating equation:

$$f'(x) = \frac{F(x) + \sum_{l=2}^{H} \frac{1}{k'd_l^3 + 1} F(h_l)}{1 + \sum_{l=2}^{H} \frac{1}{k'd_l^3 + 1}} \quad (9)$$

As shown in the equation (9) above, the estimated value f'(x) may be expressed by a weighted average equation which is weighted by functions each containing the cube of the distance $d_l$ on the parameter space.

Based on the equation (9), the shorter the distance between an individual of interest and an individual within the search history HS, the more the weight increases. In contrast, the longer the distance between the individual of interest and the individual within the search history, the more significantly the weight decreases. Individuals distant from the individual of interest thus hardly contribute to the computation of the estimated value f'(x).

Figure 21:
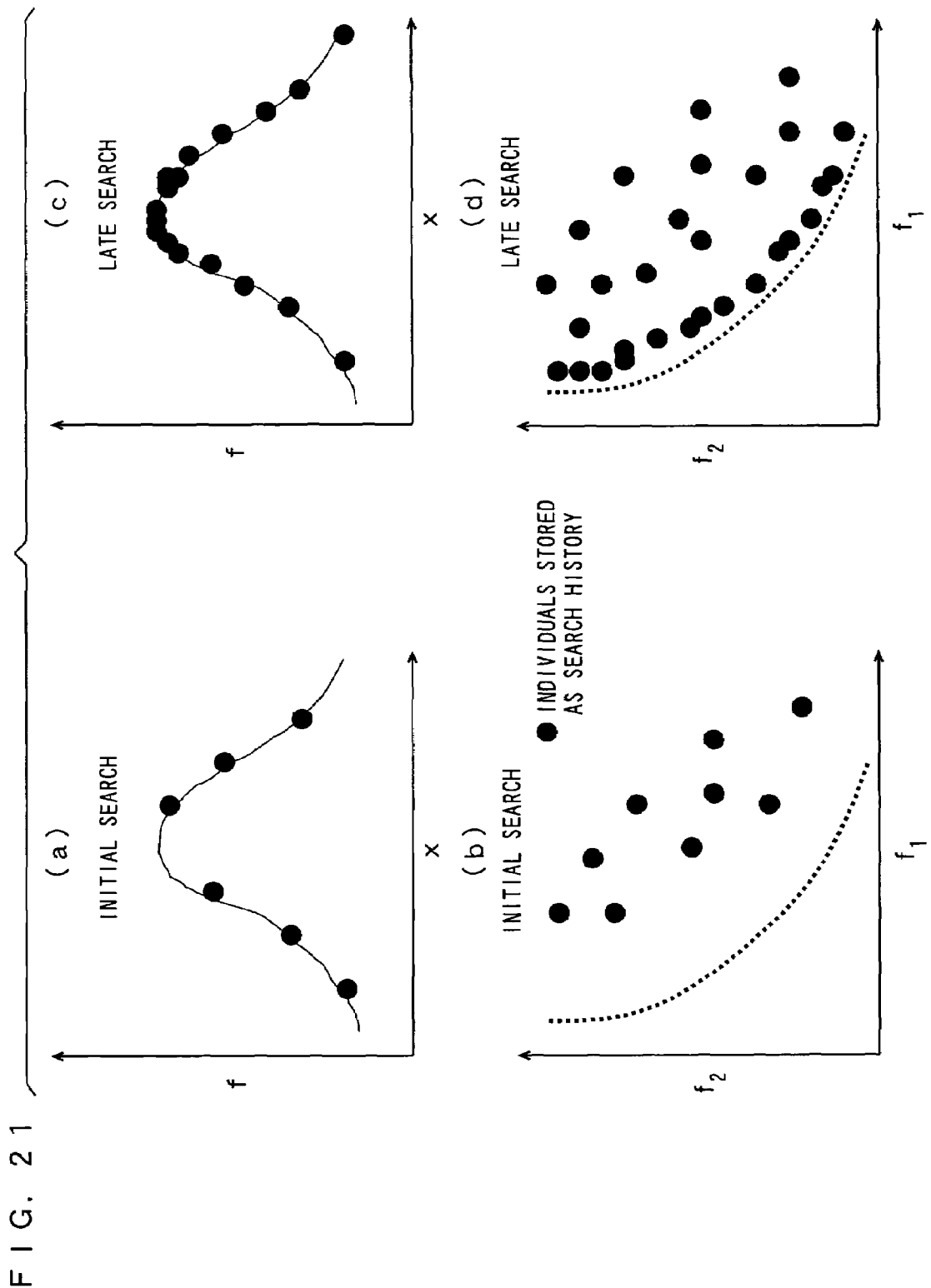
FIGS. 21($a$), 21($b$), 21($c$) and 21($d$) are schematic diagrams showing the search of individuals on the basis of the search history which is stored in the search history storage device.

FIGS. 21(a), 21(b), 21(c) and 21(d) are schematic diagrams showing the search of individuals on the basis of the search history which is stored in the search history storage device 31. FIG. 21(a) shows a population of individuals during the initial search in single objective optimization; FIG. 21(b) shows a population of individuals during the initial search in multiobjective optimization; FIG. 21(c) shows a population of individuals during the late search in single objective optimization; and FIG. 21(d) shows a population of individuals during the late search in single objective optimization.

In FIGS. 21(a) and 21(c), the ordinate represents a fitness function f, and the abscissa represents a parameter x. In FIGS. 21(b) and 21(d), the ordinate represents a fitness function $f_2$, and the abscissa represents a fitness function $f_1$.

During the initial search, a plurality of individuals are distributed as shown in FIGS. 21(a) and 21(b). During the late search, for the single objective optimization shown in FIG. 21(c), the individuals are concentrated near a particular parameter value, and for the multiobjective optimization shown in FIG. 21(d), the plurality of individuals form a Pareto-optimal population.

In the multiobjective optimization, the individuals are thus distributed over a broad range of the fitness function space. The use of the equation (9) accordingly decreases the contribution of individuals distant from the individual of interest, thus giving estimated values with high precision.

(b) Processes of Selecting Parent Individuals To Generation Alteration

FIGS. 22(a), 22(b), 22(c), 22(d) and 22(e) are schematic diagrams for use in illustrating the processes through the selection of specific parent individuals to the alteration of generations. The present preferred embodiment illustrates an example of three fitness functions, $f_1$, $f_2$, $f_3$.

As shown in FIG. 22(a), the parent population P is ranked by Pareto-ranking. As shown in FIG. 22(b), for the population of individuals at the rank 1 of the parent population P, the area of a triangle which is formed by each set of adjacent three individuals on the fitness function space is evaluated as an index of distribution.

In the formation of triangles, Delaunay Triangulation is preferably used (refer to Document 6), for example.

The Delaunay Triangulation is now briefly described. It is the geometric dual of the Voronoi Diagram, an important concept in Computational Geometry. The Delaunay Triangulation is known as the best triangulation of all the triangulations for a set of points on the plane (space) in various senses, and determines applications in mesh generation, finite element methods, etc. in computer graphics. The Delaunay Triangulation is a triangulation that maximizes the minimum angle of the angles of each divided triangle, including methods of using an incremental method, divide and conquer method, or geometric transformation as algorithms. For a detailed explanation of the Delaunay Triangulation, refer to e.g. Document 7.

Of three individuals IA, IB, IC that provide a maximum area of triangle, any one of them is randomly selected as a first parent individual IA with a one-third probability. Then, a second parent individual ID and a third parent individual IE are selected by random selection from a parent population P.

After this, as shown in FIG. 22(c), a child population C is generated from the first, second, and third parent individuals IA, ID, IE. Then, as shown in FIG. 22(d), a population F which is generated from the child population C and parent population P is subjected to the above-mentioned Pareto-ranking using the α-domination strategy. At this time, individuals in the child population C which are duplicates of any individuals in the parent population P are ranked the lowest.

Subsequently, as shown in FIG. 22(e), the population F is subjected to the crowding distance sorting, and a given number of individuals are selected on the basis of the rank of each individual and its order within each rank, while the remaining individuals are eliminated. This results in the generation of a new parent population P. In this manner, the alteration of generations is performed.

Note that the method of selecting specific parent individuals is not limited to the method described herein. For example, three individuals that provide a maximum area of triangle may be selected as the first, second, and third parent individuals. Alternatively, two of such three individuals may be selected as the first and second parent individuals, while the third parent individual is selected from the parent population P by random selection, roulette wheel selection, tournament selection, etc.

In the case of three or more parameters, crossover methods using multi-parental extension, including e.g. UNDX-m may be used.

FIG. 24 is a flowchart showing the selection of specific parent individuals by the multiobjective evolutionary algorithm unit 2.

The multiobjective evolutionary algorithm unit 2 first orthogonally projects the population of individuals at the rank 1 selected from the parent population P on an $f_i$-$f_j$ plane (Step S61), where $f_i$ and $f_j$ each are a fitness function, and where i, j=1, 2, 3 (i≠j). The combination of these may be varied for each generation.

The multiobjective evolutionary algorithm unit 2 subsequently applies the Delaunay triangulation on the population that has been orthogonally projected (Step S62).

Then, the multiobjective evolutionary algorithm unit 2 applies the component of a fitness function $f_k$ as a component of height to the Delaunay triangulated population of individuals at the rank 1 so as to develop a plurality of triangles on a three-dimensional space (Step S63). Note that k≠i, j.

After this, the multiobjective evolutionary algorithm unit 2 computes the area of each of the plurality of triangles on the three-dimensional space (Step S64).

Of the three individuals that form the triangle with a maximum area, one of them is randomly selected as a first parent individual with a one-third probability, and two individuals are selected from the parent population P as a second and a third parent individual by random selection (Step S65).

(c) Effects of Second Preferred Embodiment

In the multiobjective optimization apparatus 1 of this preferred embodiment, the set of sampled values that corresponds to each of the individuals stored in the search history storage device 31 is weighted based on the aforementioned equation (9), and the set of estimated values of fitnesses that corresponds to an individual of interest is determined using the linear sum of the plurality of sets of weighted sampled values.

With the weight for each individual being a function that contains the cube of the distance between the individual of interest and the individual itself on the parameter space, the influence of the other individuals being far away from the individual of interest on the computation of the estimated values is sufficiently decreased. This results in estimated values in which deviations from the true fitnesses are sufficiently small. Therefore, an appropriate Pareto-optimal population can be obtained even when the sampled values which are outputted from the optimization target have uncertainty.

Moreover, on the distribution of the individuals at the highest rank on the fitness function space, using the area of a triangle having the vertices of three adjacent individuals as an index of distribution, a new child individual can be easily generated in a sparse region. This allows generation of the individuals at the highest rank such that they are distributed evenly over a broad region of the fitness function space. Thus, Pareto-optimal individuals having diversity can be easily provided.

Other Preferred Embodiments (a) Extended Estimating Equation

The aforementioned estimating equations (4) and (9) may be generalized as follows:

$$f'(x) = \frac{F(x) + \sum_{l=2}^{H} \frac{1}{k' d_l^n + 1} F(h_l)}{1 + \sum_{l=2}^{H} \frac{1}{k' d_l^n + 1}} \quad (10)$$

where n is an arbitrary natural number. With the equation (4) in the first preferred embodiment, n=1, and with the equation (9) in the second preferred embodiment, n=3. Although n is preferably three, it may be any other natural number.

In this manner, the estimated values of true fitnesses for an individual of interest may be found based on a weighted linear sum of the estimated values of other individuals within the search history HS without using sampled values of noisy fitnesses. This allows a stable search of Pareto-optimal individuals, even when the sampled values have uncertainty.

Furthermore, using the weight containing the function of the nth power of the distance between the individual of interest and each of the other individuals on the parameter space, the computation of estimated values can be prevented from being influenced greatly by the other individuals spreading over a broad range. This allows computation of estimated values with high precision.

(b) Selection of Parent Individuals

As illustrated in the first preferred embodiment, for a two-objective optimization problem, the distance between individuals is used as an index of distribution for selecting specific parent individuals. For a three-objective optimization problem, as in the second preferred embodiment, the area of a triangle formed by three individuals is used as an index of distribution for selecting specific parent individuals.

The index of distribution for selecting specific parent individuals, if it is extended to an m-objective optimization problem, is indicated by the size of a simplex which is formed by adjacent n individuals on the fitness function space. Note that m is a natural number of not less than two. The above-mentioned simplex may be formed by the Delaunay triangulation.

FIG. 24 is a table that shows indices of distribution extended to the m-objective optimization problem. As shown, with the two-objective, the index of distribution is the length of a straight-line that connects adjacent two individuals. With the three-objective, it is the area of a triangle having the vertices of adjacent three individuals. With the four-objective, it is the volume of a cone having the vertices of four adjacent individuals. The index of distribution is the size of a four-dimensional simplex, which is determined by base volume× height÷four. With the five-objective, the index of distribution is the size of a five-dimensional simplex, which is determined by base four-dimensional area×height÷five. With the (m+1) objective, it is the size of an m-dimensional simplex, determined by base (m−1) dimensional area×height÷m.

The selection of specific parent individuals based on such indices of distribution provides a positive search for individuals in sparse regions on the fitness function space. This allows individuals to be searched over a broad region, resulting in computing estimated values with high precision, and determining Pareto-optimal individuals evenly on a broad region of the fitness function space.

(c) Example of Application to Engine Simulator

Figure 25:
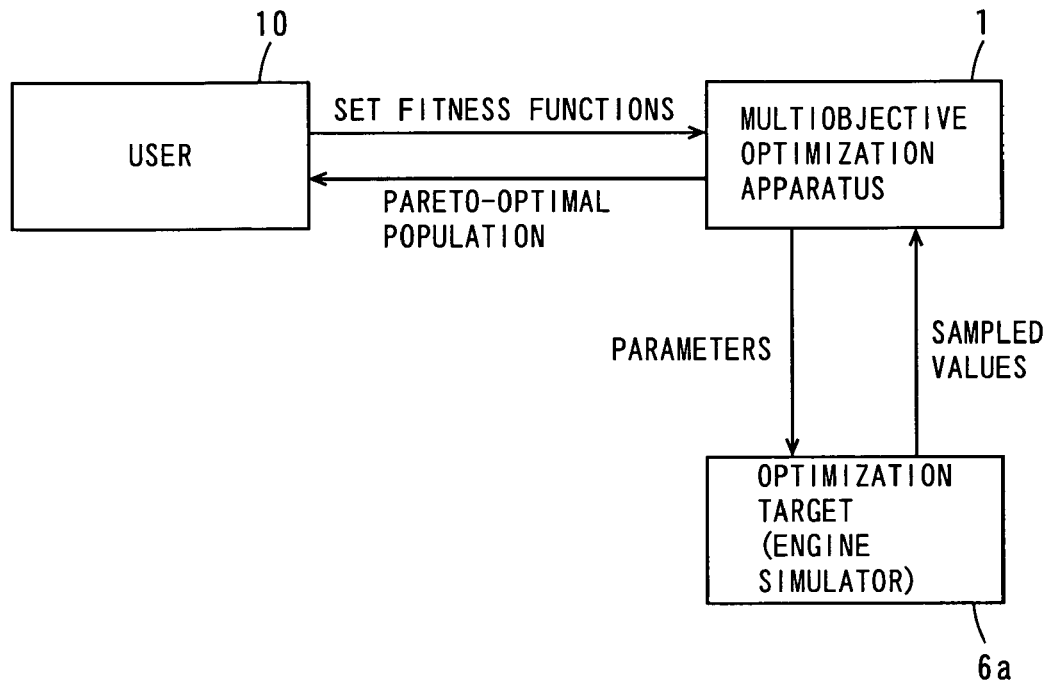
FIG. 25 is a block diagram showing an example of the application of the multiobjective optimization apparatus to an engine simulator.

FIG. 25 is a block diagram showing an example of the application of the multiobjective optimization apparatus to an engine simulator.

The optimization target 6a of FIG. 25 is preferably an engine simulator. The engine simulator includes, for example, a personal computer. The optimization target 6a runs a simulation of engine operation on the basis of a set of parameters which are fed from the multiobjective optimization apparatus 1, and outputs the simulation results as a set of sampled values of fitnesses to the multiobjective optimization apparatus 1.

In this preferred embodiment, a plurality of fitness functions include more than one of fuel consumption, torque, the concentrations of components contained in the exhaust gas of an engine, such as CO (carbon dioxide), HC (hydrocarbons), or $NO_x$ (nitrogen oxides).

Examples of the parameters include the amount of injected fuel, fuel injection timing, ignition timing, or degree of opening of a throttle.

With the multiobjective optimization apparatus 1 of FIG. 25, by setting the set of fitness functions and the set of parameters, a Pareto-optimal population can be efficiently obtained.

(d) Example of Application to Motor Evaluating Apparatus

Figure 26:
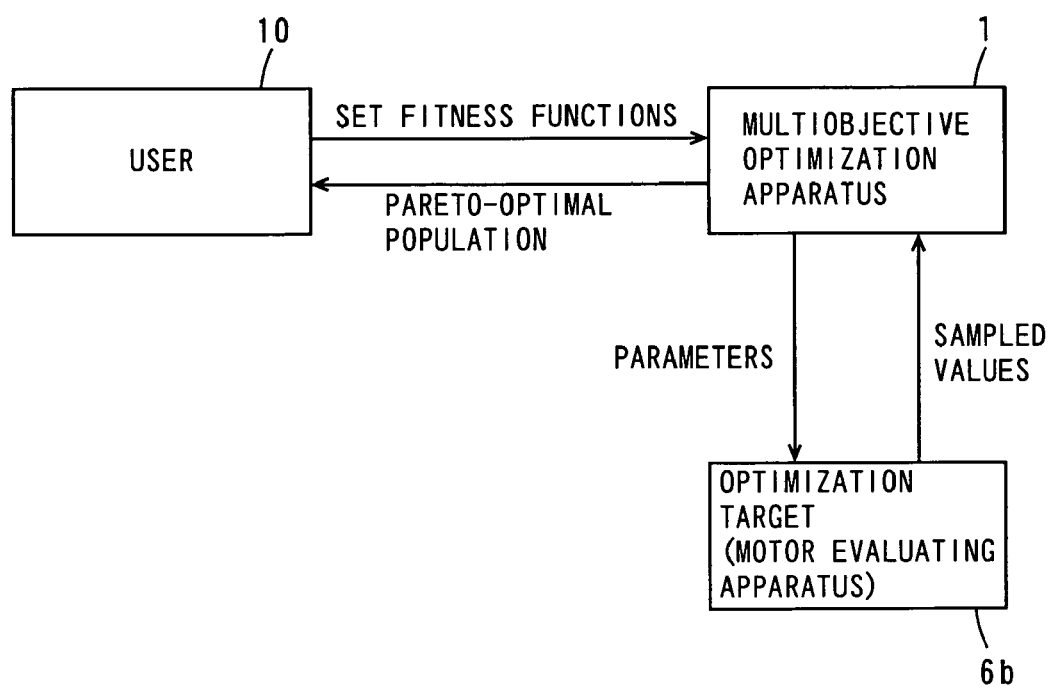
FIG. 26 is a block diagram showing an example of the application of the multiobjective optimization apparatus to a motor evaluating apparatus.

FIG. 26 is a block diagram showing an example of the application of the multiobjective optimization apparatus to a motor evaluating apparatus.

The optimization target 6b of FIG. 26 is preferably a motor evaluating apparatus. The motor evaluating apparatus preferably includes a motor, a control circuit, and a variety of detecting circuits. The optimization target 6b controls the motor on the basis of a set of parameters of individuals which are fed from the multiobjective optimization apparatus 1, while measuring a plurality of performance items on the motor to output the measurements to the multiobjective optimization apparatus 1 as a set of sampled values of fitnesses.

A plurality of fitness functions include more than one of rise time, settling time, overshoot, consumed currents, etc.

Examples of the parameters include PID (Proportional Integral Derivative) gains, drive currents, etc.

Examples of tradeoff relationships include rise time/overshoot, rise time/consumed currents, settling time/overshoot, etc.

With the multiobjective optimization apparatus 1 of FIG. 26, by setting the set of fitness functions and the set of parameters, a Pareto-optimal population can be efficiently obtained.

Furthermore, by determining a population of Pareto-optimal solutions in real time, real-time motor control can be performed in accordance with a real environment.

(e) Example of Application to Motor Simulator

FIG. 27 is a block diagram showing an example of the application of the multiobjective optimization apparatus to a motor simulator.

The optimization target 6c of FIG. 27 is a motor simulator. The motor simulator includes, for example, a personal computer. The optimization target 6c runs a simulation of motor operation on the basis of a set of parameters which are fed from the multiobjective optimization apparatus 1, and outputs the simulation results as a set of sampled values of fitnesses to the multiobjective optimization apparatus 1.

A plurality of fitness functions include more than one of a rise time, settling time, overshoot, consumed currents, etc. Examples of the parameters include PID gains, drive currents, etc.

With the multiobjective optimization apparatus 1 of FIG. 27, by setting the set of fitness functions and the set of parameters, a Pareto-optimal population can be efficiently obtained.

(f) Other Examples of Multiobjective Evolutionary Algorithms

While in the above-described preferred embodiments, the genetic algorithm (GA) is preferably used as a multiobjective evolutionary algorithm, any other algorithms based on similar ideas, such as ES (Evolution Strategy) may alternatively be used.

Note that algorithms such as GA or ES are collectively referred to as EAs (Evolutionary Algorithms) or Evolutionary Computation.

(g) Application to Four or More Objectives

While the above-described preferred embodiments illustrate the examples of two- and three-objective optimizations, the present invention may similarly be applied to the optimization of four or more objectives. In this case, four or more objective functions having tradeoffs are set.

(h) Method of Generation Alteration

At Step S10 of FIG. 6 shown above, a new parent population P may be generated by replacing individuals in the child population C which are not duplicates of individuals in the parent population P with the individuals at lowest rank of the parent population P.

This allows a gradual decrease in poor individuals during the initial search for Pareto-optimal individuals, while maintaining the diversity of the Pareto-optimal individuals during the late search.

(i) Re-Evaluation of Parent Individuals

While the above-described preferred embodiments preferably involve re-evaluating the parent individuals, only the child individuals may be re-evaluated, if the number of evaluations is limited in a real system or a large-scaled simulation. This allows a decrease in the number of evaluations.

(j) Limiting Acquisition of Sampled Values

Acquisition of sampled values to the search history storage device 31 may be finished when the amount of the sampled values which are stored in the search history storage device 31 has reached a given storage capacity. This allows estimated values to be computed thereafter on the basis of the search history HS stored in the search history storage device 31, and the search of Pareto-optimal individuals to proceed on the basis of the estimated values computed.

(k) Ranking

While in the above-described preferred embodiments, the plurality of individuals are preferably ranked by the Pareto-ranking, other methods such as non-dominated sorting may be used for ranking the plurality of individuals.

(I) How to Implement Each Component

While in the above-described preferred embodiments, the multiobjective evolutionary algorithm unit 2, fitness estimating module 30, and search history storage device 31 are preferably implemented by the CPU 101 and program, some or all of the multiobjective evolutionary algorithm unit 2, fitness estimating module 30, and search history storage device 31 may be implemented by hardware such as electronic circuits, etc.

Inventive Example 1 And Comparative Example 1

In Inventive Example shown below, benchmark problems were run using the multiobjective optimization apparatus according to the first preferred embodiment. In Comparative Example 1, benchmark problems were run using a multiobjective optimization apparatus similar to that of the first preferred embodiment except for the selection operator.

FIG. 28(*a*) shows the conditions of the multiobjective optimizations in Comparative Example 1. FIG. 28(*b*) shows the conditions of the multiobjective optimizations in Inventive Example 1. FIG. 28(*c*) shows the benchmark problems to be run in each of Comparative Example 1 and Inventive Example 1.

As shown in FIG. 28(*a*), for Comparative Example 1, the population size is 100, number of generations is 30, and number of evaluations is 3000. Note that the number of evaluations includes re-evaluations of parent individuals. In Comparative Example 1, the binary tournament selection is used as the selection operator, and the UNDX is used as the crossover operator.

Figure 17:
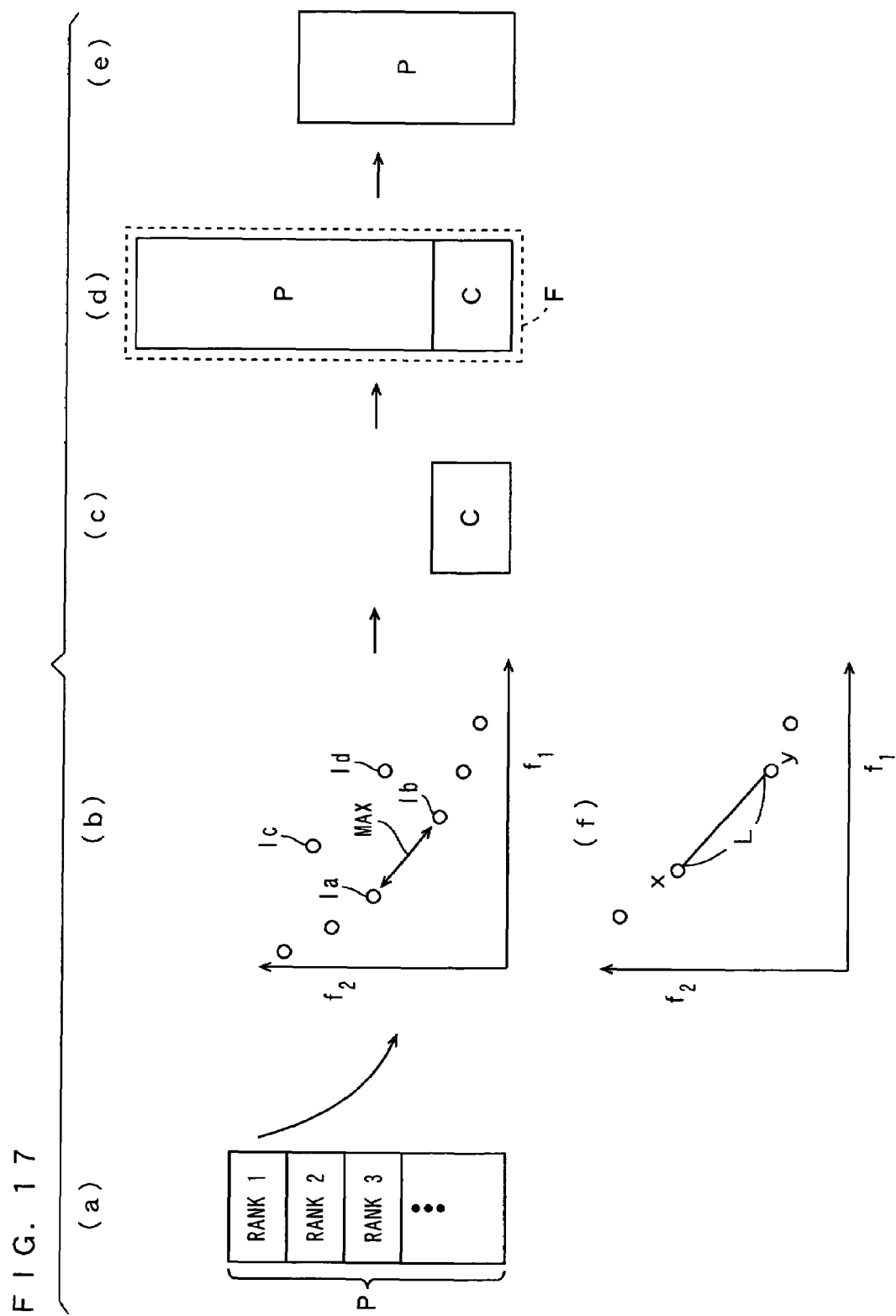
FIGS. 17($a$), 17($b$), 17($c$), 17($d$) and 17($e$) are schematic diagrams for use in illustrating the processes through the selection of specific parent individuals to the alteration of generations.

As shown in FIG. 28(*b*), for Inventive Example 1, the population size is 100, number of generations is 300, and number of evaluations is 3000. In Inventive Example 1, the selection method in the first preferred embodiment (the selection method for specific parent individuals as shown in FIG. 17) is used as the selection operator, and the UNDX is used as the crossover operator. Also, the method of generation alteration as shown in FIG. 17 was used.

In Comparative Example 1 and Inventive Example 1, the constant k' (=($k_1$, $k_2$)) was determined through preliminary experiments, where $k_1=k_2=1000$. Also, in the α-domination strategy of Inventive Example 1, $\alpha(=\alpha_{12}, \alpha_{21})$ is 0.1.

The number of evaluations herein is given by (number of generations×number of child individuals+number of individuals in the initial population).

In Inventive Example 1 and Comparative Example 1, two-objective problems ZDT1 and ZDT2 shown in FIG. 28(*c*) were used as the benchmark problems (refer to Document 8).

The ZDT1 is a two-objective optimization problem in which the population of Pareto-optimal solutions has a convex Pareto-boundary. The ZDT2 is a two-objective optimization problem in which the population of Pareto-optimal solutions has a concave Pareto-boundary. The ZDT1 and ZDT2 were each converted to problems of minimizing a two-variable two-objective function. Appropriate noise is further added to each objective function. The ZDT1, ZDT2 have weak Pareto-optimal solutions.

Figure 29:
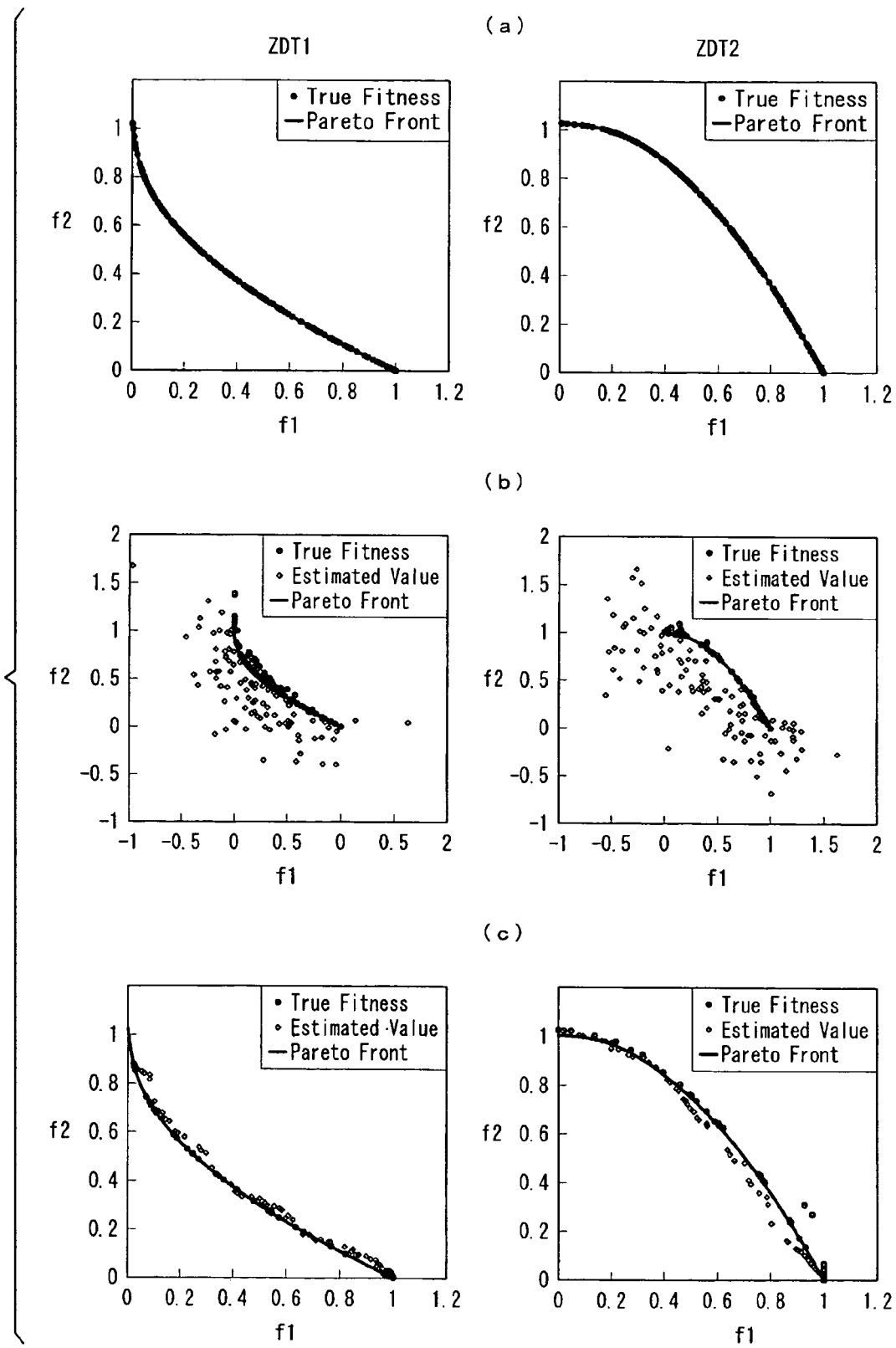
FIGS. 29(*a*), 29(*b*) and 29(*c*) are diagrams showing Pareto-optimal populations obtained at the 50th generation in Comparative Example 1 and Inventive Example 1.

FIGS. 29(*a*), 29(*b*) and 29(*c*) are diagrams showing Pareto-optimal populations obtained at the 50th generation in Comparative Example 1 and Inventive Example 1. FIG. 29(*a*) shows Pareto-optimal populations resulting from the optimizations in Comparative Example 1 with sampled values not containing noise. The circles represent true fitnesses, and the solid lines represent Pareto-boundaries. FIG. 29(*b*) shows Pareto-optimal populations resulting from the optimizations in Comparative Example 1 with sampled values containing noise. The circles represent true fitnesses without noise, the rhombuses represent estimated values, and the solid lines represent Pareto-boundaries. FIG. 29(*c*) shows Pareto-optimal populations resulting from the optimizations in Inventive Example 1 with sampled values containing noise. The circles represent true fitnesses without noise, the rhombuses represent estimated values, and the solid lines represent Pareto-boundaries.

In the optimizations according to Comparative Example 1 with the sampled values not containing noise, the true fitnesses and estimated values form shapes along the convex and concave Pareto-boundaries, as shown in FIG. 29(*a*).

However, in the optimizations according to Comparative Example 1 with the sampled values containing noise, it can be seen from FIG. 29(*b*) that the true fitnesses and estimated values are both discretely distributed with many individuals not reaching the Pareto-boundaries, and also that weak Pareto-optimal individuals are included in the Pareto-optimal population.

In contrast, in the optimizations according to Inventive Example 1 with the sampled values containing noise, it can be seen from FIG. 29(*c*) that the true fitnesses and estimated values are both distributed almost evenly so as to reach the convex and concave Pareto-boundaries, and also it can be seen that the weak Pareto-optimal individuals have been eliminated.

Thus, with the multiobjective optimization apparatus in the first preferred embodiment, using the α-domination strategy, weak Pareto-optimal individuals can be eliminated, while estimated values for a Pareto-optimal population can be determined with high precision in a two-objective optimization problem having weak Pareto-optimal solutions. This allows the true fitnesses and estimated values so as to reach the Pareto-boundary.

Inventive Example 2 And Comparative Example 2

In Inventive Example 2 shown below, a benchmark problem was run using the multiobjective optimization apparatus according to the second preferred embodiment. In Comparative Example 2, a benchmark problem was run using a multiobjective optimization apparatus similar to that of the second preferred embodiment except for the selection operator.

FIGS. 30(*a*), 30(*b*) and 30(*c*) are tables showing the conditions of the multiobjective optimizations in Comparative Example 2 and Inventive Example 2. FIG. 30(*a*) shows the conditions of the multiobjective optimization in Comparative Example 2. FIG. 30(*b*) shows the conditions of the multiobjective optimization in Inventive Example 2. FIG. 30(*c*) shows the benchmark problem to be run in each of Comparative Example 1 and Inventive Example 1.

As shown in FIG. 30(*a*), for Comparative Example 2, the population size is 100, number of generations is 30, and number of evaluations is 3000. Note that the number of evaluations includes re-evaluations of parent individuals. In Comparative Example 2, the binary tournament selection is used as the selection operator, and the UNDX is used as the crossover operator.

Figure 22:
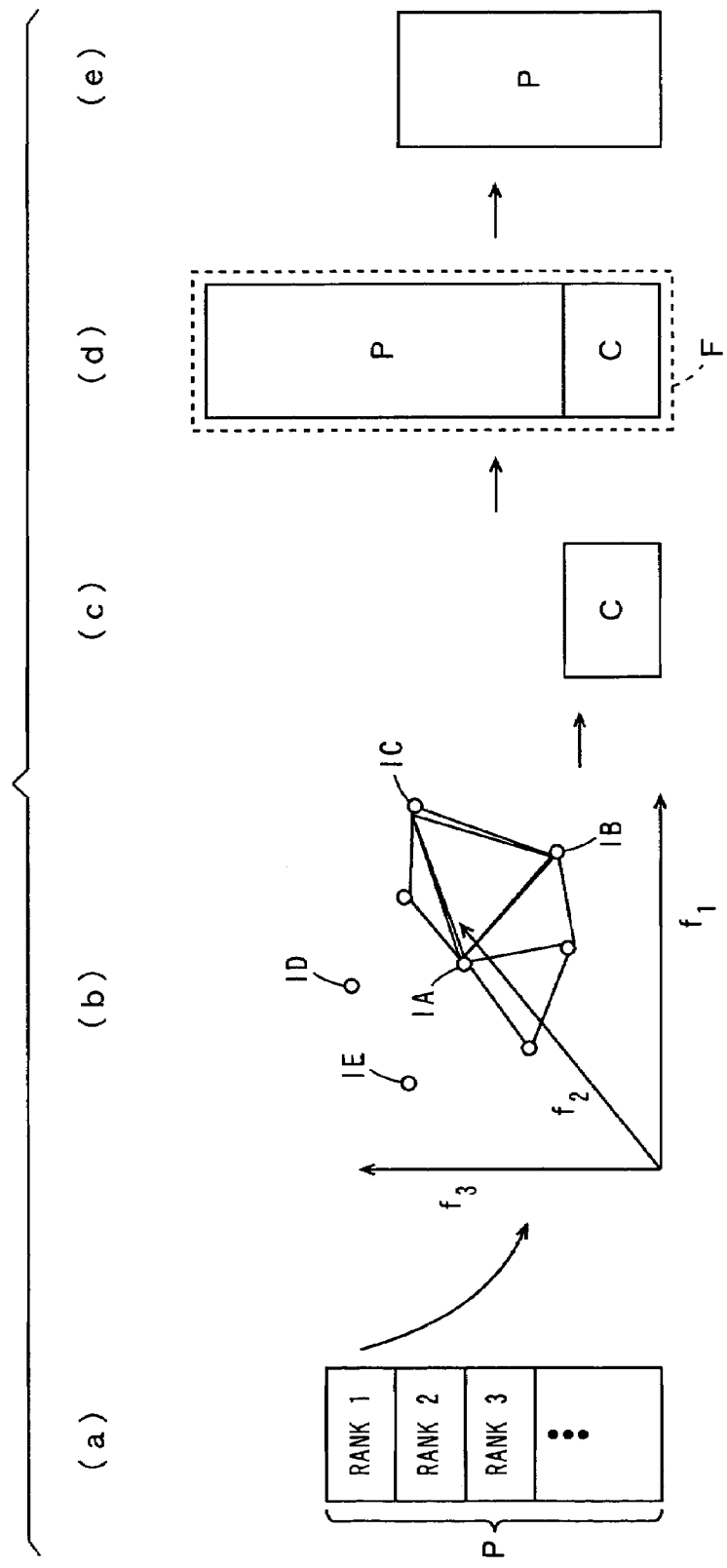
FIGS. 22($a$), 22($b$), 22($c$), 22($d$) and 22($e$) are schematic diagrams for use in illustrating the processes through the selection of specific parent individuals to the alteration of generations.
Figure 23:
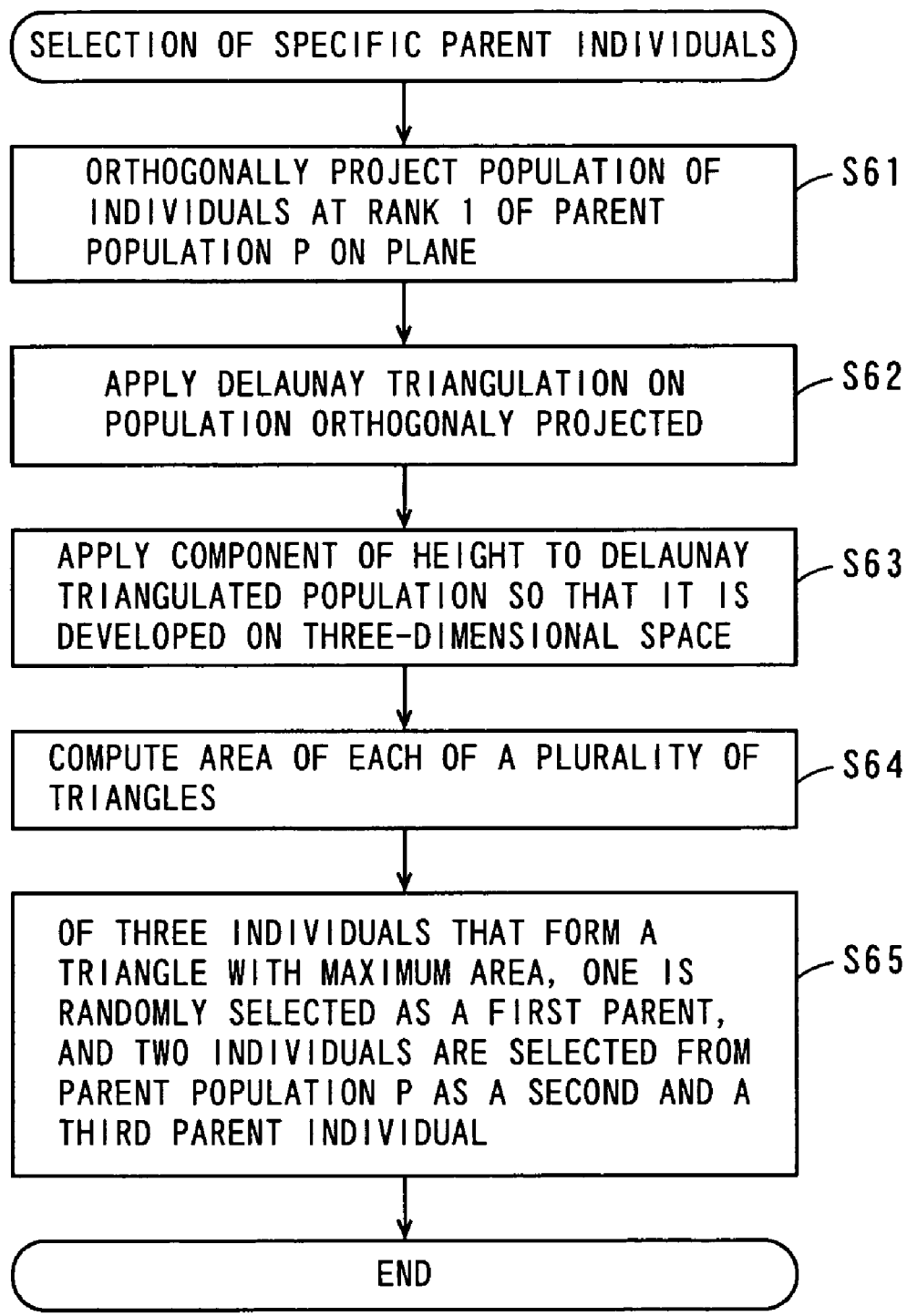
FIG. 23 is a flowchart showing the selection of parent individuals by the multiobjective evolutionary algorithm unit.

As shown in FIG. 30(*b*), for Inventive Example 2, the population size is 100, number of generations is 300, and number of evaluations is 3000. In Inventive Example 2, the selection method in the second preferred embodiment (the selection method for specific parent individuals as shown in FIG. 22) is used as the selection operator, and the UNDEX is used as the crossover operator. Also, the method of generation alteration as shown in FIG. 22 was used.

In Comparative Example 2 and Inventive Example 2, the constant k' ($=k_1, k_2, k_3$) is determined through preliminary experiments, where $=k_1, k_2, k_3=100000$. Also, in the α-domination strategy of Inventive Example 2, α ($=\alpha_{12}=\alpha_{23}=\alpha_{31}$) is 0.1.

In Inventive Example 2 and Comparative Example 2, a two-objective problem DTLZ2 as shown in FIG. 30(c) was used as the benchmark problem.

The DTLZ2 is a three-objective optimization problem in which the Pareto-optimal population has a concave Pareto-boundary. The DTLZ2 was converted to a problem of minimizing a three-variable three-objective function. Appropriate noise was further added to each objective function.

Figure 31:
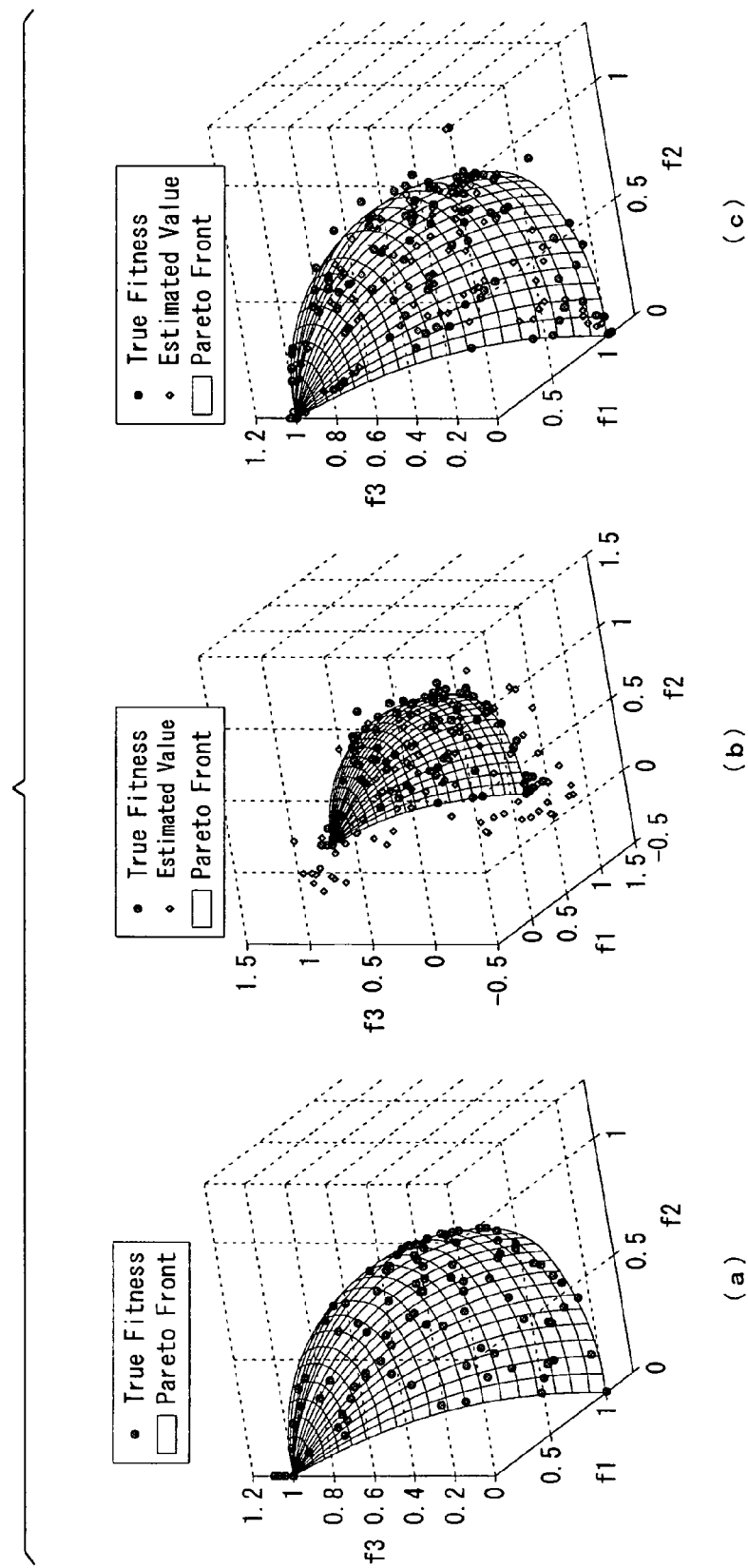
FIGS. 31(*a*), 31(*b*) and 31(*c*) are diagrams showing Pareto-optimal populations obtained in Comparative Example 2 and Inventive Example 2.

FIGS. 31(a), 31(b) and 31(c) are diagrams showing Pareto-optimal populations obtained in Comparative Example 2 and Inventive Example 2. FIG. 31(a) shows a Pareto-optimal population resulting from the optimization in Comparative Example 2 with sampled values not containing noise. The circles represent true fitnesses, and the solid line represents a Pareto-boundary. FIG. 31(b) shows a Pareto-optimal population resulting from the optimization in. Comparative Example 2 with sampled values containing noise. The circles represent true fitnesses without noise, the rhombuses represent sampled values, and the solid line represents a Pareto-boundary. FIG. 31(c) shows a Pareto-optimal population resulting from the optimization in Inventive Example 2 with sampled values containing noise. The circles represent true fitnesses without noise, the rhombuses represent estimated values, and the solid line represents a Pareto-boundary.

As shown in FIG. 31(a), in the optimization according to Comparative Example 2 with the sampled values not containing noise, the true fitnesses and estimated values form a shape along the concave Pareto-boundary.

However, as shown in FIG. 31(b), in the optimization according to Comparative Example 2 with the sampled values containing noise, the true fitnesses and estimated values are both discretely distributed with many individuals not reaching the Pareto-boundary.

In contrast, in the optimization according to Inventive Example 2 with the sampled values containing noise, the true fitnesses and estimated values are both distributed almost evenly so as to reach the concave boundary.

Thus, with the multiobjective optimization apparatus in the second preferred embodiment, using the above-described selection method for specific parent individuals and method of generation alteration, the estimated values for the Pareto-optimal population can be determined with high precision in a three-objective optimization problem. This allows the true fitnesses and estimated values so as to reach the Pareto-boundary.

Inventive Example 3

In Inventive Example 3 shown below, the multiobjective optimization apparatus 1 of FIG. 1 performed the multiobjective optimization of the optimization target 6 of FIG. 3.

The multiobjective optimization apparatus 1 feeds ignition timing and fuel injection timing as a set of parameters to the ECU 62 in the optimization target 6. The controller 54 in the optimization target 6 controls vehicle velocity and air-fuel ratio to be constant, the ECU 62 varies the ignition timing and fuel injection timing on the basis of the set of parameters which is fed from the multiobjective optimization apparatus 1, and the exhaust gas analyzer 63 analyzes HC concentration and $NO_x$ concentration. The HC concentration and $NO_x$ concentration analyzed are outputted to the multiobjective optimization apparatus 1 as a set of sampled values.

FIG. 32 is a table showing the conditions of the multiobjective optimization in Inventive Example 3. As shown in FIG. 32, the population size is 50, child population size is 10, number of generations is 23, and number of evaluations is 280 in the Inventive Example 3. In Inventive Example 3, the selection method in the first preferred embodiment (the selection method for selecting specific parent individuals as shown in FIG. 17) is used as the selection operator, and the UNDX is used as the crossover operator. The constant k' ($=k_1=k_2$) is 100000, and the method in the first preferred embodiment (the method of generation alteration as shown in FIG. 17) is used as the method of generation alteration.

Figure 33:
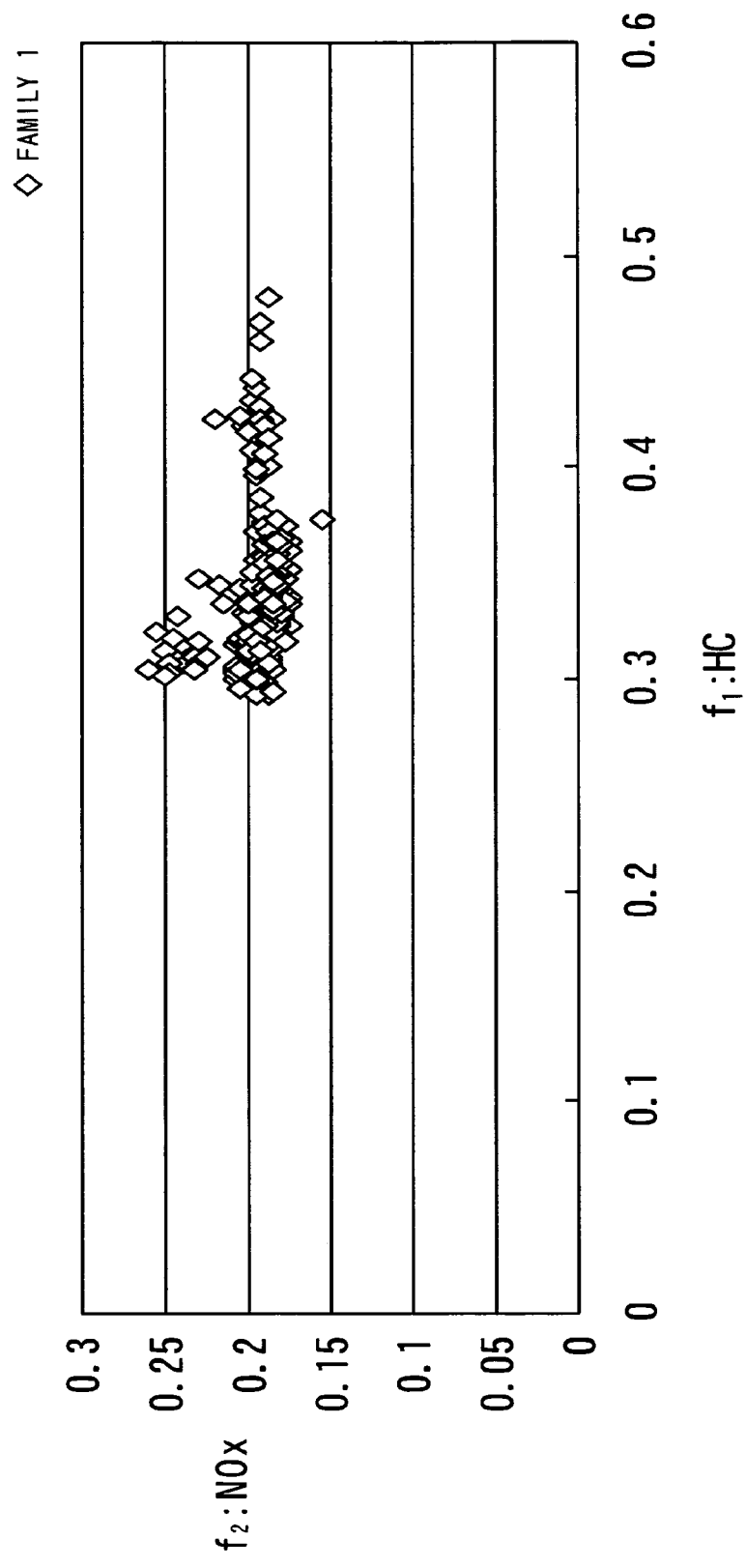
FIG. 33 is a diagram showing sampled values and estimated values obtained in Inventive Example 3.

FIG. 33 is a diagram showing sampled values and estimated values obtained in Inventive Example 3. In FIG. 33, the ordinate represents the $NO_x$ concentration, and the abscissa represents the HC concentration. The values of the ordinate and abscissa are normalized. The circles represent the sampled values at the 23rd generation (280 individuals), and the rhombuses represent the estimated values at the final generation.

Figure 34:
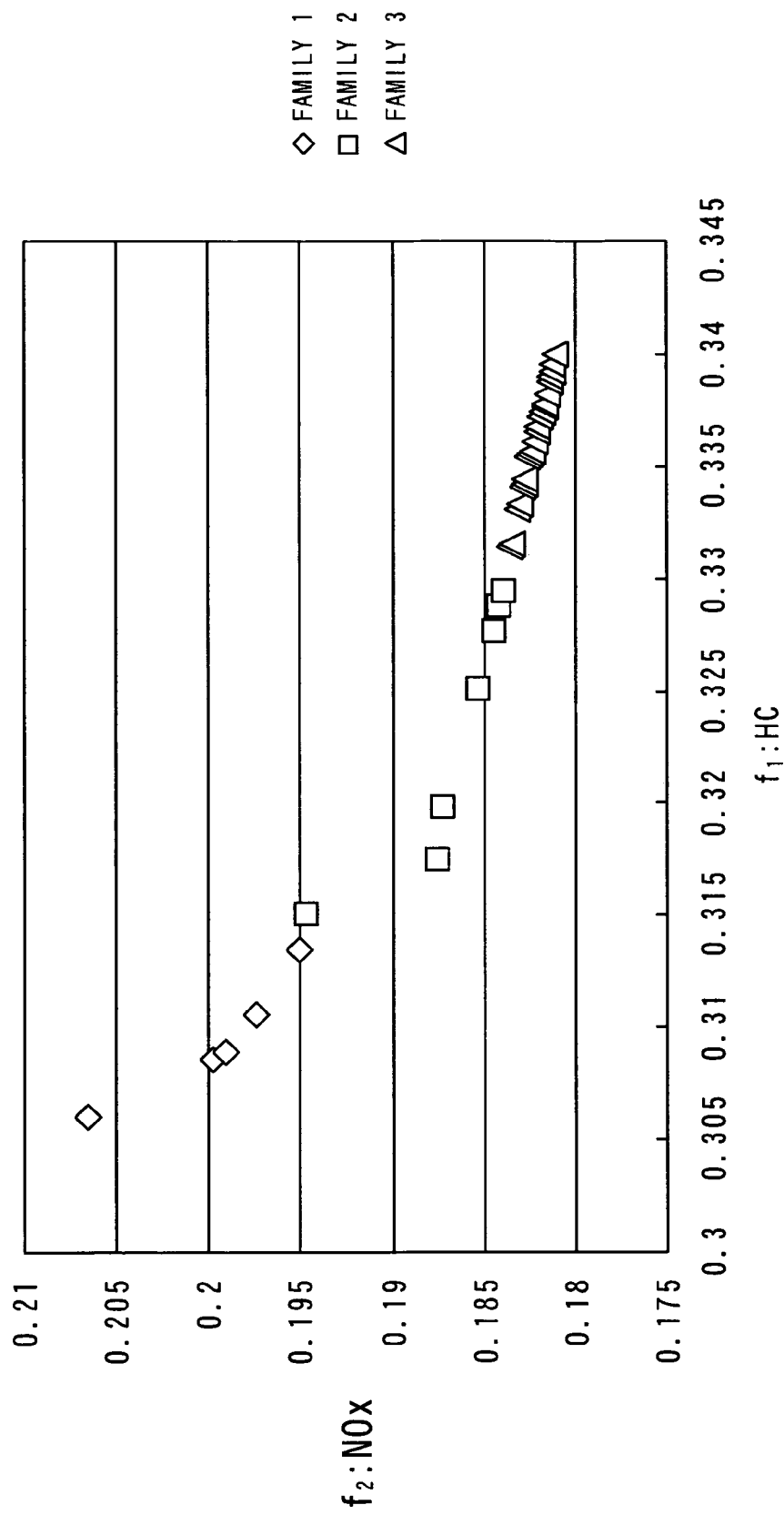
FIG. 34 is a diagram showing on the fitness function space the estimated values of Pareto-optimal individuals which are obtained at the final generation in Inventive Example 3.

FIG. 34 is a diagram showing on the fitness function space the estimated values of Pareto-optimal individuals which are obtained at the final generation in Inventive Example 3. In FIG. 34, the ordinate represents the $NO_x$ concentration, and the abscissa represents the HC concentration. The values of the ordinate and abscissa are normalized.

Figure 35:
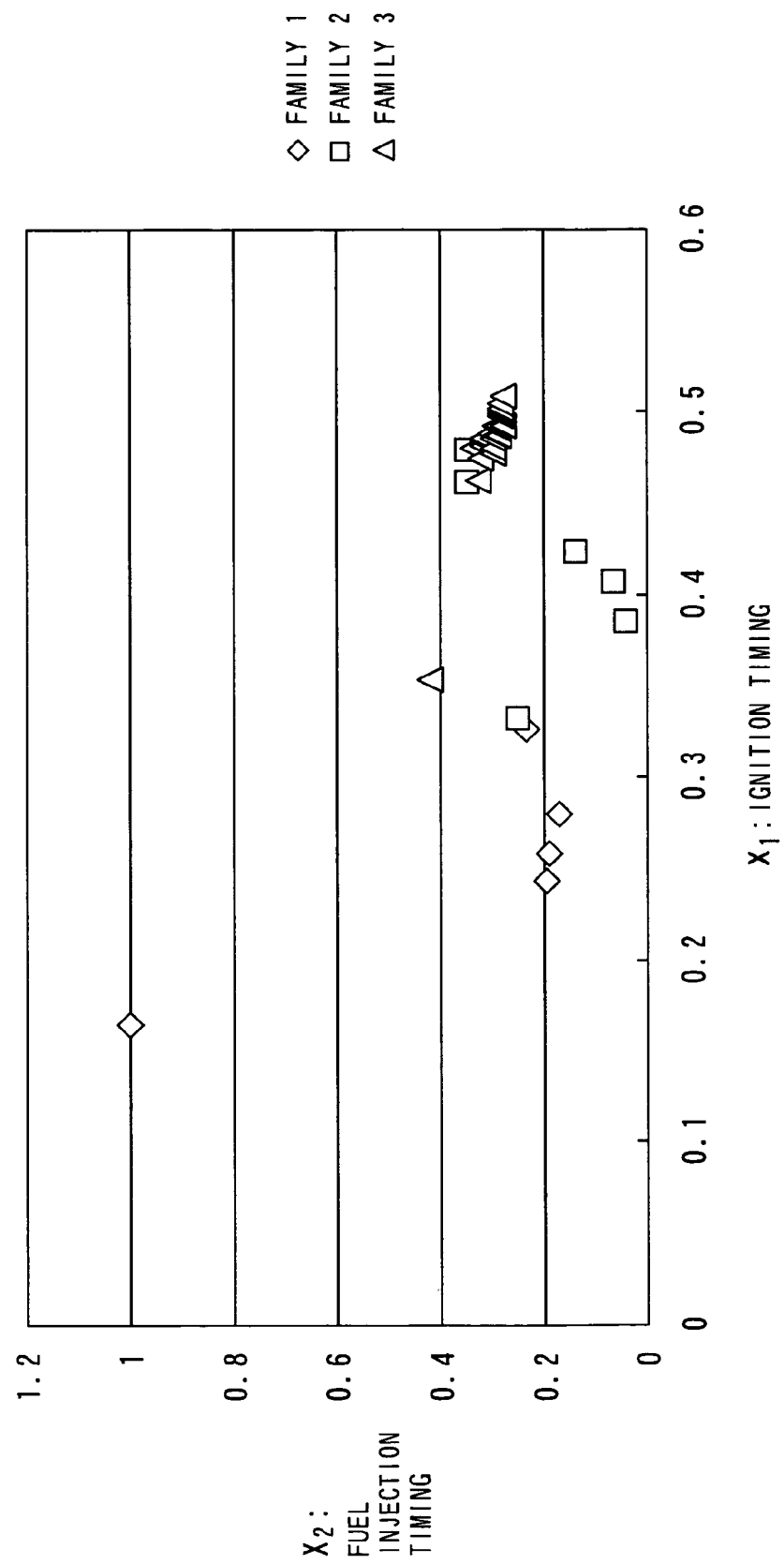
FIG. 35 is a diagram showing on the parameter space the parameters of Pareto-optimal individuals which are obtained at the final generation in Inventive Example 3.
Figure 36:
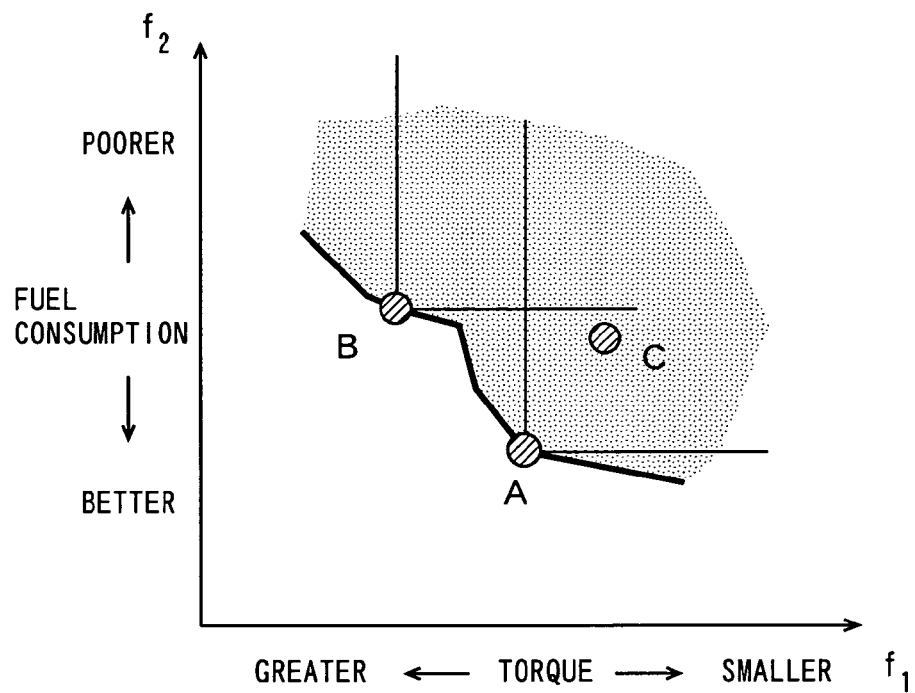
FIG. 36 is a diagram showing the application of the multiobjective optimization problem to the optimization of an engine.
Figure 37:
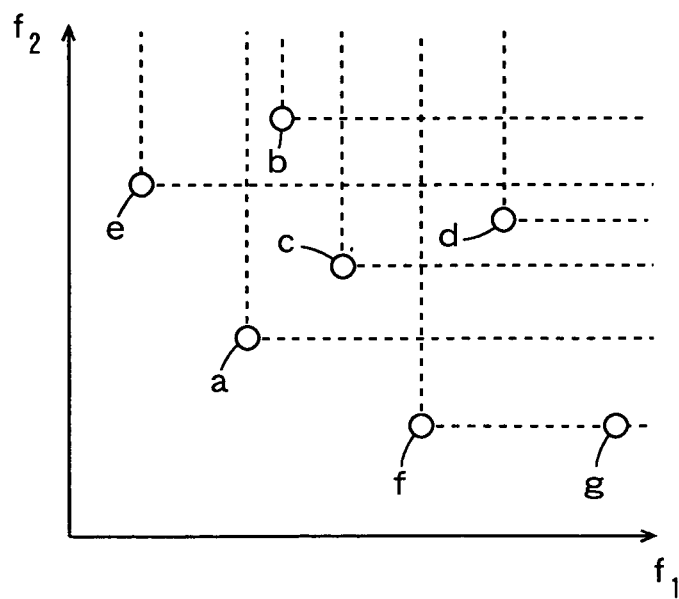
FIG. 37 is a diagram for use in illustrating Pareto-optimal solutions.

FIG. 35 is a diagram showing on the parameter space the parameters of Pareto-optimal individuals which are obtained at the final generation in Inventive Example 3. In FIG. 35, the ordinate represents the fuel injection timing, and the abscissa represents the ignition timing. The values of the ordinate and abscissa are normalized.

In FIG. 34 and FIG. 35, a plurality of Pareto-optimal individuals are classified to three families of 1 to 3 for clarification of the relationship between the estimated values and parameters. The rhombuses represent the Pareto-optimal individuals of the family 1, the squares represent the Pareto-optimal individuals of the family 2, and the triangles represent the Pareto-optimal individuals of the family 3.

The family 1 defines a region of good HC concentrations and poor $NO_x$ concentrations, the family 2 defines a region of balanced HC concentrations and $NO_x$ concentrations, and the family 3 defines a region of poor HC concentrations and good $NO_x$ concentrations. It is seen from FIG. 35 that at earlier ignition timings and smaller values of ignition timings, the HC concentrations are improved, while at later injection timings and greater values of ignition timings, the $NO_x$ concentrations are improved.

Correspondences Between Constituent Features of claims and Components of Preferred Embodiments In the above-described preferred embodiments, the search history storage device 31 corresponds to a storage device, the fitness estimating module 30 corresponds to an estimating module, and the multiobjective evolutionary algorithm unit 2 corresponds to an arithmetic unit.

Although the present invention has been described and illustrated in detail with respect to preferred embodiments thereof, it is clearly understood that the same is by way of illustration and example only and is not to be taken by way of limitation, the spirit and scope of the present invention being limited only by the terms of the appended claims.

What is claimed is:

1. A multiobjective optimization apparatus that feeds parameters of an individual to an optimization target, and receives sampled values of fitnesses for a plurality of fitness functions that correspond to a plurality of objectives from said optimization target, said multiobjective optimization apparatus comprising:
- a storage that stores parameters of individuals and sampled values of fitnesses which are outputted from said optimization target;
- an estimating module that determines estimated values of true fitnesses that correspond to an individual of interest on the basis of sampled values which are stored in said storage; and
- an arithmetic unit that generates a new individual on the basis of the estimated values obtained by said estimating module, and feeds parameters of the generated new individual to said optimization target and said storage, while evaluating, in accordance with a multiobjective evolutionary algorithm, a population to be evaluated on the basis of a plurality of estimated values obtained by said estimating module, thereby determining a Pareto-optimal population; wherein
- said estimating module assigns a weight to the sampled values that correspond to each individual which is stored in said storage, and determines a linear sum of the weighted plurality of sampled values, thereby determining estimated values of fitnesses that correspond to the individual of interest, said weight for each individual being a function that contains a distance between the individual of interest and each of the others of said individuals on a parameter space;
- said arithmetic unit applies, for each of said plurality of fitness functions, dominance comparison on estimated values that correspond to a plurality of individuals of said population to be evaluated, and assigns weights to a plurality of results obtained for each of said plurality of fitness functions, so as to rank the plurality of individuals of said population to be evaluated on the basis of a linear sum of the plurality of obtained results which are weighted for each of said plurality of fitness functions;
- said multiobjective optimization apparatus generates a new individual on the basis of an index of distribution that indicates a degree of sparseness on a distribution of individuals at the highest rank of said population to be evaluated on a fitness function space; and
- said optimization target includes an evaluation system for evaluating a plurality of items of performance of a piece of equipment.

2. The multiobjective optimization apparatus according to claim 1, wherein, assuming $h_l$ is the plurality of individuals which are stored in said storage, $F(x)$ is the sampled values that correspond to an individual of interest x, $F(h_l)$ is the sampled values that correspond to the individuals spaced away from the individual of interest by a distance $d_l$ on the parameter space, and k' is a coefficient, where l=1, ..., H and n is a natural number, then said estimating module computes a plurality f'(x) of estimated values of true fitnesses that correspond to the individual of interest x based on an estimating equation expressed by:

$$f'(x) = \frac{F(x) + \sum_{l=2}^{H} \frac{1}{k'd_l^n + 1} F(h_l)}{1 + \sum_{l=2}^{H} \frac{1}{k'd_l^n + 1}}. \tag{10}$$

3. The multiobjective optimization apparatus according to claim 2, wherein a value of n is one.

4. The multiobjective optimization apparatus according to claim 2, wherein a value of n is three.

5. The multiobjective optimization apparatus according to claim 1, wherein assuming p fitness functions correspond to p-objectives, $f_k(x1)$ and $f_k(x2)$ are estimated values of fitnesses that correspond to an individual x1 and an individual x2 with respect to one fitness function of the p fitness functions, and $f_j(x1)$ and $f_j(x2)$ are estimated values of fitnesses that correspond to the individual x1 and individual x2 with respect to another fitness function of the p fitness functions, where k and j are 1, ..., p, k being different from j, and $\alpha_{kj}$ represents a weight, then said arithmetic unit determines that the individual x1 dominates the individual x2 when $g_k(x1, x2)$ expressed by an equation shown below satisfies $g_k(x1, x2) \leq 0$ with respect to all of k=1, ..., p, while satisfying a relationship of $g_k(x1, x2) < 0$ with respect to at least one of k=1, ..., p:

$$g_k(x_1, x_2) = f_k(x_1) - f_k(x_2) + \sum_{\substack{j=k \\ j \neq k}}^{1...P} \alpha_{kj}(f_j(x_1) - f_j(x_2)). \tag{8}$$

6. The multiobjective optimization apparatus according to claim 1, wherein when said plurality of objectives is m objectives having a value of not less than two, said index of distribution is a size of a simplex formed by m individuals adjacent to an individual of interest on a fitness function space that corresponds to the m objectives, and said arithmetic unit selects an individual having a highest degree of sparseness on the basis of the size of said simplex to form a new individual using the individual selected.

7. The multiobjective optimization apparatus according to claim 6, wherein when said plurality of objectives is two objectives, the size of said simplex is represented by a length of a straight-line that connects two individuals adjacent to an individual of interest on the fitness function space; when said plurality of objectives is three objectives, the size of said simplex is represented by an area of a triangle having the vertices of three individuals adjacent to an individual of interest on the fitness function space; and when said plurality of objectives is four objectives, the size of said simplex is represented by a volume of a cone having the vertices of four individuals adjacent to an individual of interest on the fitness function space.

8. The multiobjective optimization apparatus according to claim 6, wherein when said plurality of objectives is m objectives having a value of not less than four, the size of said simplex is represented by a base (m−1) dimensional area x height/in of a simplex formed by m individuals adjacent to an individual of interest on the fitness function space.

9. The multiobjective optimization apparatus according to claim 6, wherein when said plurality of objectives is at least three objectives, said simplex is formed by Delaunay Triangulation.

10. The multiobjective optimization apparatus according to claim 1, wherein said arithmetic unit replaces a newly generated individual with an individual at the lowest rank of said population to be evaluated when said newly generated individual is different from the individuals of said population to be evaluated.

11. The multiobjective optimization apparatus according to claim 1, wherein said arithmetic unit ranks as the lowest a newly generated individual which is a duplicate of an individual of said population to be evaluated.

12. The multiobjective optimization apparatus according to claim 1, wherein said arithmetic unit evaluates each individual of said population to be evaluated only once.

13. The multiobjective optimization apparatus according to claim 1, wherein said estimating module finishes storing the sampled values which are outputted from said optimization target when the amount of the sampled values stored in said storage has reached a given storage capacity.

14. The multiobjective optimization apparatus according to claim 1, wherein said arithmetic unit displays said Pareto-optimal individuals on the basis of the estimated values obtained by said estimating module.

15. The multiobjective optimization apparatus according to claim 1, wherein said arithmetic unit evaluates the individuals of said population to be evaluated using a genetic algorithm as said multiobjective evolutionary algorithm.

16. The multiobjective optimization apparatus according to claim 1, wherein said parameters include control parameters for said evaluation system, said plurality of fitness functions being said plurality of items of performance obtained from evaluations performed by said evaluation system, and said fitnesses being values of said plurality of items of performance.

17. The multiobjective optimization apparatus according to claim 16, wherein said equipment is an engine.

18. The multiobjective optimization apparatus according to claim 16, wherein said equipment is a motor.

19. The multiobjective optimization apparatus according to claim 16, wherein said evaluation system is an equipment evaluating apparatus that controls said equipment on the basis of said parameters while outputting the values of a plurality of items of performance generated by the operation of said equipment as sampled values.

20. The multiobjective optimization apparatus according to claim 16, wherein said evaluation system is an equipment simulator that evaluates a plurality of items of performance by simulating the operation of said equipment on the basis of said parameters, and outputs the values of a plurality of items of performance evaluated as sampled values.

21. A multiobjective optimization method in which parameters of an individual are fed to an optimization target, and said parameters of the individual are optimized on the basis of sampled values of fitnesses for a plurality of fitness functions that correspond to a plurality of objectives which are outputted from said optimization target, said multiobjective optimization method comprising the steps of:
  storing in a storage parameters of individuals and sampled values of fitnesses which are outputted from said optimization target;
  determining estimated values of true fitnesses that correspond to an individual of interest on the basis of the sampled values which are stored in said storage; and
  generating a new individual on the basis of the estimated values obtained, and feeding parameters of the generated new individual to said optimization target and said storage, while evaluating, in accordance with a multiobjective evolutionary algorithm, a population to be evaluated on the basis of a plurality of estimated values obtained, thereby determining a Pareto-optimal population; wherein
  said step of determining the estimated values includes the step of assigning a weight to the sampled values that corresponds to each individual which is stored in said storage, and determining a linear sum of the weighted plurality of sampled values, thereby determining estimated values of fitnesses that correspond to the individual of interest, said weight for each individual being a function that contains a distance between the individual of interest and the others of said individuals on a parameter space; and
  said step of determining the Pareto-optimal population includes the steps of:
  applying, for each of said plurality of fitness functions, dominance comparison on estimated values that correspond to a plurality of individuals of said population to be evaluated, and assigning weights to a plurality of results obtained for each of said plurality of fitness functions, so as to rank the plurality of individuals of said population to be evaluated on the basis of a linear sum of the plurality of obtained results which are weighted for each of said plurality of fitness functions; and
  generating a new individual on the basis of an index of distribution that indicates a degree of sparseness on a distribution of individuals at the highest rank of said population to be evaluated on a fitness function space; wherein
  said optimization target includes an evaluation system for evaluating a plurality of items of performance of a piece of equipment.

22. A computer readable storage medium encoded with a computer-executable multiobjective optimization program in which parameters of an individual are fed to an optimization target, and said parameters of the individual are optimized on the basis of sampled values of fitnesses for a plurality of fitness functions that correspond to a plurality of objectives which are outputted from said optimization target, said multiobjective optimization program allowing a computer to execute the processes of:
  storing in a storage parameters of individuals and sampled values of fitnesses which are outputted from said optimization target;
  determining estimated values of true fitnesses that correspond to an individual of interest on the basis of the sampled values which are stored in said storage; and
  generating a new individual on the basis of the estimated values obtained, and feeding parameters of the generated individual to said optimization target and said storage, while evaluating, in accordance with a multiobjective evolutionary algorithm, a population to be evaluated on the basis of a plurality of estimated values obtained thereby determining a Pareto-optimal population; wherein
  said process of determining the estimated values includes the process of assigning a weight to the sampled values that correspond to each individual which is stored in said storage, and determines a linear sum of the weighted plurality of sampled values, thereby determining estimated values of fitnesses that correspond to the individual of interest, said weight for each individual being a function that contains a distance between the individual of interest and the others of said individuals on a parameter space; and
  said process of determining the Pareto-optimal population includes the processes of:

applying, for each of said plurality of fitness functions, dominance comparison on estimated values that correspond to a plurality of individuals of said population to be evaluated, and assigning weights to a plurality of results obtained for each of said plurality of fitness functions, so as to rank the plurality of individuals of said population to be evaluated on the basis of a linear sum of the plurality of obtained results which are weighted for each of said plurality of fitness functions; and generating a new individual on the basis of an index of distribution that indicates a degree of sparseness on a distribution of individuals at the highest rank of said population to be evaluated on a fitness function space; wherein said optimization target includes an evaluation system for evaluating a plurality of items of performance of a piece of equipment.

\* \* \* \* \*